US008676190B2

(12) United States Patent
Brandt et al.

(10) Patent No.: US 8,676,190 B2
(45) Date of Patent: Mar. 18, 2014

(54) NETWORK APPARATUS AND METHOD FOR PERFORMING A HANDOVER IN A NETWORK

(75) Inventors: Achim Von Brandt, Munich (DE); Shun Liang Zhang, Beijing (CN); Yi Zhang, Beijing (CN); Wei Hua Zhou, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 116 days.

(21) Appl. No.: 13/132,485

(22) PCT Filed: Dec. 5, 2008

(86) PCT No.: PCT/EP2008/066936
§ 371 (c)(1),
(2), (4) Date: Aug. 3, 2011

(87) PCT Pub. No.: WO2010/063327
PCT Pub. Date: Jun. 10, 2010

(65) Prior Publication Data
US 2011/0281581 A1    Nov. 17, 2011

(51) Int. Cl.
*H04W 36/00*    (2009.01)
*H04W 4/00*    (2009.01)
(52) U.S. Cl.
USPC .......................... 455/427; 455/436; 370/331
(58) Field of Classification Search
USPC .................................. 370/331, 332; 455/436
See application file for complete search history.

(56) References Cited

U.S. PATENT DOCUMENTS 7,890,577 B2 *   2/2011   Weniger et al. ............... 709/203
8,218,512 B2 *   7/2012   Yaqub .......................... 370/338
(Continued)

FOREIGN PATENT DOCUMENTS

EP   1 531 645 A1   5/2005
EP   1 890 512 A1   2/2008
(Continued)

OTHER PUBLICATIONS

WiMAX Forum Network Architecture, Stage 2: Architecture Tenets, Reference Model and Reference Points, Part 0, Release 1, Version 1.2, (Jan. 11, 2008), (8 pages).

(Continued)

*Primary Examiner* — Nizar Sivji
(74) *Attorney, Agent, or Firm* — Harrington & Smith

(57) ABSTRACT

According to an exemplary embodiment of the invention a network apparatus may be provided, which network apparatus may include a detecting device, a selecting device, a receiving device, a determining device and a sending device. The detecting device may be adapted to detect a condition for a handover. The selecting device may be adapted to select a first group, wherein the first group includes at least one first target apparatus member. The receiving device may be adapted to receive a second group, wherein the second group may include at least one second target apparatus member. The determining device may be adapted to determine a difference group of the first target apparatus members and the second target apparatus members. The selecting device may be adapted to select at least one target apparatus member of the difference group. The sending device may be adapted to send a preparation information to the at least one selected target apparatus member of the difference group.

18 Claims, 21 Drawing Sheets

(56) References Cited

U.S. PATENT DOCUMENTS

| | | | | |
|---|---|---|---|---|
| 8,259,678 | B2 * | 9/2012 | Jung et al. | 370/331 |
| 8,315,627 | B2 * | 11/2012 | Poyhonen et al. | 455/436 |
| 2009/0196254 | A1 * | 8/2009 | Cha et al. | 370/331 |

FOREIGN PATENT DOCUMENTS

| | | | | |
|---|---|---|---|---|
| WO | WO 2006/123863 | * | 4/2006 | H04L 12/56 |
| WO | WO 2007/133034 | * | 5/2007 | H04Q 7/38 |
| WO | WO 2008/002092 A2 | | 1/2008 | |

OTHER PUBLICATIONS

IEEE 802.16 Broadband Wireless Access Working Group, Support of load balancing to enhance service availability, (2008), (8 pages).

WiMAX Forum Network Architecture, Stage 3: Detailed Protocols and Procedures, NWG Release 1, Version 1.3.0, (Sep. 21, 2008), (694 pages).

IEEE 802.16Rev2/D7, Draft Standard for Local and metropolitan area networks, Part 16: Air Iterface for Broadband Wireless Access Systems, (Oct. 2008), (2006 pages).

* cited by examiner

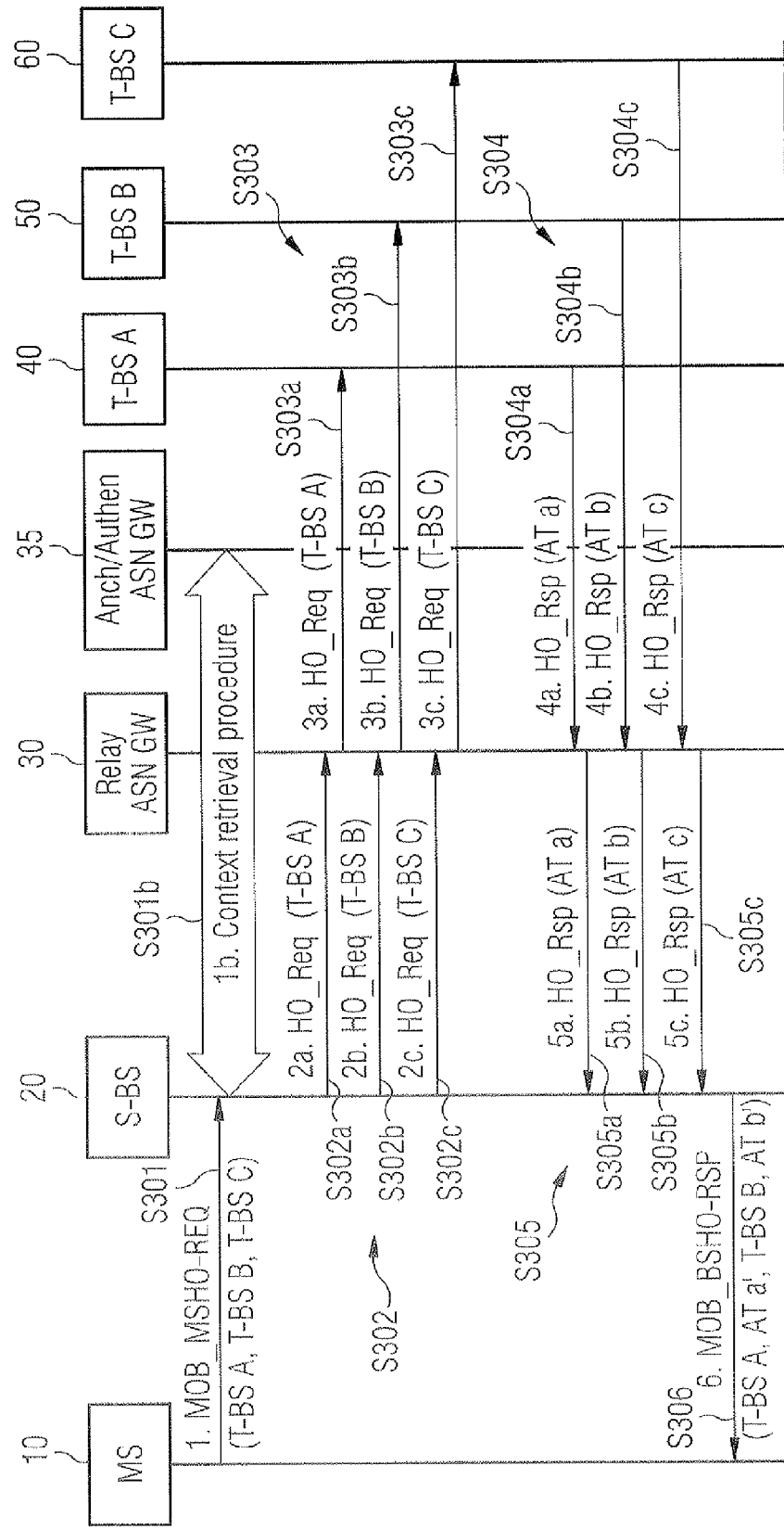

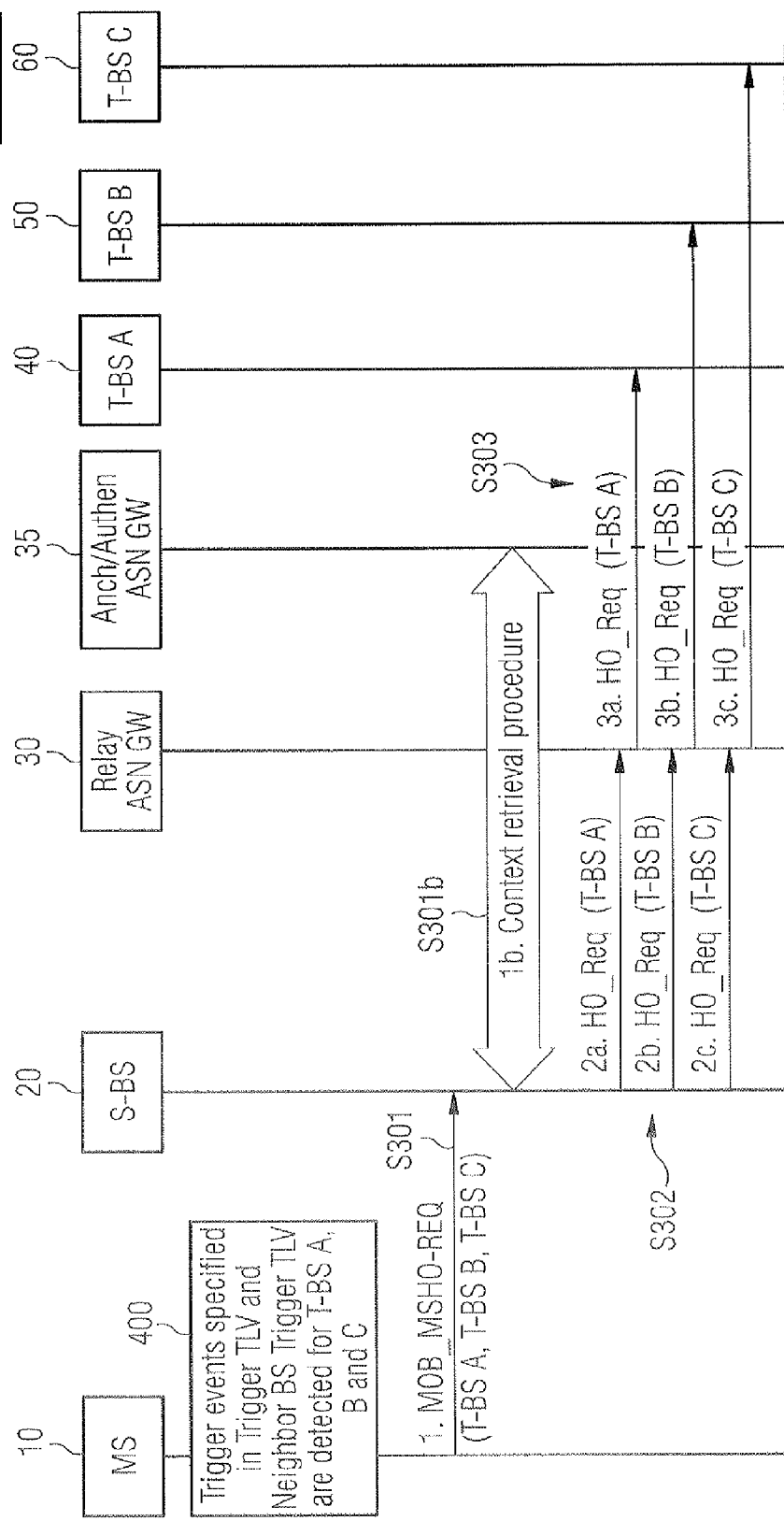

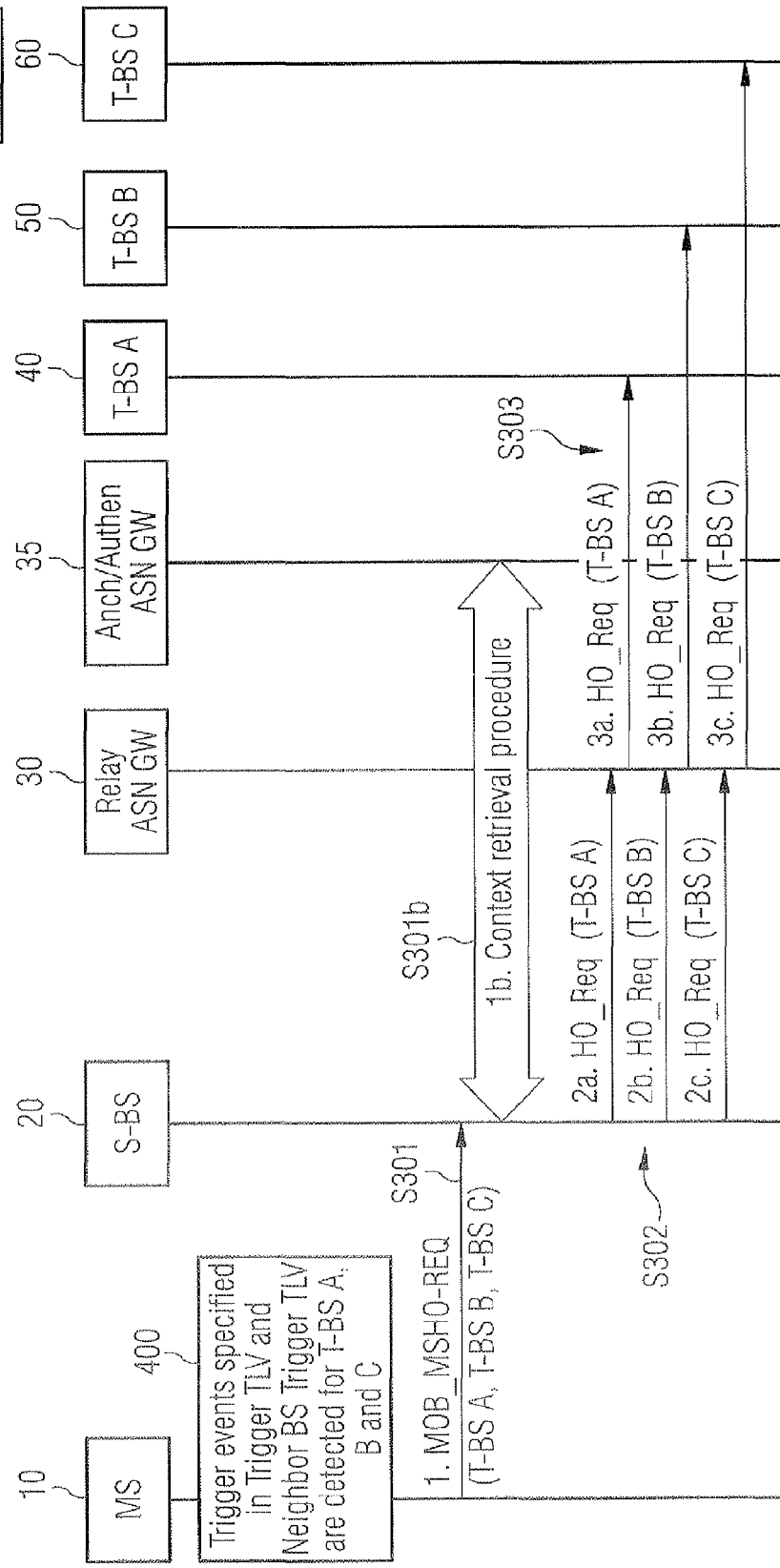

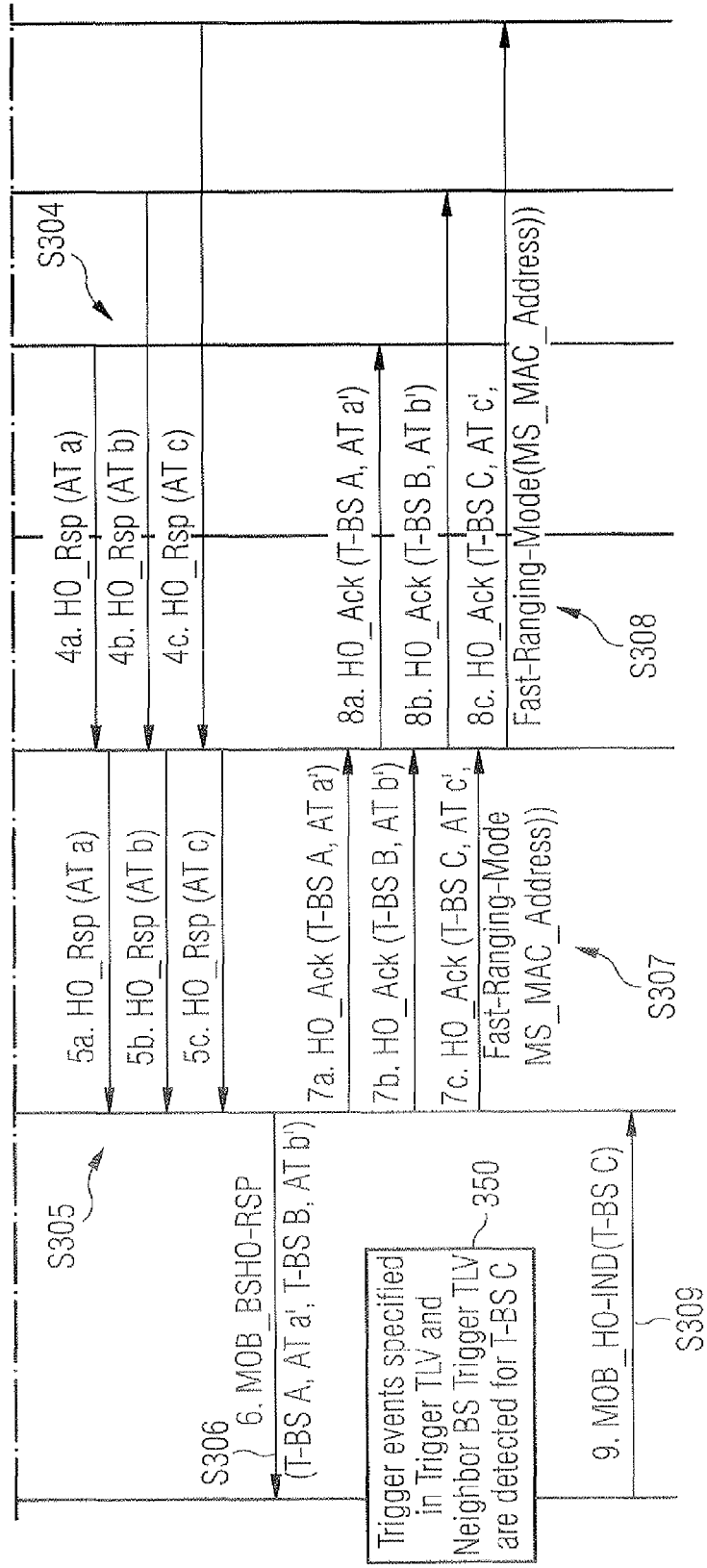

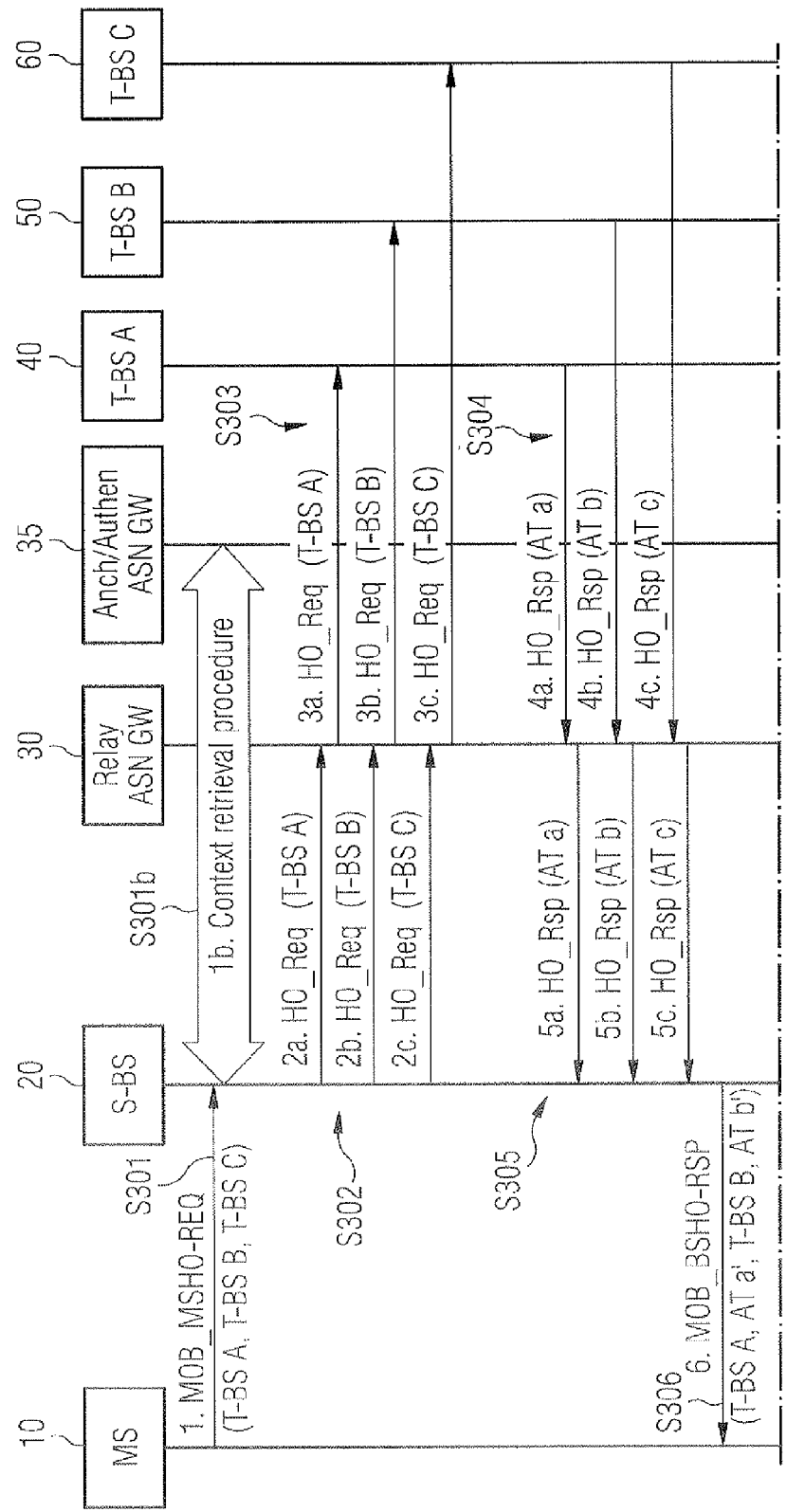

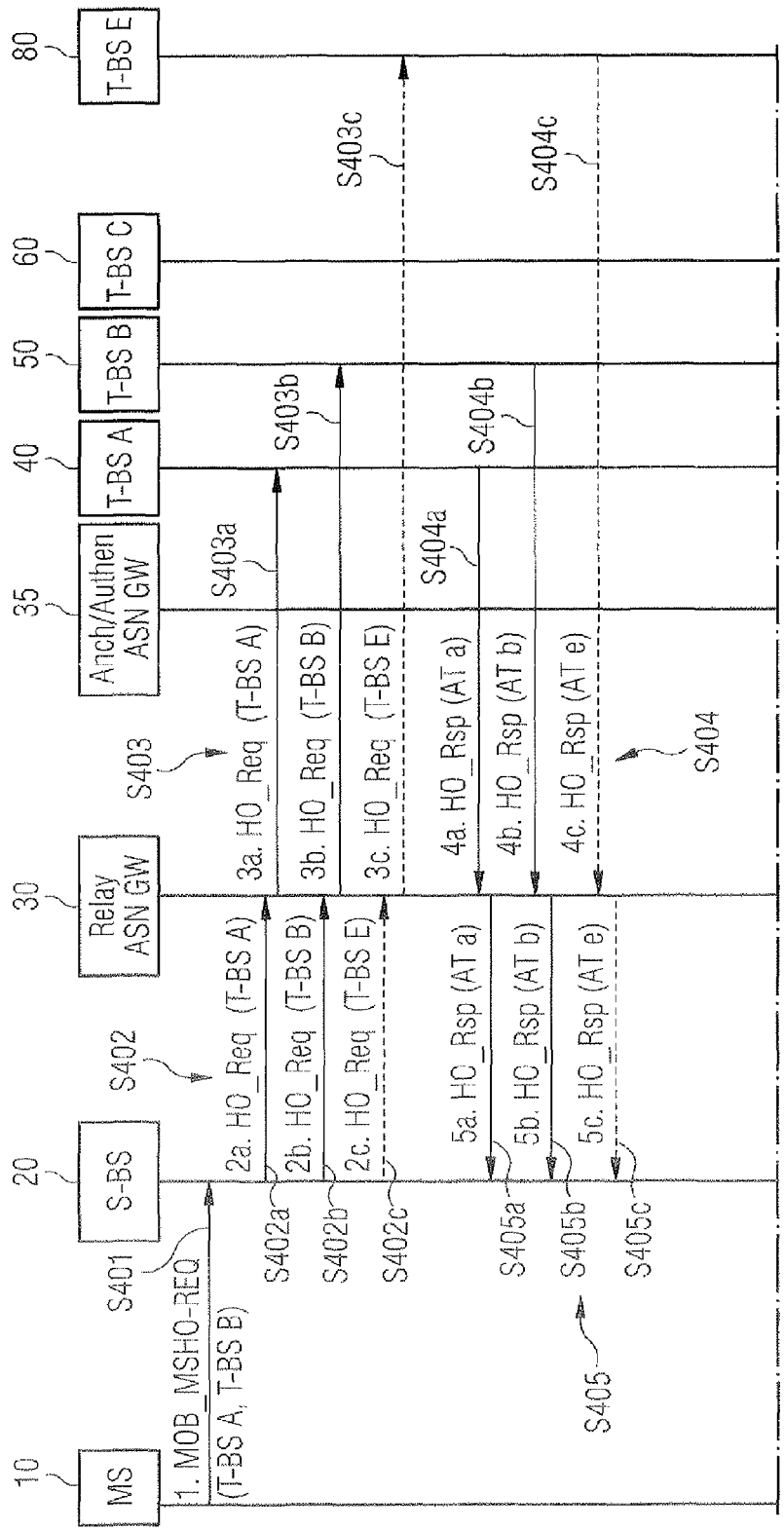

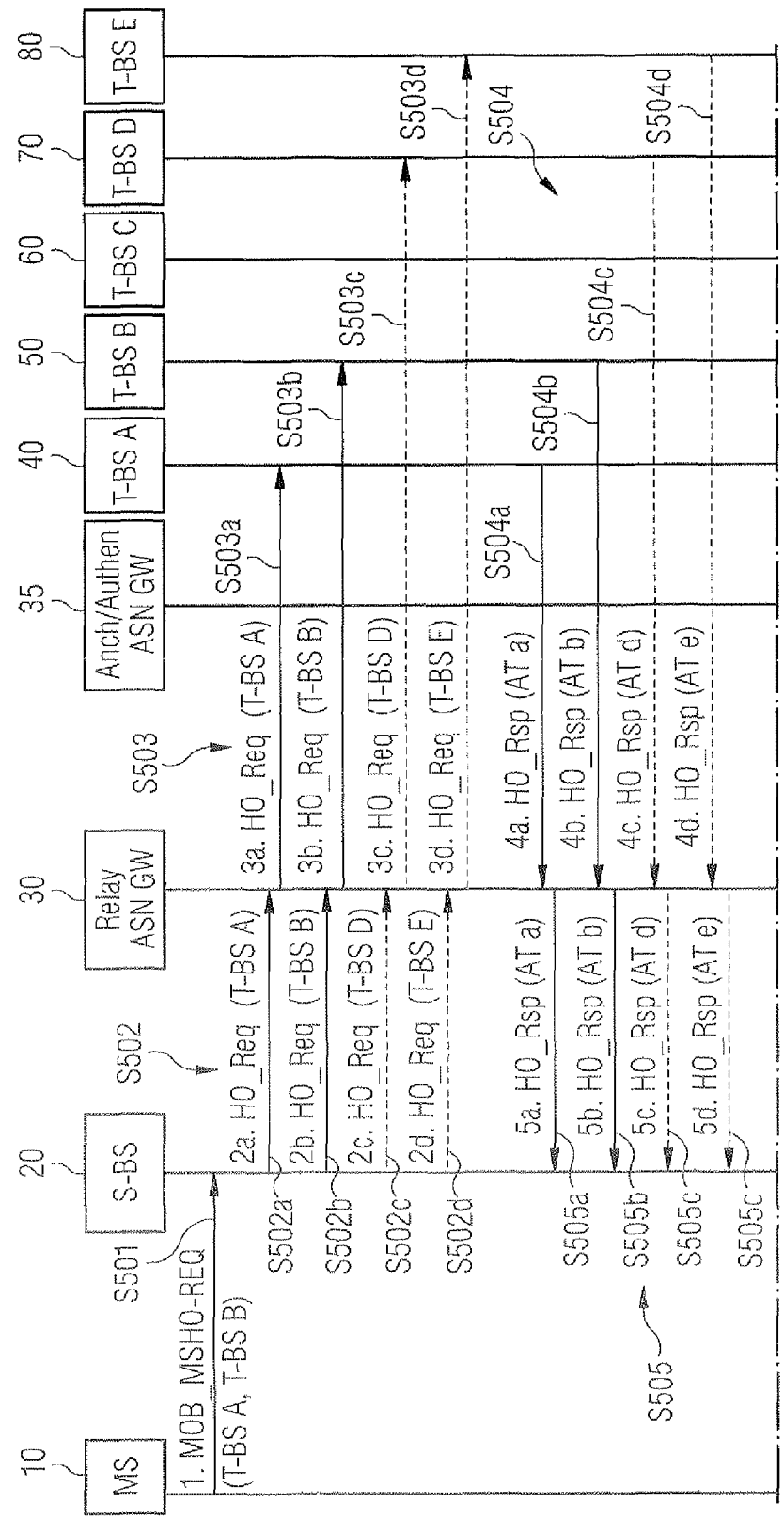

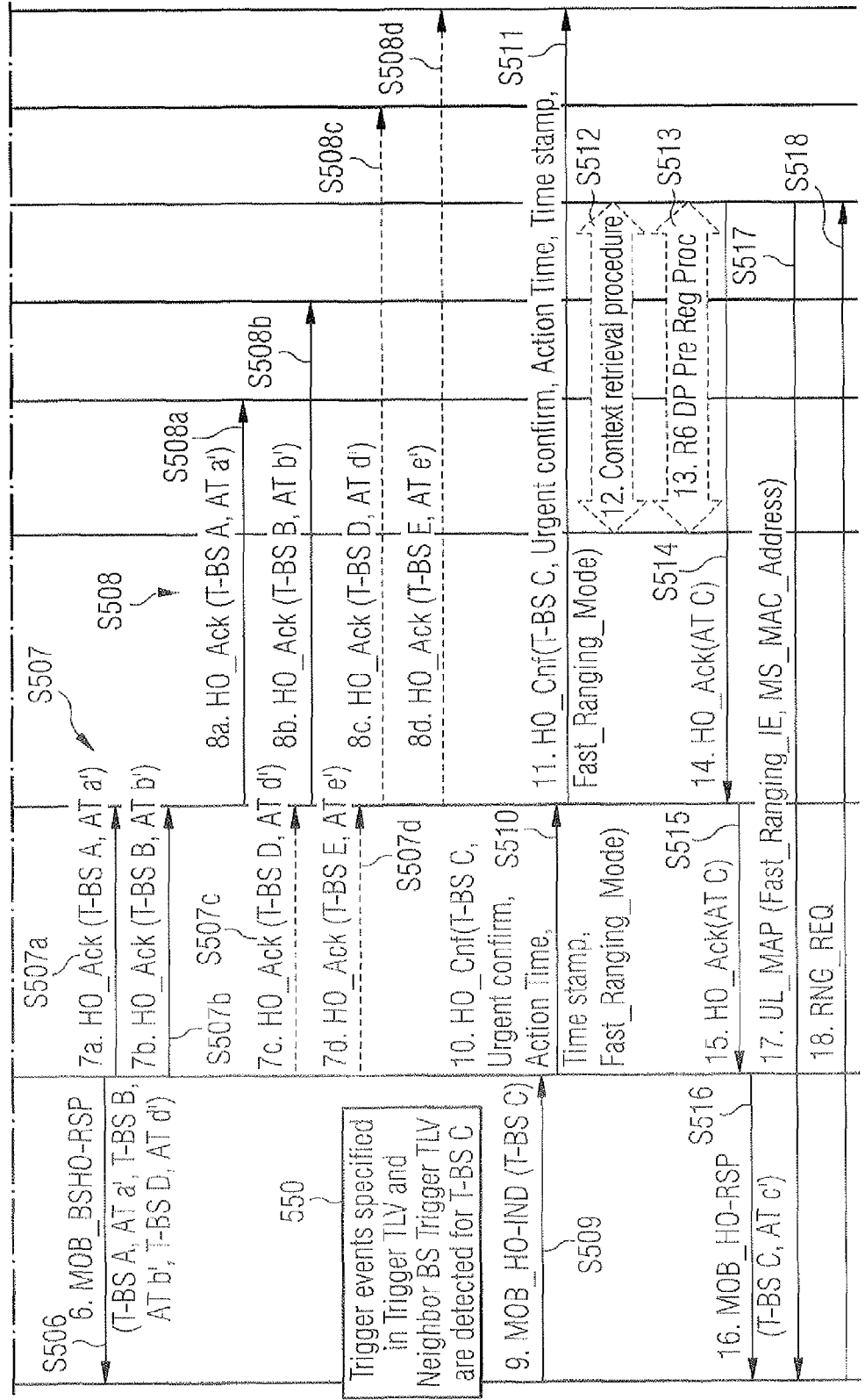

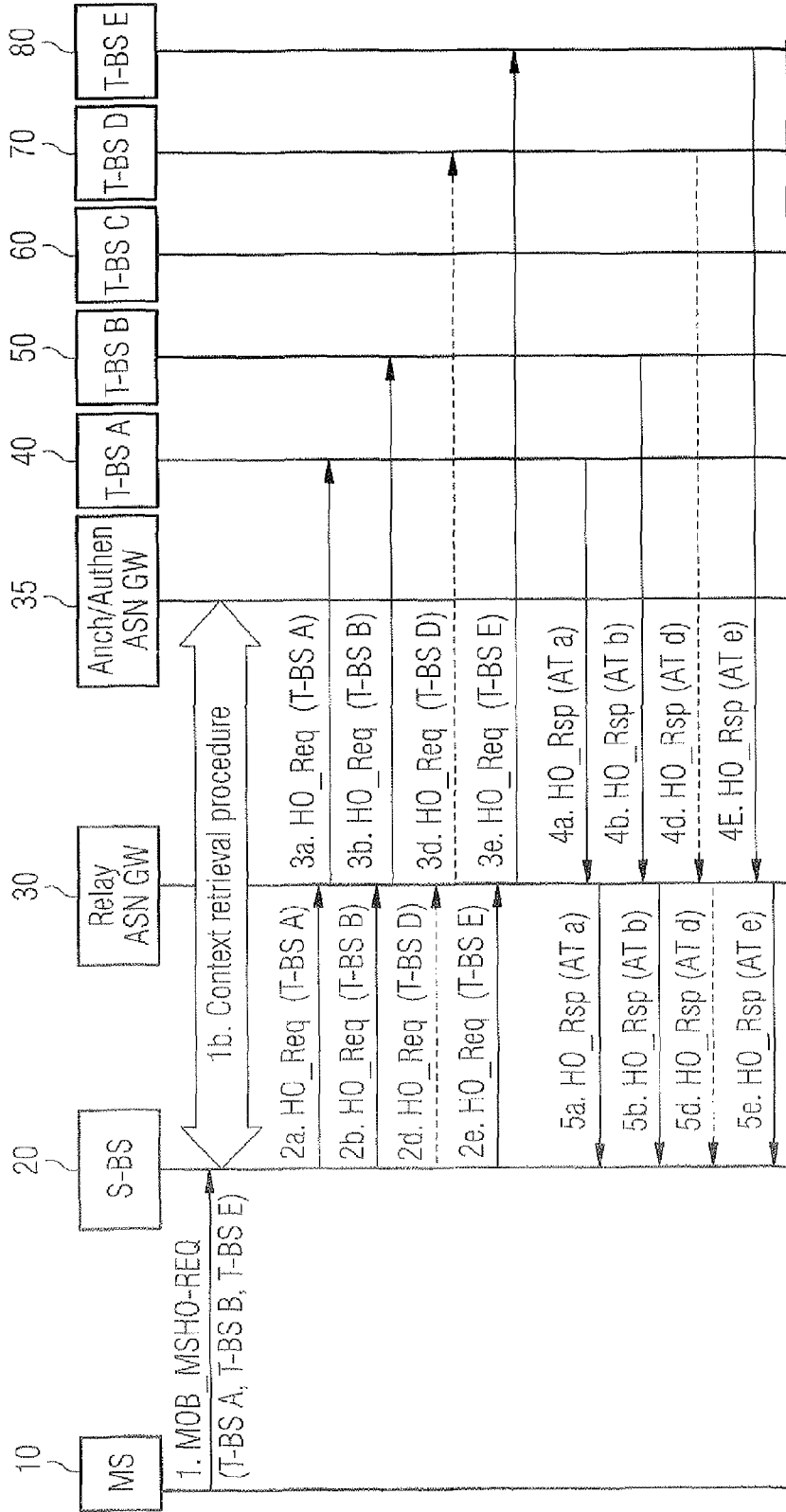

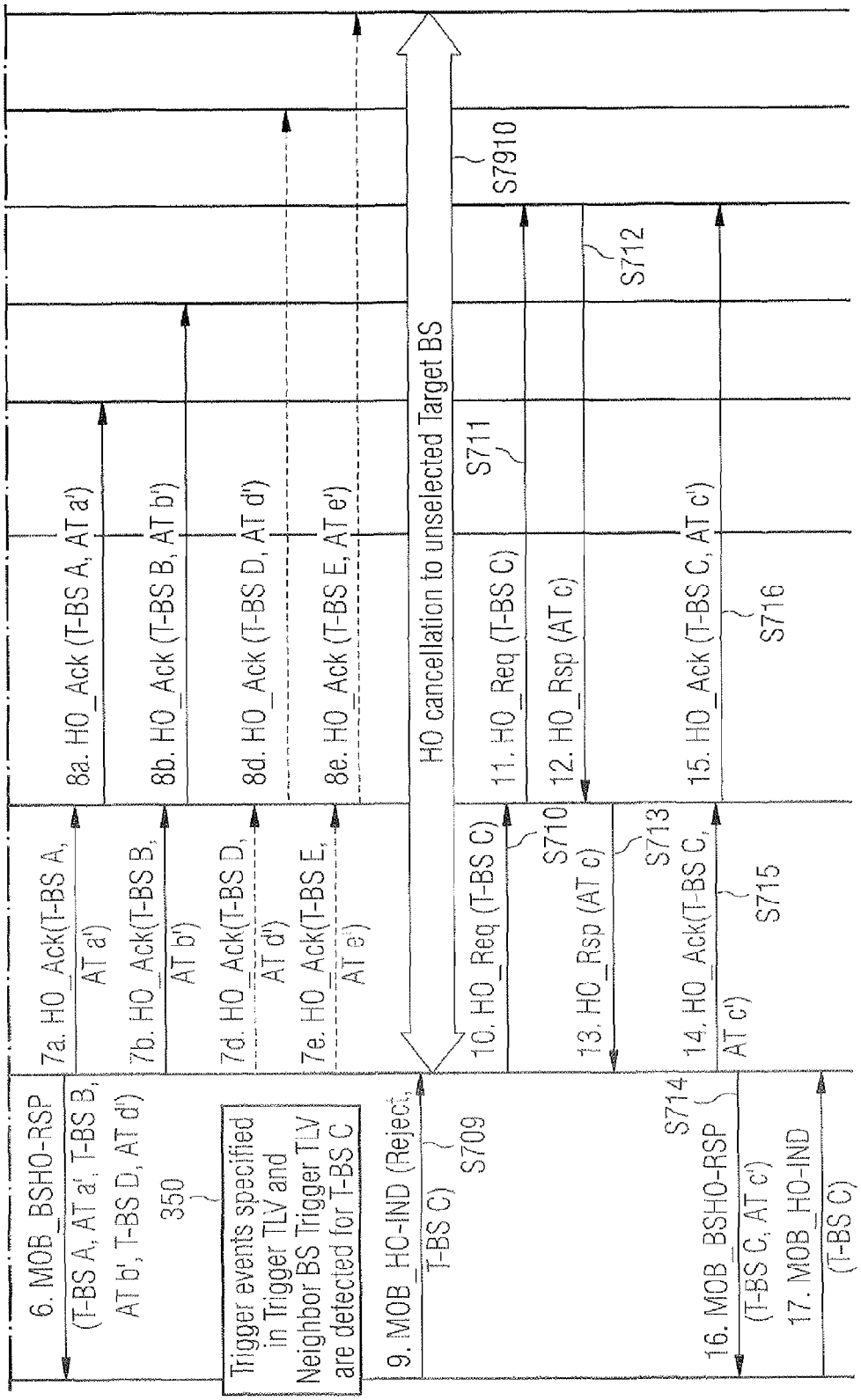

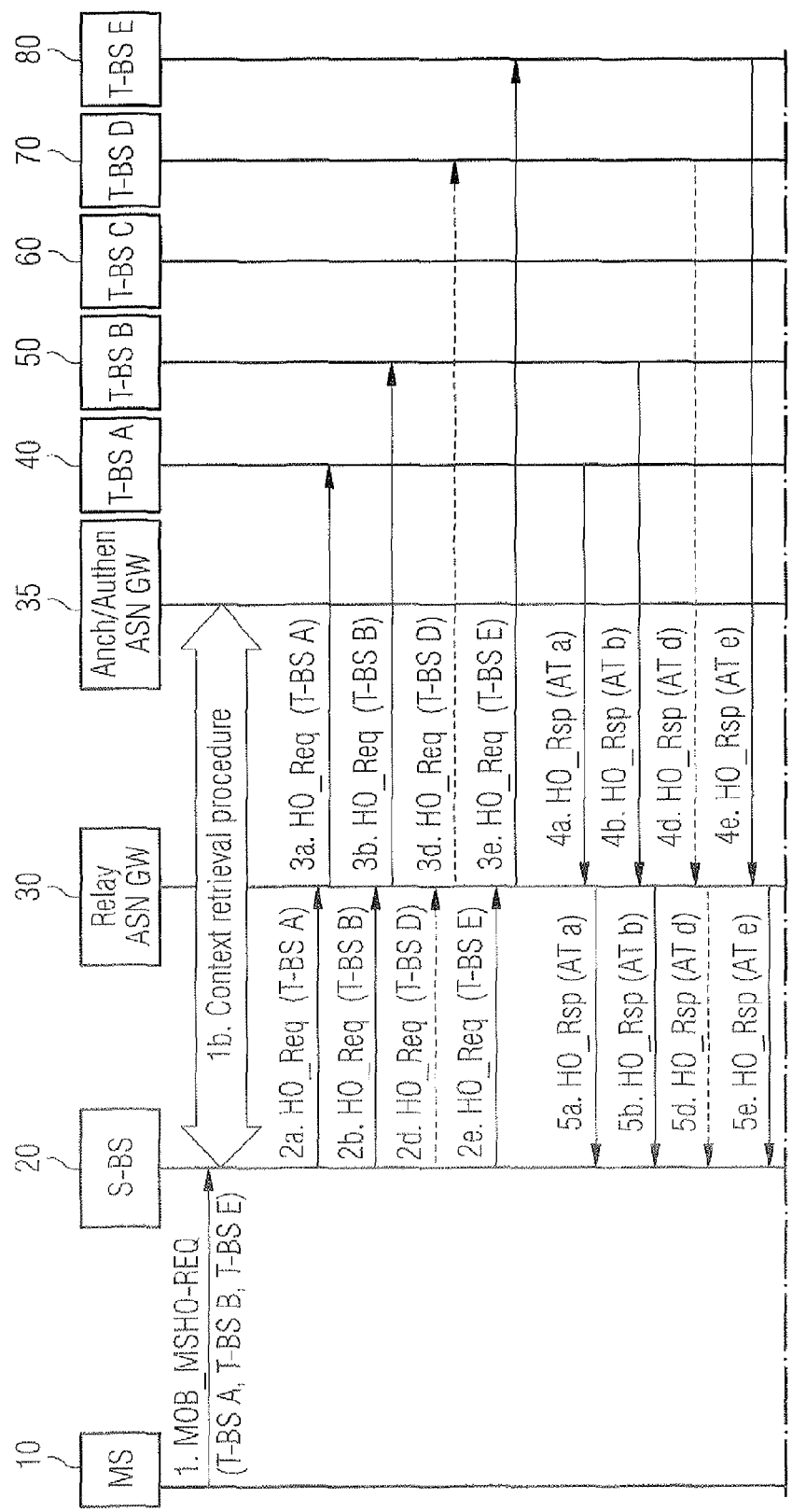

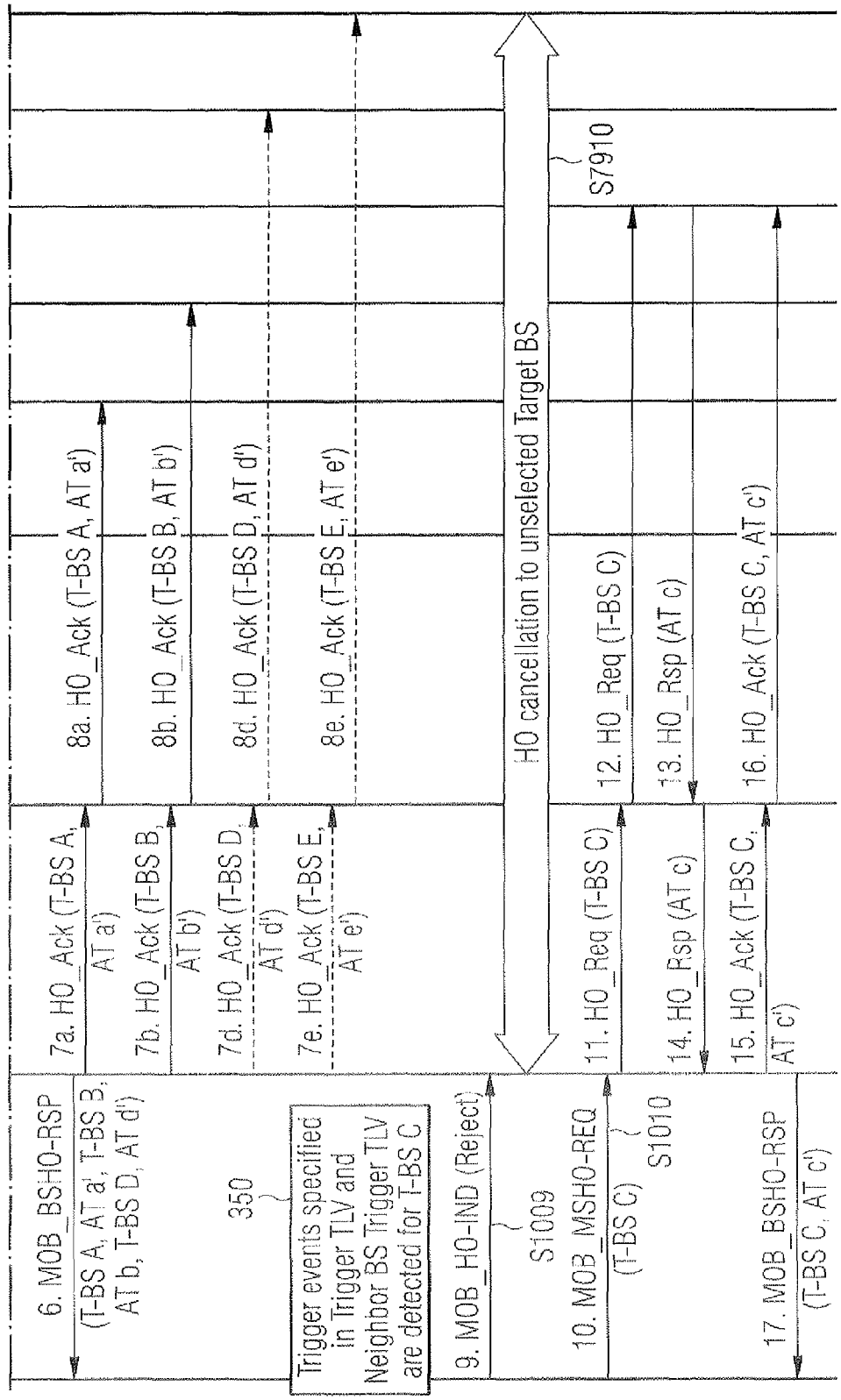

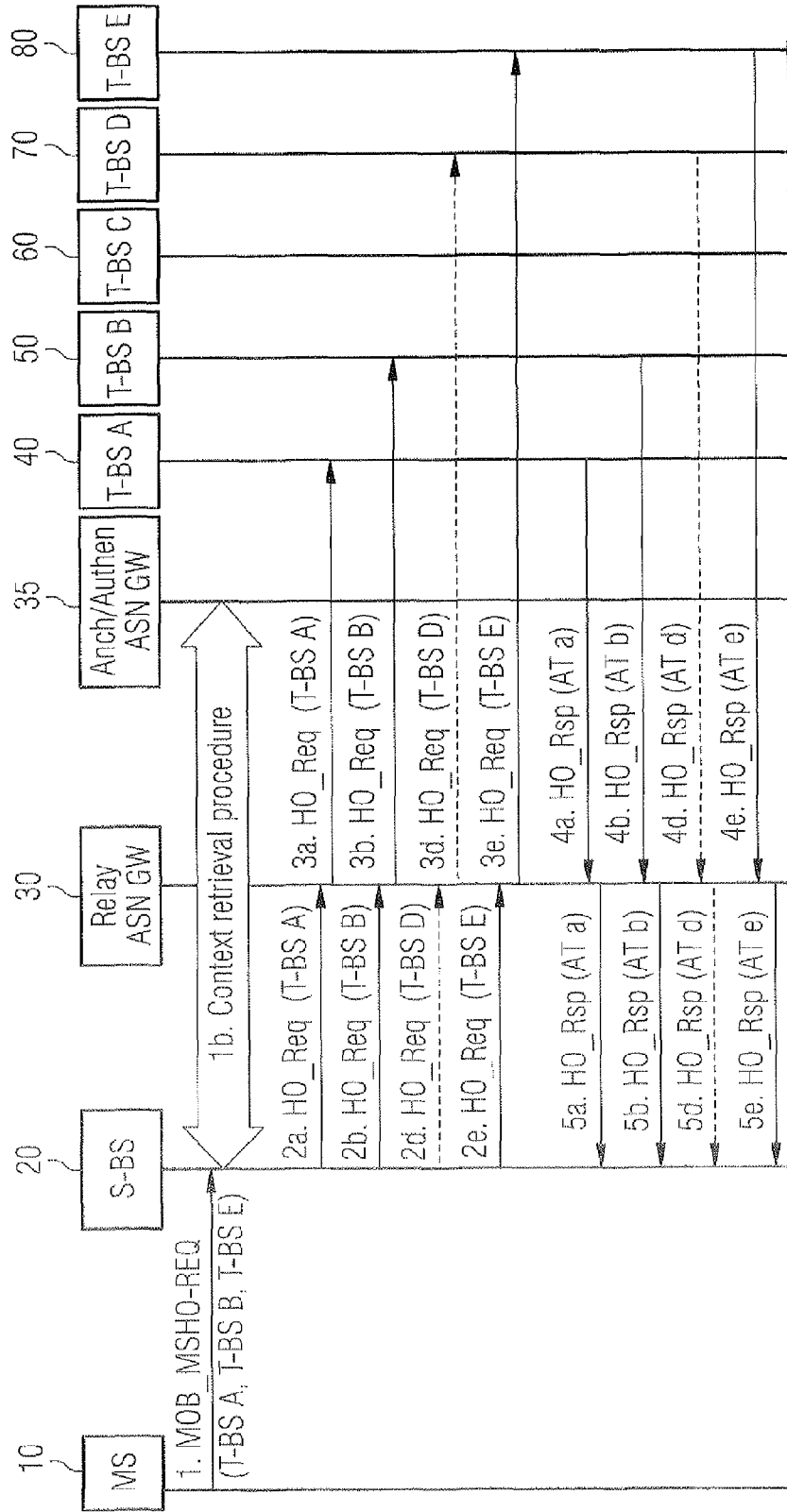

NETWORK APPARATUS AND METHOD FOR PERFORMING A HANDOVER IN A NETWORK

TECHNICAL FIELD OF THE INVENTION

The present invention relates to networks, for example to telecommunication networks. In particular, the present invention relates to a network apparatus, to a method for performing a handover (HO) in a network, to a computer readable medium, to a use of handover acknowledge message and to a use of a handover confirmation message.

BACKGROUND OF THE INVENTION

In a network, in particular in a telecommunication network, several network apparatuses may be movable and other network apparatuses may be locally fixed. A movable network apparatus may be in particular a mobile station, such as a mobile phone. A locally fixed network apparatus may be in particular a service station, such as a base station. The base station may be connected with the mobile station in order to perform one or more network services such as performing a telephone conversation or sending video data. The base station may be a serving base station for the mobile station, meaning the base station may provide the service for the mobile station.

The mobile station may move within the network, which may cause a change of the quality of the connection between the serving base station and the mobile station. In such a situation the mobile station or the serving base station may initiate a handover procedure in order to maintain a quality of service, such as the telephone conversation. A handover procedure may also be initiated when the base station may be overloaded, for example caused by several mobile stations to be served by that base station.

In a handover procedure the mobile station may change the base station to which it may be connected while maintaining the provided network service of the network. A handover may be performed for example by providing a connection from the mobile station to an other base station, in particular to a target base station, and to disconnect the connection between the current serving base station and the mobile station.

In such a handover procedure an interruption may occur. The mobile station may be disconnected from the serving base station, but may not yet be connected to a target base station at that moment. This interruption may reduce the quality of service in the network and in particular, the interruption may cause an interrupt of the service provided to the mobile station by the network.

The document WiMAX™ Forum Network Architecture, Stage 3: Detailed Protocols and Procedures, NWG Release 1, Version 1.3.0, Sep. 21, 2008 may describe procedures, call flows, messages, timers, TLV and attributes for the WiMAX™ end-to-end network specification.

The document WiMAX™ Forum Network Architecture, Stage 2: Architecture Tenets, Reference Model and Reference Points, Part 0, Release 1, Version 1.2, Jan. 11, 2008, may describe architecture reference model, reference points and procedures for different end-to-end architecture aspects of WiMAX™ NWG.

The document IEEE 802.16 Broadband Wireless Access Working Group IEEE C802.16maint-08/013r10, Apr. 30, 2008, "Support of load balancing to enhance service availability" may describe load balancing scheme during initial network entry, HO, or re-entry from idle mode.

The standard document IEEE P802.16Rev2/D7 "Air Interface for Broadband Wireless Access Systems", October 2008, may describe air interfaces.

There may be a need to provide an efficient handover.

SUMMARY OF THE INVENTION

According to an exemplary embodiment of the present invention a network apparatus, a method for a handover, a computer readable medium, a use of an handover acknowledge message and a use of an handover confirmation message may be provided.

According to an exemplary embodiment of the invention a network apparatus may be provided, which network apparatus may comprise a detecting device, a selecting device, a receiving device, a determining device and a sending device. The detecting device may be adapted to detect a condition for a handover. The selecting device may be adapted to select a first group, wherein the first group comprises at least one first target apparatus member. The receiving device may be adapted to receive a second group, wherein the second group may comprise at least one second target apparatus member. The determining device may be adapted to determine or generate a difference group of the first target apparatus members and the second target apparatus members. The selecting device may be adapted to select at least one target apparatus member of the difference group. The sending device may be adapted to send a preparation information to the at least one selected target apparatus member of the difference group.

The term "network apparatus" may comprise any apparatus in a network, which may comprise a target apparatus, a serving apparatus, a locally fixed installed apparatus and a mobile apparatus.

The term "target apparatus" may represent an apparatus in the network, which apparatus may be taken into account for a potential handover when selecting potential target apparatuses. A target apparatus may represent a network apparatus, wherein this network apparatus may not be in service for a further network apparatus, which further network apparatus may intend to change the serving network apparatus. The target apparatus may be selected according to one or more criteria for offering services after a performed handover.

The term "first target apparatus members" may represent a target apparatus, which may be a member of a first group. A member may be a physical, real target apparatus and also a name of such a target apparatus or an indication for such a target apparatus. The same definition may be applicable in respect of the term "second target apparatus member", which may represent a target apparatus of a second group. A member of a group may be a mathematical definition.

The term "receive a second group" may comprise receiving one or more parameters of members of the second group, for example receiving T-BS A, T-BS B and T-BS C (T-BS: Target Base Station) within one message as a second group representing selected target apparatus.

The first group as well the second group may be created when a selection may take place based on one or more criteria for a handover. In other words, all network apparatuses of a network may be available to become member of the first group and of the second group. After a selection took place selected target apparatuses may become member of the first group and/or of the second group. The members of the first group and the members of the second group may be different, since different criteria may be utilized in order to perform a selection. In other words, the first group may comprise members with a certain characteristic or fulfilling a certain condition and the second group may comprise members with a different characteristic or based on a certain different condition compared to members of the first group. This may occur when a serving base station (S-BS) selects potential target base stations for a handover based on a first criteria and the mobile station (MS), which may be served by that serving base station, selects potential target base stations for a handover based on a second criteria.

A difference group may be a group, which may be the left over when adding or combining all members of the first group of target apparatuses and all members of the second group of target apparatuses, then subtracting the intersection of the members of the first group and of the members of the second group from the summary of the members of the first group and of the members of the second group. A difference group may also be a symmetric difference quantity group in a mathematical sense.

As an example a difference group may be determined as follows: The first group, for example called group B, may comprise target base stations T-BS A, T-BS B and T-BS C and the second group, for example called group M, may comprise target base stations T-BS A, T-BS B, T-BS D and T-BS E. In other words, target base stations T-BS A, T-BS B and T-BS may be members of the first group, in particular of group B. Target base stations T-BS A, T-BS B, T-BS D and T-BS E may be members of the second group, in particular group M.

The intersection of both groups, i.e. the intersection of the first group of target apparatuses and the second group of target apparatuses may be T-BS A and T-BS B, since T-BS A and T-BS B may be members of the first group of target apparatuses and as well members of the second group of target apparatuses. The difference group may be the group of members which may comprise T-BS C, T-BS D and T-BS E, since these members may be only members of one group, either of the first group or of the second group. Therefore, the difference group may comprise T-BS C, T-BS D and T-BS E in this example.

The first group may be called for example group B, wherein B indicates "base station" and the second group may be called for example group M, wherein M indicates "mobile station". The group M may be the set of T-BSs (Target Base Stations) which may be selected by the mobile station (MS). As an example: M={T-BS A, T-BS B, T-BS C} and B={T-BS A, T-BS B, T-BS D, T-BS E}, meaning the first group may comprise a suggestion for T-BS A, T-BS B and T-BS C and the second group may comprise a suggestion for T-BS A, T-BS D and T-BS E. Then the difference group D may be D={T-BS C, T-BS D, T-BS E} Afterwards the base station may for example prepare target apparatus T-BS C, since T-BS C may originate from the second group M and may be not included in the first group B. In other words, M'=M\B, i.e. "M without B", i.e. those members of M which may be not members of B: M'=M\B={T-BS C}.

The preparation of target base station T-BS C in this example may be the same, when selecting afterwards out of the difference group only members or at least one member originating of B from the difference group. The difference group D may include both "M without B" and "B without M", i.e. D=M\B+B\M={T-BS C}+{T-BS D, T-BS E}={T-BS C, T-BS D, T-BS E}

The term "group" may comprise one or more target apparatuses. The term "group" may also comprise a list of target apparatuses. In this list a ranking of target apparatuses may be provided. For example, the first element or parameter of the list may comprise a target apparatus, which may indicate the most favorable selected target apparatus and the last element or parameter of the list may comprise a target apparatus, which may indicate the less favorable selected target apparatus.

A serving base station (S-BS), which serves the mobile station, may select a first group of potential target base stations. In addition, a mobile station may select a second group of potential target base station for a handover. It may depend on the conditions in the network, to which target base station the mobile station may handover in fact. Moreover, the mobile station may not be obliged to handover to a target base station selected and offered by the network, in particular by the serving base station.

A selection of a first group may be performed by a S-BS (Serving Base Station) and may take place timely after the S-BS may have received a MOB_MSHO-REQ message. The selection may also take place timely before the S-BS may send one or more HO_Req messages. A selection of a first group may be performed by a S-BS and may take place timely before the S-BS may send a MOB_BSHO-RSP. This selection may also take place timely after the S-BS may receive one or more HO_Rsp messages. The selection of a first group may be indicated in one or more HO_Req messages or in one or more HO_Ack messages. The selection of the first group may be performed timely before performing the selection of the second group. It may also be possible, that the selection of the second group may be performed timely before performing the selection of the first group.

A selection of a second group may be performed by a MS. The selection by the MS may take place after the MS may have received a trigger event. The selection of the second group may be indicated in a MOB_MSHO-REQ message. Moreover, a selection of the second group may be indicated in a MOB_HO-IND message sent by the MS. A selection of the second group may also be indicated in a HO_Req message, which selection may be performed by the MS but in a HO_Req message by the S-BS. Moreover, the selection of the second group may be indicated in a HO_Ack message. The HO_Ack message may be sent by the S-BS and the selection may be performed by the MS.

The selection of members of the first group and members of the second group may be split in more than one message. In other words, one network apparatus may select more than one target network apparatus. This group or list may be split in order to send a message to the respective target network apparatus, respectively. In such a case only such kind of information may be received by a selected target network apparatus, which information may be utilized by that selected target network apparatus. The further selected target network apparatuses may receive further information in relation to their respective handover preparation.

The serving base station may comprise a determining device which may perform a comparison in order to determine target base stations, which may have been selected by the mobile station but which may have been not selected by the base station. This may be not the difference group as defined before, since the difference group also includes those target base stations which may have been selected by the base station but not by the mobile station, in particular by the serving base station, which serves the mobile station. Since the mobile station may not be forced to handover to one of the selected target base stations, selected by the serving base station, additional steps may be taken in order to prepare a handover for an unexpected target base station. These steps may depend on different situations in the network.

In a situation in the network (case 1) the MS may perform a HO to a non-recommended T-BS, but the MS may indicate its final decision in a MOB_HO-IND message which may be the last message that the MS may send to the SBS before leaving it. I.e.: The network may recommend a set of group B to the MS, but the MS may perform a HO to a T-BS, which may be not in group B. This non-recommended T-BS may be called an "unexpected T-BS".

In addition, in a further situation (case 2), the MS may have announced its preferred set of T-BSs (i.e. the set M) originally, at the beginning of the procedure, before the network recommended set B to the MS. The MS may select group M while the network selected (recommends) group B, and then the MS may insist in its own selection and performs a HO to a T-BS which may be a member of the set M'=M\B, meaning group M without B. So the network may be prepared to see a HO to a T-BS which the MS already indicated before. This may occur in a MS-initiated HO, because in a MS-initiated HO, the network might receive the group M, for example in the MOB_MSHO-REQ message, before the MS may start the HO.

In both cases, meaning case 1 and case 2 as mentioned above, the MS may perform network re-entry at a "non-recommended" T-BS, but in the special case 2, which may be a subset of case 1, the MS may already indicate its preferences originally, so the network got at least a hint about the preferences of the MS originally, which may help the network to prepare the non-recommended T-BS although the network does not recommend it to the MS.

In both cases, case 1 and case 2, it may be assumed that the MS may indicate its finally selected Target Base Station T-BS in the MOB_HO-IND message, which may be the last message that the MS sends to the SBS before leaving it. As a result, the MS may not get lost when the MS may start a network re-entry at another T-BS, for example T-BS2.

In this context an unexpected target base station means, that the target base station may be not selected by the network and indicated to the mobile station in an MOB_BSHO-REQ or an MOB_BSHO-RSP message, but the target base station may be selected by the mobile station and indicated to the network in a MOB_HO-IND message. In other words, from the viewpoint of the base station, in particular from the viewpoint of the serving base station, which may be connected to the mobile station for service, the base station may be surprised of a selection of a target base station, which was selected by the mobile station, since the base station did not prepare this target base station or did not execute all necessary steps for this target base station in order to be ready for a handover. In particular, an unexpected target base station may be included as parameter in a MOB_HO-IND message sent from the mobile station to the serving base station. In order to avoid an interruption of network service, which service may be utilized by the mobile station, the serving base station may start preparation actions in order to prepare a handover, which may take place in time shortly after detecting an unexpected target base station.

There might be different situations or scenarios in relation to a handover in a network:

"A first situation in respect to an HO": This may be where the finally selected T-BS was involved in the HO preparation phase and was included in MOB_BSHO-REQ/RSP and may be also included in MOB_HO-IND by the MS.

A second situation in respect to an HO: This may be where the finally selected T-BS was not involved in the HO preparation phase and may be neither indicated in MOB_HO-IND: So the network may have had no chance of preparing this T-BS.

A third situation in respect to an HO may occur when a certain T-BS may be not involved in the HO preparation phase This may be caused, because the network decided this T-BS may be not suitable for the MS, although the MS possibly included it (or not) in its initial HO request message, but the MS may have included that T-BS in a MOB_HO-IND message.

According to an exemplary embodiment of the invention the at least one selected target apparatus member of the difference group may originate from the second group.

The second group may be received by the network apparatus, meaning the receiving device of the network apparatus may receive information about one or more further network apparatuses. This receiving may be performed by receiving a MOB_MSHO-REQ message or a MOB_HO-IND message. An other possibility may be a second group, which may be generated inside the network apparatus, which also may select a first group. The selection of a first group and of a second group by the same network apparatus may be based on different selecting criteria.

According to an exemplary embodiment of the invention the sending device may be adapted to send a preparation information to all selected target apparatus members of the difference group.

A preparation information may be a message, in particular a HO_Req message. Moreover, a preparation information may be a HO_Ack message. This messages may comprise for example an action time in order to prepare a target network apparatus for a handover of another network apparatus, for example for a handover of a mobile station. Furthermore, the preparation information may comprise a identification parameter, for example a HO_ID of a network apparatus, for example of a target base station.

According to an exemplary embodiment of the invention the sending device may be adapted to send a preparation information to all target apparatus members of the difference group originating from the second group.

The second group of target apparatuses may be selected by a mobile station. When the network apparatus may be a serving base station, the serving base station may prepare all selected target base stations, which may have been selected by the mobile station. Such a preparation may reduce the risk that the mobile station may perform a handover to a target base station, which target base station may not prepared in the moment when performing the handover.

According to an exemplary embodiment of the invention the network apparatus may be at least one apparatus selected from the group of apparatuses consisting of a base station, a mobile station, a gateway, an anchor, a switch, a hub, a server and a satellite.

The term "base station" may comprise a serving base station. Moreover, the term "base station" may comprise a target base station. A serving base station may be a base station which may be connected with a mobile station and may provide for this mobile station a communication service, meaning the serving base station serves the mobile station. A target base station may be a base station, which may be not connected with a mobile station, but may be a potential serving base station in case the mobile may perform a handover. A relay may be a relay ASN GW (Relay Access Service Network Gateway).

A relay ASN GW may be utilized in order to receive a message from a source apparatus and to send the same message to a target apparatus in order to forward this message to the target apparatus. In other words, a relay ASN GW may be used to relay a passed message in case no direct connection may exist between a source function element and a target function element. An anchor may be an anchor ASN GW (Anchor Access Service Network Gateway). An Anchor ASN GW may host a Anchor Data Path function during an handover procedure. An Authenticator ASN GW (Authenticator Access Service Network Gateway) may host an Authenticator function during an handover procedure. A combination of an anchor ASN GW and an Authenticator ASN GW may also be utilized as network apparatus.

According to an exemplary embodiment of the invention the sending device may be adapted to send a handover confirmation message, which handover confirmation message comprises at least one information selected from the group consisting of an a confirmation information, an urgent confirm information, an action time information, a time stamp information, a fast ranging mode information, an address information and a MAC address information.

An urgent confirm information may comprise an urgent confirm parameter. Furthermore, an urgent confirm information may comprise any information, which may initiate an action which may accelerate the handover procedure. An acceleration may be of interest, when an unexpected target base station may be detected. In particular, an urgent confirm information may comprise a parameter in a message which parameter may indicate an urgent situation. Such an urgent situation may occur when the mobile station sends a MOB_HO-IND message comprising a target base station as parameter, which target base station may be an unexpected target base station. In such a situation there may happen that the mobile station may be disconnected from the serving base station timely, for example for a long time, before the mobile station may be connected with the target base station, i.e. there may occur a service interruption time during the handover.

In case of an unprepared target base station, the mobile station may perform a "contention-based ranging" at the target base station for getting connected to the target base station. A contention-based ranging may lead to contention with other mobile stations, which may by chance try a network re-entry to the same target base station at the same time; in this case, the network entry attempt may fail and the mobile station may try again until the ranging finally succeeds. In contrast, a target base station, which has been prepared for accepting the handover from the mobile station, may offer an opportunity of "fast ranging" where the target base station offers an exclusive, reserved radio resource for the "ranging" procedure to be performed by the mobile station; in such "fast ranging", any collisions with other mobile stations may be excluded, so the network access may normally succeed immediately.

With an urgent confirm information the "unexpected" target base station may still be prepared for expecting the mobile station's network re-entry attempt. The target base station may offer a "fast ranging" opportunity to the mobile station, resulting in faster network re-entry than without the urgent confirm information.

The meaning of the "handover action time" may be as follows: The action time (AT) specifies the time when the mobile station may expect to receive a "Fast_Ranging-IE" (Fast Ranging Information Element) from a target base station to which the mobile station may perform a handover. In "normal" handovers, the target base station proposes such "action time", and delivers this information to the serving base station, which in turn informs the mobile station about it. However, this requires that the target base stations takes part in the handover preparation phase of the handover procedure.

If the target base station may be an "unexpected" one, meaning that the target base station did not take part in any handover preparation procedure for the mobile station, so the target base station did not determine a handover action time yet. However, it may still be possible that the target base station offers a fast ranging opportunity and sends out a "Fast_Ranging_IE" to the mobile station during network re-entry. For this purpose, an "urgent confirm information" may be utilized, which urgent confirm information may be sent from the serving base station to the target base station. The urgent confirm information may include an "action time", which the serving base station suggests to the target base station, e.g. to target base station T-BS C.

An action time information may be for example an information AT c or AT c' for a target base station, for example for T-BS C. The T-BS C may utilize the action time in order to prepare a handover of a mobile station. In other words, the "action time" parameter may be used for enabling a fast network re-entry at the target base station.

In the "normal" handover procedure, meaning where the target base station may be prepared in advance for the handover, the target base station may determine a handover action time information which may be then sent via the serving base station to the mobile station. After receiving an action time information, the mobile station may be prepared for a handover to the respective target base station, when receiving an action time which may be related to the respective target base station.

Receiving an action time at a mobile station may be comfortable in order to prepare the mobile station for a handover. In case the mobile station may select in fact a target base station from which the mobile station received an action time, then a handover may be performed without loosing time for exchanging further necessary information to provide a connection between the mobile station and the target base station, which may become a serving station for the mobile after the handover. However, if the mobile station may select a non-recommended or other substantially unprepared target base station, the mobile station may not know or may not have an "action time" value for this target base station at this moment. In this case, the "action time" may be determined by the service base station and may be included in the "urgent confirm information" to be sent from serving base station to the target base station. The mobile station may "guess" the approximate action time to be used by the selected target base station. In other words, the mobile station may use a heuristic or an estimation for selecting a target base station.

A time stamp information may be utilized in combination with an action time in order to prepare a handover, which may be a fast handover. A time stamp may be utilized in a "HO_Req" message, in a HO_Rsp message and also in a HO_Ack message.

Moreover, a time stamp information may be utilized in a HO_Cnf message. Furthermore, a time stamp may be utilized in a HO_Cnf message or in a HO_Ack message after a HO_Cnf may have been sent. This may include a time stamp in two-way HO_Cnf/HO_Ack transactions and also in two way HO_Complete/HO_Ack transactions.

In a handover confirmation message a fast ranging mode information may be utilized instead of a contention-based ranging or of a CDMA ranging (Code Division Multiple Access ranging). The contention-based ranging may use CDMA coding instead of the OFDMA coding (Orthogonal Frequency Division Multiple Access). OFDMA may be used for fast ranging and for normal radio connections. A CDMA ranging may be a contention-based ranging according to e.g. IEEE802.16 standard.

A fast ranging procedure may be performed independently of a BS_Controlled-HO flag which flag may be set or not set, since an unexpected target base selection may happen with or without a setting of the BS_Control-HO flag. A fast ranging mode information in a message may initiate a fast ranging procedure.

A fast ranging procedure may accelerate at least one step of a handover procedure. A fast ranging mode information in a handover confirmation message may prepare an unexpected target base station in a situation when it may happen that the mobile station may be interrupted in service during a handover procedure. A Fast_Ranging_IE may be sent to a target base station in order to indicate, that a MS_MAC_Address may be utilized for performing the handover.

The mobile station, in case the mobile station decides to include a non-recommended T-BS in its MOB_HO-IND message, may try to receive a "Fast_Ranging_IE" from that T-BS and for that purpose, the MS may allow sufficient time for the T-BS to send this Fast_Ranging_IE. Therefore the MS may not give up too fast, as long as this may be still faster than when trying to do a contention-based ranging.

This may be based on the assumption that the "urgent confirm information" in the backhaul, from SBS to the selected unprepared T-BS, might be slower than the time which the MS may take, after sending MOB_HO-IND, until it may be ready to start ranging at the T-BS. It might happen that the MS may be already ready for ranging at the T-BS, before the T-BS may receive the "urgent confirm information" from the S-BS. In this case, the T-BS may hurry up to accelerate sending out the Fast_Ranging_IE once the T-BS may get the "urgent confirm information" from the S-BS, and the MS may allow sufficient time for the T-BS to do so. This procedure may be faster than if the MS may conduct "contention based ranging". Thus, in a case an unexpected T-BS may be selected, the MS may take special behavior to acquire a better service quality.

According to an exemplary embodiment of the invention the sending device may be adapted to send an acknowledge message, which acknowledge message may comprise at least one information from the group consisting of a confirmation information, an urgent confirm information, an action time information, a time stamp information, a fast ranging mode information, an address information and a MAC address information.

The "urgent confirm information" may be sent, for example from the serving base station to the "unexpected" target base station, may include an identity of the mobile station, for example the MS MAC Address, which MAC Address may be a physical address of a network apparatus, wherein the MS MAC Address may be a physical address of the MS. As one example, the target base station may include this MS identity in the Fast_Ranging_IE, which the base station may send out at the radio interface for informing the mobile station about a fast ranging opportunity.

In handovers where the target base station may have been conducted in the HO preparation phase, a Handover Identifier (HO_ID) may be allocated during the preparation phase for this handover, and this may be used in the Fast_Ranging_IE as a signal for the mobile station in place of the full MS MAC address. However, in the case where the target base station may be unexpected, there might be no HO_ID assigned, so the target base station may use the MS identifier instead for labeling the Fast_Ranging_IE. This may prevent that the MS may get lost and that the MS may be disconnected. Therefore, a Fast_Ranging_IE may ensure a safe HO.

An acknowledge message, for example an HO_Ack message, comprising a fast ranging mode information may be utilized timely after sending an MOB_BSHO-RSP message from a serving base station to a mobile station. In the case a serving base station or a target base station, may have not send any information about an action time and/or about an HO_ID then this target base stations may be prepared for a handover in such a way that a fast ranging mode information may be sent to that target base station in an acknowledge message. Sending this fast ranging information may prepare the target base station for a handover without having sent additional information, such as a action time and/or an HO_ID timely before.

According to an exemplary embodiment of the invention a condition for a handover may be at least one condition selected from the group of conditions consisting of a signal to noise ratio, a service load, an interference, a strategy of the operator of the network, a preferred policy, a roaming agreement, a capability, in particular a capability of a target base station, a trigger event and a reject information.

These conditions may originate from the environment of the network apparatus, which may observe certain conditions in predetermined time intervals. Moreover, the conditions may occur as an event in one point in time, which may occur again or also as a single event without repetition.

According to an exemplary embodiment of the invention a method for a handover in a network may be provided. The method may comprise detecting a condition for a handover and selecting a first group, wherein the first group may comprise at least one first target apparatus member. Furthermore, the method may comprise selecting a first group, wherein the first group comprises at least one first target apparatus member. Moreover, the method may comprise receiving a second group, wherein the second group comprises at least one second target apparatus member. The method may further comprise determining a difference group of the first target apparatus members and the second target apparatus members and selecting at least one target apparatus member of the difference group. In addition, the method may comprise sending a preparation information to the at least one selected target apparatus member of the difference group.

In other words, a serving base station may compare, in case of MS-initiated HO, the set of T-BSs in the MOB_MSHO-REQ, for example group M or set M, with the set of T-BSs which the serving base station may recommend, for example group B or set B. The serving BS may determine the T-BSs in M which may be not in B, i.e. M\B ("M without B"). Assuming this set M\B includes T-BS1 and T-BS2, i.e. M\B={T-BS1, T-BS2}. Then the serving BS may select these two, or at least one of them, and may include this selection in the HO preparation phase such that they may be prepared for accepting the HO in case the MS may decide to perform a HO to at least one of these T-BSs, although the network may not recommend the selection. The network may be represented by the serving BS and or the T-BSs.

This may mean, the network may perform a handover preparation phase not only with those T-BSs which itself may consider adequate for accepting the MS, but also with one, more than one or all those T-BSs which the network, especially the BS, may see in the MOB_MSHO-REQ message received from the MS.

This method may be also utilized in or during an action phase of a HO. Furthermore, it may be also possible that the method may be performed in both the preparation phase of a HO and in the action phase of a HO. The method may be also performed at twice or more times for one HO.

In this context "preparing" may include sending one or more signals, in particular messages or information. Furthermore, "preparing" may include receiving one or more signals, in particular messages. In particular, preparing one or more target apparatus for a handover may include sending a handover request message, to receive a handover response message, to send a handover acknowledge message, to receive a handover acknowledge message, to send a handover confirmation message, to receive a handover confirmation message to send a handover indication message and/or to receive a handover indication message.

According to an exemplary embodiment of the invention the method may be performed in a handover preparation phase of a handover procedure.

A preparation phase may be initiated by a mobile station when a criteria for a handover may have been detected. In this case the mobile station may send a MOB_MSHO-REQ message, which MOB_MSHO-REQ message may be received by a network apparatus, for example a base station, which may be the serving base station of the mobile station. When a handover may be initiated by a mobile station, then the handover may be a MS initiated handover. A preparation phase of a handover may begin with receiving a MOB_MSHO-REQ message by a base station in the case of a MS initiated handover.

Furthermore, in a BS initiated HO, a preparation phase may be initiated by a base station. A base station may initiate a handover procedure when detecting a criteria for a handover.

In this context, the preparation phase of a handover may be described as follows. In the case of a handover, which may be initiated by a mobile station, meaning a MS initiated HO, the mobile station may send a MOB_MSHO-REQ message to networks, especially to one network apparatus. Then, the serving ASN (Access Service Network), in particular the serving base station, may perform handover preparation actions with one or more potential target ASNs, in particular with target base stations. The serving ASN may send a reply to the mobile station by sending a MOB_BSHO-RSP message. Then the handover preparation phase may be complete.

In the case of a handover, which may initiated by the network, meaning a network initiated HO, the serving ASN may perform handover preparation actions with one or more potential target ASNs and the serving ASN may send a MOB_BSHO-REQ message to the mobile station, then the HO preparation phase may be complete.

According to an exemplary embodiment of the invention the method may be performed in a handover action phase of a handover procedure.

An action phase may begin with sending and/or receiving an indication message, in particular a MOB_HO-IND message. In other words, sending a MOB_HO-IND message may represent the start of the handover action phase. The action phase may comprise a handover of a mobile station to a selected and prepared target base station.

According to an exemplary embodiment of the invention a computer readable medium may be provided, which may comprise program code, which program code when executed on a processor may be adapted to carry out at least one method according to the invention.

A computer readable medium may be a floppy disk, a hard disk, an USB (Universal Serial Bus) storage device, a RAM (Random Access Memory), a ROM (Read Only Memory) or an EPROM (Erasable Programmable Read Only Memory). A computer readable medium may also be a data communication network, e.g. the Internet, which may allow downloading a program code.

According to an exemplary embodiment of the invention a use of a handover acknowledge message for transporting least one parameter selected from the group of parameters consisting of an information related to an unexpected network apparatus, fast ranging mode information, a confirm information, an urgent confirm information, an action time information and a time stamp information.

The fast ranging mode information may comprise an address information. An address parameter as an information may be in particular a MAC address parameter. A fast ranging mode parameter may be utilized in a handover confirmation message. Furthermore, an urgent confirmation parameter may be utilized in a handover confirmation message. An action time parameter may be utilized in a MOB_BSHO-RSP message. For example when T-BS may receive an "urgent confirm information" HO_Cnf message from S-BS, the T-BS may know that there may be no HO_ID assigned yet, so the T-BS may use the MS MAC address instead. Further explanations concerning an handover acknowledge message (HO Ack message) may be given below.

According to an exemplary embodiment of the invention a use of a handover confirmation message for transporting at least one parameter selected from the group of parameters consisting of an information related to an unexpected network apparatus, a confirm information, an urgent confirm information, an action time information, a time stamp information and a fast ranging mode information.

An urgent confirm parameter may be utilized in a handover confirmation message (HO Cnf message) and also in a handover acknowledge message. In other words, a HO_Ack message may be used for exchanging an urgent confirm parameter.

It has also to be noted that exemplary embodiments of the present invention and aspects of the invention have been described with reference to different subject-matters. In particular, some embodiments have been described with reference to apparatus type claims whereas other embodiments have been described with reference to method type claims and use type claims.

However, a person skilled in the art may gather from the above and the following description that unless other notified in addition to any combination between features belonging to one type of subject-matter also any combination between features relating to different subject-matters in particular between features of the apparatus claims and the features of the method claims may be considered to be disclosed with this application.

It may be an idea of the invention to prepare a network apparatus for a handover in such a way that a further network apparatus, in particular a mobile station, may perform a running service, for example a telephone call, without recognition by the mobile station that a handover from a serving base station to an other service base station may be performed. A preparation for a HO may be performed in a HO preparation phase and/or in a HO action phase. One or a plurality of preparation information may be sent or exchanged between the network apparatuses, including the mobile station.

The preparation information may be transmitted in a confirmation message. Moreover, the information may be transmitted in an acknowledgment message. It may be provided that any information which may be given to one or more T-BSs during a HO preparation phase may also be sent to a T-BS, which may be an unprepared T-BS at the beginning of the HO_action phase. Thus the selected T-BS at the beginning of the HO action phase, for example selected by the MS and sent for example by the MS in an MOB_HO-IND message, may receive as an unexpected target base station further information, which other T-BS, prepared in the preparation phase may have received already. Moreover, the preparation information may comprise a specific indication or information in order to inform the unexpected T-BS that the MS may not be aware of a HO-ID (Handover Identification) of the unexpected T-BS. Furthermore, the preparation information may comprise a specific indication or information in order to inform the unexpected T-BS that the MS may not be aware of an action time of the unexpected T-BS. As an exemplary embodiment, a HO_Cnf message may comprise the preparation information.

These and other aspects of the present invention will become apparent from and elucidated with reference to the embodiments described hereinafter.

Exemplary embodiments of the present invention will be described in the following with reference to the following drawings.

BRIEF DESCRIPTION OF THE DRAWINGS

FIG. 5 shows an exemplary embodiment of a fourth message flow diagram for a handover, which may occur in a network.

FIG. 8 shows an exemplary embodiment of a seventh message flow diagram for a handover, which may occur in a network.

FIG. 9 shows an exemplary embodiment of an eighth message flow diagram for a handover, which may occur in a network.

FIG. 10 shows an exemplary embodiment of a ninth message flow diagram for a handover, which may occur in a network.

DETAILED DESCRIPTION

Figure 1A:
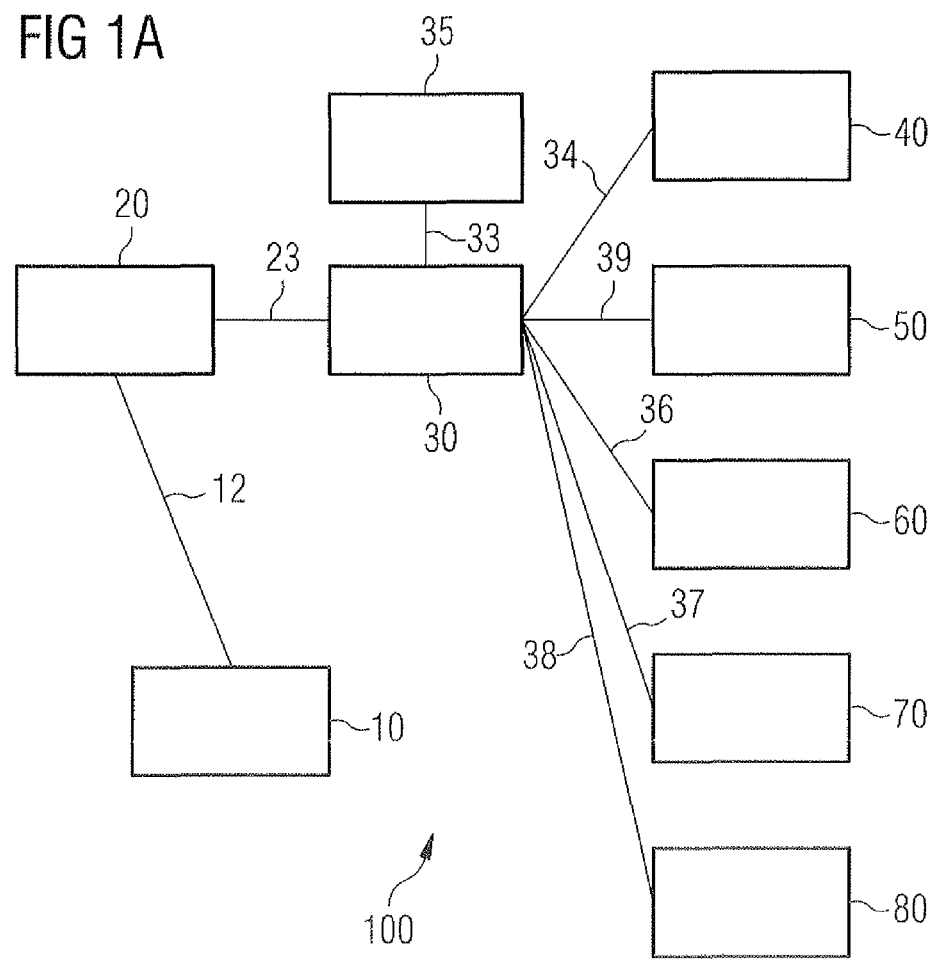
FIG. 1a shows an exemplary embodiment of a network, in particular a telecommunication network.

The illustration in the drawings may be schematic. In different drawings, similar or identical elements may be provided with the same reference numerals.

It may be understood that also further information not shown in the message flow diagrams may be sent between the respective network apparatuses.

The invention may provide a solution for the HO preparation phase and also a solution for the HO action phase. The solution for the HO preparation phase may be applied for MS-initiated HO, and may be based on including at least one, more than one or all the T-BSs which the MS suggested in the HO preparation phase. The solution for the HO action phase, which action phase may start with a MOB_HO-IND message, may be applicable for both MS and BS-initiated HO, and the S-BS may use the information in the MOB_HO-IND message for an urgent "last minute" preparation of the unexpected target base station, to avoid that the T-BS may be unprepared when the MS arrives at that T-BS.

The invention may provide measures in order to prepare a network apparatus, in particular a target base station, for a handover, although this target base station may be not suggested by a further network apparatus, in particular the serving base station.

FIG. 1a shows an exemplary embodiment of a network 100, in particular a telecommunication network. The network 100 may comprise a mobile station 10 (MS), in particular a mobile station apparatus, a serving base station 20 (S-BS), in particular a serving base station apparatus, a relay 30, which may be a relay ASN GW, in particular a relay ASN GW apparatus and an anchor 35, in particular an Anch/Authen ASN GW.

The network of FIG. 1a may further comprise a first target base station 40 (T-BS A), which may be in particular a first target base station apparatus, a second target base station 50 (T-BS B), which may be in particular a second base station apparatus, a third target base station 60 (T-BS C), which may be in particular a third target base station apparatus, a fourth target base station 70 (T-BS D), which may be in particular a fourth target base station apparatus and a fifth target base station 80 (T-BS E), which may be in particular a fifth target base station apparatus.

The mobile station 10 may be connected with the serving base station 20 by a wireless communication first connection 12. The serving base station 20 may be connected with the relay 30 by a second connection 23. The relay 30 may be connected with the anchor 35 by a third connection 33. The relay may be also connected with the first target base station 40 by a fourth connection 34, with the second target base station 50 by a fifth connection 39, with the third target base station by a sixth connection 36, with the fourth target base station 70 by a seventh connection 37 and with the fifth target base station 80 by a eighth connection 38. Over the respective connections 12, 23, 33, 34, 39, 36, 37 and 38 information may be exchanged by sending signals, wherein the signals may comprise messages, information or parameters. The messages may comprise one or a plurality of parameter elements, respectively. Parameter elements may be for example member of the first group or member of the second group, handover parameters, i.e. an action time or an handover ID (Handover Identity).

Figure 1B:
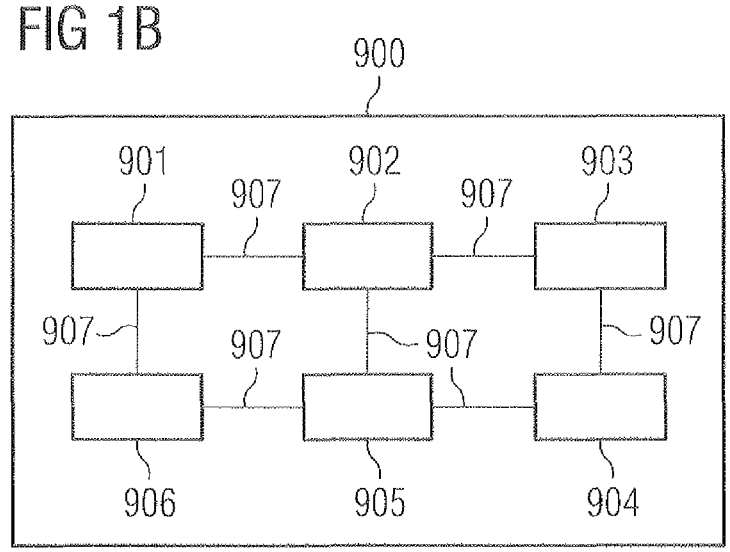
FIG. 1b shows a network apparatus according to an exemplary embodiment of the present invention.

FIG. 1b shows a network apparatus 900 according to an exemplary embodiment of the present invention. The network apparatus 900 may be any apparatus of the network 100, in particular the network apparatus may be the mobile station 10, the serving base station 20, the relay 30, the anchor 35, the first target base station 40, the second target base station 50, the third target base station 60, the fourth target base station 70 and/or the fifth target base station 80 of FIG. 1a.

The network apparatus 900 may comprise a receiving device 901, a detecting device 902, a comparing device 903, a determination device 904, a selecting device 905 and a sending device 906. The detecting device 902 may be adapted to detect a condition for a handover. The selecting device 905 may be adapted to select a first group, wherein the first group may comprise first target apparatuses. The receiving device 901 may be adapted to receive a second group, wherein the second group may comprise second target apparatuses. The comparing device 903 may be adapted to compare the first target apparatuses with the second target apparatuses. Furthermore, the comparing device 903 may be adapted to compare different handover criteria.

The determining device 904 may be adapted to determine a difference group of target apparatuses of the first group of first target apparatuses and the second group of second target apparatuses. The selecting device 905 may be adapted to select at least one target apparatus such that the selected target apparatus may be a member of the difference group. The sending device 906 may be adapted to send information to the selected at least one target apparatus of the difference group. All devices 901, 902, 903, 904, 905, 906 may communicate over one or more communication connections 907 to each other, which may be only schematically shown in FIG. 1*b*, wherein further communication connections not shown in FIG. 1*b* may exist between the devices.

FIGS. 2 to 11 show message flow diagrams for performing a handover in different scenarios. The FIGS. 3 to 11 are split in two parts, in part A and part B.

In these message flow diagrams arrows may be shown, wherein an arrow head may indicate the direction of the message flow, respectively. In other words, the arrow head may indicate a message direction or a message flow sent by a sending device to a receiving device in the direction of the arrow. The respective message may be sent over air or over cable from one network apparatus to an other network apparatus. Furthermore, in the message flow diagrams the end of the arrow, meaning the part without any arrow head, may indicate the starting point of the message, meaning the sending device of a network apparatus from which the message may originate. Furthermore, in each message flow diagram a time pattern may be indicated. This may be done by arranging the arrows of the messages one after the other. A first arrow for example at the top of the message flow diagram may be sent timely before a message indicated by an arrow at an lower position compared to the first arrow. Furthermore, a trigger event positioned above an arrow may take place timely before a message indicated with an arrow may be positioned below a trigger event box.

Furthermore, all message flow diagrams of FIG. 2 to FIG. 11 show at the top several network apparatuses and a vertical line originating from one respective network apparatus. An arrow between a first vertical line of a first network apparatus and a second vertical line of a second network apparatus indicates, that a message may be sent in the direction of the arrow head from the first network apparatus, where the arrow end may originate towards the second network apparatus, where the arrow head may be positioned.

In all message flow diagrams of FIGS. 2 to 11 it may be assumed, that a message sent by a first network apparatus may be received by a second network apparatus and no message or no part of a message may be lost.

Figure 2:
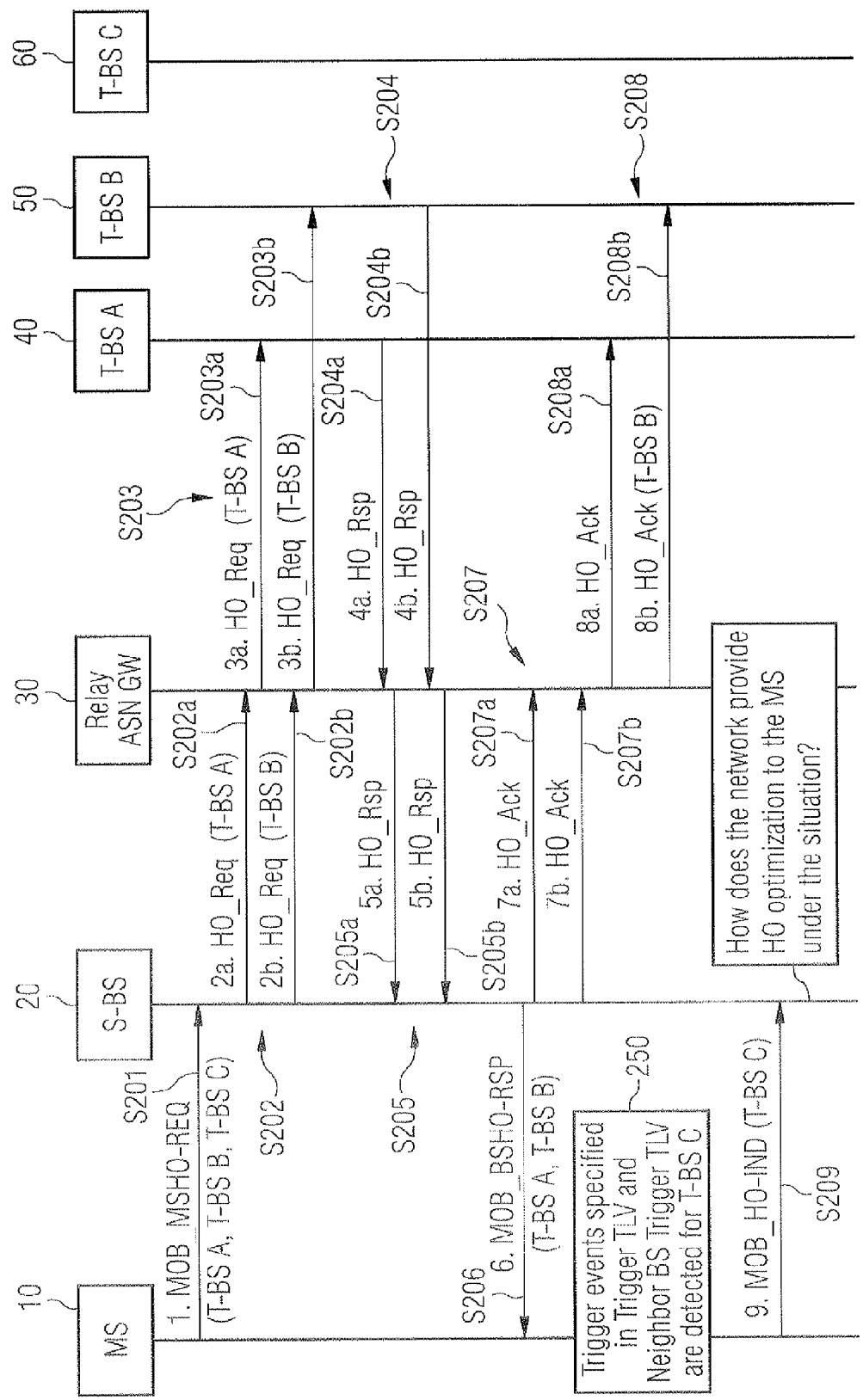
FIG. 2 shows an exemplary embodiment of a first message flow diagram for a handover, which may occur in a network.

FIG. 2 shows a message flow diagram for performing a handover, which may occur in the network 100 shown in FIG. 1*a*, which may be in particular a communication network.

In a step S201 the mobile station 10 may send a first signal to the serving base station apparatus 20. This first request signal may be a request message, in particular a MOB_M-SHO_REQ message, which may comprise several target base stations as parameter. In FIG. 2 these parameters may be selected base stations T-BS A, T-BS B and T-BS C, meaning the first target base station 40, the second target base station 50 and the third target base station 60 may be selected by the mobile station 10 in this example of FIG. 2.

FIG. 2 shows an MS-initiated handover since the first message of step S201 may be sent by the mobile station. There may be also the possibility of a BS-initiated HO: This may be similar to the MS-initiated HO, however message 5201 may be missing, and message 5206 may be called MOB_BSHO-REQ instead of MOB_BSHO-RSP. The rest of the figure may be the same for MS-initiated and for BS-initiated HO.

The mobile station 10 and the serving base station 20 may have different criteria to select one or more target base stations. In the present example of FIG. 2 the mobile station 10 may select according to a first criteria the first target base station 40, the second target base station 50 and the third target base station 60. However, the serving base station 20 may select target base stations according to a second criteria. Upon the second criteria the serving base station may select the first target base station 40, the second target base station 50.

The serving base station 20 may send a signal, in particular a handover request message, to the relay 30 in a step S202. The step S202 may comprise sending a plurality of signals from the serving base station 20 to the relay 30. Step S202 may comprise sending and receiving two signals, comprising a first handover request signal in step S202*a* and a second handover request signal in step S202*b*. These handover signals of step S202*a* and S202*b* may comprise a handover request message, in particular a HO_Req message, respectively. Each of the handover request message of step S202 may comprise a parameter of the selected target base station, respectively, which target base stations may be selected by the mobile station 10.

In the present example the first target base station 40 (T-BS A) and the second target base station 50 (T-BS B) may have been selected by the mobile station 20 and may appear as parameter in the request message of step S202. In step S202*a* a message HO_Req (T-BS A) may be sent by the serving base station 20 to the first target base station 40, wherein T-BS A may be a parameter of the message in step S202*a*. In step S202*b* message HO_Req (T-BS B) may be sent by the serving base station 20 to the second target base station 50, wherein T-BS B may be a parameter of the message in step S202*b*.

In other words, the serving base station 20 may forward in step S202 the selection of the mobile station comprising T-BS A and T-BS B. The selection of T-BS C, selected by the mobile station 10 may be not forwarded in step S202. Moreover, the serving base station 20 may select further target base stations in addition to the selected target base stations, which may have been selected by the mobile station 10.

In FIG. 2 the handover messages may comprise a selection of the first target base station and the handover message comprising a selection of the second target base station and may be sent to the respective first target base 40 and second target base station 50, respectively in step S202*a* and step S202*b*. The signals of step S202 may be sent over the relay 30 before they may arrive at the respective target base stations 40 and 50, i.e. at target base stations T-BS A and T-BS B.

In a step S203, which may comprise steps S203*a*, S203*b* and S203*c* the relay 30 may send a handover request signal to the first target base station 40, to the second target base station 50, respectively. These signals sent from the relay 30 to the target base stations 40, 50 may be in particular HO_Req (T-BS A) and HO_Req (T-BS B), wherein message HO_Req (T-BS A) may arrive at the first target base station 40 and message HO_Req (T-BS B) may arrive at the second target base station 50.

The first target base station 40 and the second target base station 50 may send in a step S204 a signal to the relay 30, respectively. The signals may be handover response message, respectively, in particular a HO_Resp.

The handover response messages of the target base stations 40, 50 of step S204 may be forwarded by the relay 30 to the serving base station 20 in a step S205. Therefore the relay 30 may send a handover message to the serving base station in step S205, wherein in step S205 may comprise steps S205*a* and S205*b*. The signals of step S205 may comprise a HO_Rsp message sent by the relay 30 and received by the serving base station 20, respectively.

After having received the two handover responses from the relay 30, the serving base station 20 may send a signal to the mobile station 10 in a step S206. The signal of step S206 may comprise a response message, in particular a MOB_B-SHO_RSP message. This message may comprise the target base stations T-BS A and T-BS B as parameters. In the message of step S206 the serving base station 10 may confirm in the response message that the first target base station 40 and the second target base station 50 may be prepared for a handover of the mobile station 10.

In the exemplary situation of FIG. 2 a trigger event may occur, which trigger event or trigger events may be specified in trigger TLV (TLV: time length value) and neighbor BS trigger TLV. The trigger event may be schematically shown in FIG. 2 as reference sign 250. In the present example of FIG. 2 the trigger 250 event may be detected for the third target base station 60 (T-BS C). In other words, the third target base station 60 may be selected by the trigger event 250 for a handover of the mobile station 10, which may be indicated by the mobile station 10.

In a step S207 the serving base station 20 may send a signal over the relay 30 to the first target base station 40 and the second target base station 50, respectively. The signals sent from the serving base station 20 to the target base stations 40, 50, 70 may be a handover acknowledge message. Thus, step S207 may comprise sending two signals in steps S207a and S207b. In step S207a an acknowledge message, in particular a HO_Ack message, may be sent from the serving base station 20 to the relay 30. In step S207b a further acknowledge message, in particular a HO_Ack message, may be sent from the serving base station 20 to the relay 30.

In a step S208 the relay may send a signal to the first target base station 40 and the second target base station 50, respectively. Therefore, step S208 may comprise steps S208a and S208b. In step S208a an acknowledge message, in particular a HO_Ack message, may be sent from the relay 30 to the first target base station 40. In step S208b a further acknowledge message, in particular a HO_Ack message, may be sent from the relay to the second target base station 50.

After having performed the steps S201 to S208 in FIG. 2 the first target base station 40 and the second target base station 50, respectively, i.e. T-BS A, T-BS B and T-BS C, may be prepared in order to be able to connect the mobile station 10 in a handover.

In step S209 the mobile station 10 may send a signal to the serving base station 20. This signal which may comprise an indication message, in particular a MOB_HO-IND message. In this message the mobile station may indicate to perform a handover to the third base station 60, i.e. T-BS C. This selection of the third base station 70 may be based on the trigger event 250, which took place timely before performing step S209. In the MOB_HO-IND message, the mobile station 10 may include the HO_IND-Type parameter set to value 00, meaning "Serving BS release" which may mean that the mobile station might leave the S-BS and might not wait for another message to be received from S-BS before starting network re-entry at target network apparatus TBS-C.

In other words, FIG. 2 shows an unexpected T-BS selection by the MS under network control. In the HO preparation phase, T-BS A and T-BS B may be selected as the candidate target BS as indicated in MOB_BSHO-RSP/REQ message. However due to a specified trigger TLV or Neighbour BS trigger TLV, which may occur, the MS may select target base station T-BS C and the MS may indicate this selection in the MOB_HO_IND message to the serving BS.

FIG. 2 may also indicate, how to ensure that the MS may perform a handover to the T-BS C, although the T-BS C may not be prepared for this HO yet, because the T-BS C may not have been involved in steps S202, S203, S204, S205, S207 and S208 in the exemplary embodiment of FIG. 2. In this exemplary embodiment the T-BS C may be an unexpected target base station.

Figure 3B:
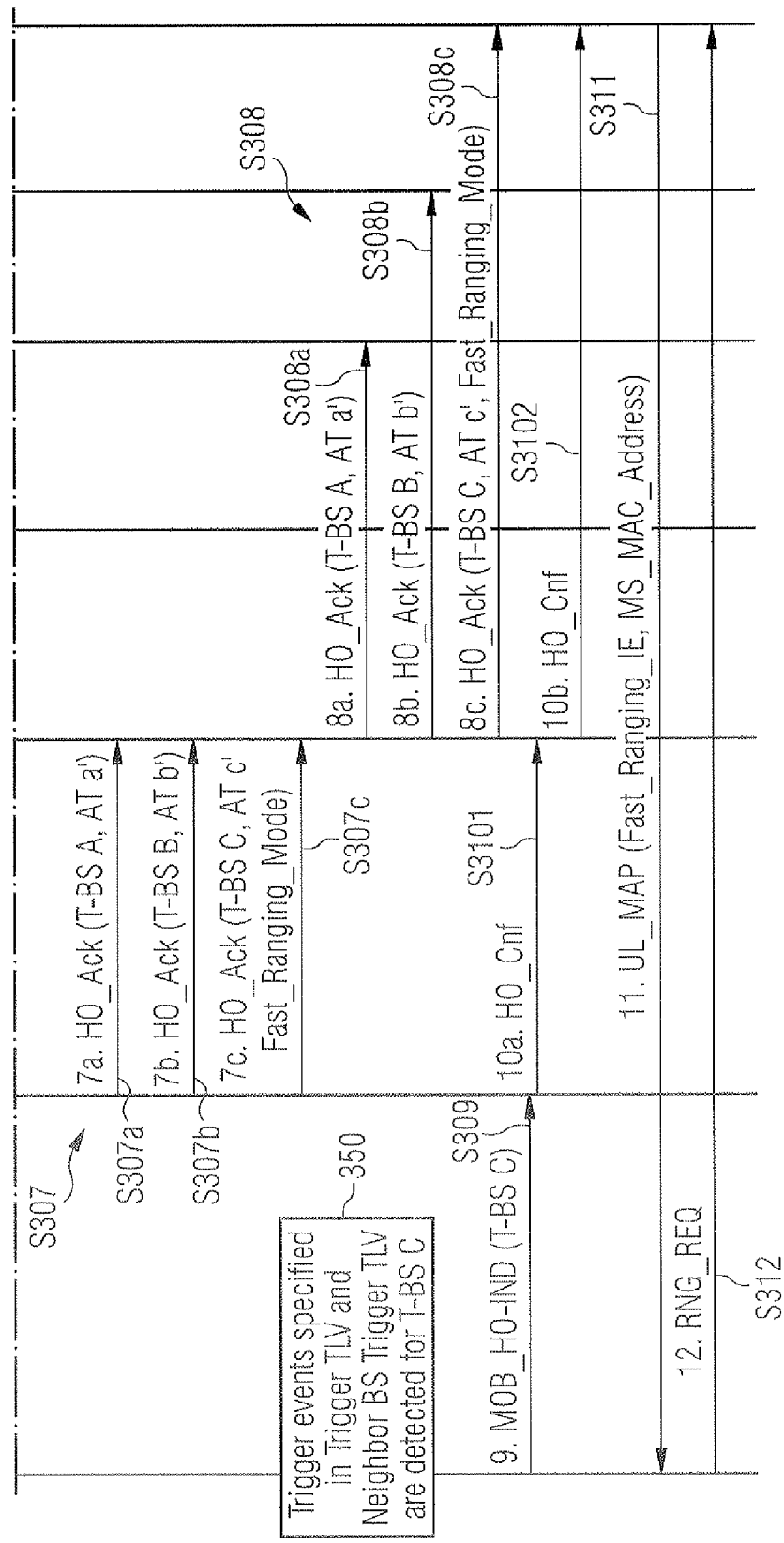
FIG. 3 shows an exemplary embodiment of a second message flow diagram, which may occur in a network.

FIG. 3 shows a second message flow diagram comprising a handover during a handover preparation phase according to an exemplary embodiment of the invention.

The network 100 in FIG. 3 may comprise a mobile station 10, a serving base station 20, a relay 30, an anchor 35, a first target base station 40, a second target base station 50 and a third target base station 60. The network of FIG. 3 may be similar to the network shown in FIG. 1a, which may be in particular a communication network.

In a step S301 the mobile station 10 may send a signal to the serving base station 20. This signal may be a request message, in particular a MOB_MSHO_REQ message, which may comprise one or more target base stations as parameter. In FIG. 3 these parameters may be selected base stations T-BS A, T-BS B and T-BS C, meaning the first target base station 40, the second target base station 50 and the third target base station 60 may be selected for a handover by the mobile station 10 in this example of FIG. 3. Thus, the handover may be mobile station initiated.

In other words, the MS may initiate in step S301 the HO process by sending a MOB_MSHO-REQ message to the serving BS, wherein the MS may indicate in the message the potential target BS (T-BS A, T-BS B, T-BS C).

In a further step S301b, which may be an optional step, a context retrieval procedure may be provided, which may be performed by a communication between the serving base station 20 and the anchor 35.

The S-BS may initiate a context retrieval procedure immediately in step S301b, it may also be possible to perform such a procedure later in time.

The mobile station 10 and the serving base station 20 may have different criteria to select one or more target base stations 40, 50, 60. In the present example of FIG. 3 the mobile station 10 may select the first target base station 40, the second target base station 50 and the third target base station 60 according to a first criteria. The serving base station 20 may select one or more target base stations 40, 50, 60 according to a second criteria.

Based on the second criteria the serving base station 20 may select the first target base station 40 and the second target base station 50 for a handover of the mobile station 10. Thus, the serving base station 20 may send a signal, in particular a handover request signal to the relay 30 in a step S302. The step S302 may comprise sending a plurality of signals from the serving base station 20 to the relay 30. In FIG. 3 in step S302 three signals may be sent, comprising a first handover request signal in step S302a, a second handover request signal in step S302b and a third request handover request signal in step S302c.

The handover signals of step S302a, S302b, S302c may comprise a handover request message, in particular a HO_Req message, respectively. Each of the handover request messages of step S302 may comprise a parameter of a selected target base station, respectively, which target base stations may be selected by mobile station 10. In the present example of FIG. 3 the first target base station 40 (T-BS A), the second target base station 50 (T-BS B) and the third target base station 60 (T-BS C) may have been selected by the mobile station 20 and may appear as parameter in the request message of step S302.

In this example T-BS A and T-BS B may be selected by the MS and also by he S-BS. T-BS C may be selected only by the MS. Therefore T-BS C may be a member of the difference group.

In step S302a a message HO_Req (T-BS A) may be sent by the serving base station 20 to the first target base station 40, wherein T-BS A may be a parameter of the message in step 302a. In step S302b a message HO_Req (T-BS B) may be sent by the serving base station 20 to the second target base station 50, wherein T-BS B may be a parameter of the message in step S302b. In step S302c a message HO_Req (T-BS C) may be sent by the serving base station 20 to the third target base station 60, wherein T-BS C may be a parameter of the message in step S302c.

In other words, the serving base station 20 may send a signal to all selected target base stations, selected by the mobile station 10. In addition, the serving base station 20 may send one or more signals to further target base stations, selected by the serving base station 20. In FIG. 3 T-BS A and T-BS B may have been selected by the mobile station 10 based on a second criteria. The target base stations T-BS A, T-BS B and T-BS C may have been also selected by the serving base station 20 based on a first criteria. The serving base station 20 may send a signal in step S302 to all selected target base stations, which may have been selected upon the first criteria and independently selected by the second criteria.

In step S302 the serving BS may check if a control flag may be set, in particular if BS_Controlled_HO may be set. If this flag may be set, the serving BS may send a request message, in particular a R6 HO_Req message, to all the T-BSs included in the MOB_MSHO-REQ messages and to those T-BSs selected by S-BS. If the control flag may be not set, the S-BS may send the HO_Req to the T-BSs selected by network FIG. 3 shows a situation where the BS_controlled HO flag may be not set. However according to a second criteria of S-BS also T-BS A and T-BS B may have been selected by the S-BS. The target base stations T-BS A, T-BS B and T-BS C may be prepared by the S-BS, wherein the T-BS C may be a member of the difference group and wherein the S-BS determined to prepare also the T-BS C.

The signals of step 302 to the respective selected target base stations 40, 50 and 60 may be sent by the serving base station 20 to the relay 30, which relay 30 may forward the received signals to the corresponding target base station, corresponding to the target base station parameter in the request message. In a step S303 the relay 30 may send three signals to the respective target base stations 40, 50 and 60. Therefore step S303 may comprise steps 303a, 303b and 303c. In step 303a the relay 30 may send a signal, which may be a request signal, in particular a HO_Req (T-BS A) to the first target base station 40. In addition, the relay 30 may send a signal, which may be a request signal, in particular a HO_Req (T-BS B) to the second target base station 50 in step 303b. Moreover, the relay 30 may send a signal, which may be a request signal, in particular a HO_Req (T-BS D) to the third target base station 60 in step 303c.

In a step S304, which may comprise steps S304a, S304b and S304c, the first target base station 40, the second target base station 50 and the third target base station 60, may send a signal, in particular a handover response message to the relay 30, respectively. These signals sent from the respective target base stations 40, 50 and 60 may be in particular the messages HO_Rsp (AT a), HO_Rsp (AT b), and HO_Rsp (AT c). Message HO_Rsp (AT a) may be sent by the first target base station 40, message HO Rsp (AT b) may be sent by the second target base station 50 and message HO Rsp (AT c) may be sent by the third target base station 60.

The signals of step S304, in particular the handover response messages of the target base stations of step S304 may be forwarded by the relay 30 to the serving base station 20 in a step S305. Therefore the relay 30 may send signals, in particular handover messages to the serving base station 20 in step 305, wherein step S305 may comprise steps S305a, S30b and S305c. The signals of step S305 may comprise a HO_Rsp sent by the relay 30 and received by the serving base station 20, respectively. Therefore the serving base station may receive HO_Rsp (AT a), HO_Rsp (AT b) and HO_Rsp (AT c) in step S305.

After having received the three handover responses from the relay 30, the serving base station 20 may send a signal to the mobile station 10 in a step S306. The signal of step S306 may comprise a response message, in particular a MOB_B-SHO_RSP message. This message may comprise the parameters T-BS A, AT a' and T-BS B, AT b' as parameters. (AT: Action Time, parameter a or parameter a': Action Time of T-BS A)

In the response message of step S306 the serving base station 10 may confirm to the mobile station 10 that the first target base station 40 and the second target base station 50 may be prepared for a handover of the mobile station 10.

The response message of step S306 may not comprise a parameter like T-BS C, AT c', since the serving ASN, i.e. the serving base station 20 did not select the target base station T-BS C before in step S302. The MOB_BSHO-RSP message may comprise target base stations, which may have been selected by the network, in this case by the serving base station 20 in step S302. Thus, T-BS C may not be listed in the MOB_BSHO-RSP. Moreover, the base station 20 may send in a further step S307 a Fast_Ranging_Mode information to one or more target base stations, which T-BSs may not be mentioned in the MOB_BSHO-RSP, but selected before by the mobile station 10, wherein in FIG. 3 this selection took place in step S301. This may mean that a further selection by the S-BS may take place before sending the message of step S306 and after receiving the messages of step S305. An other selection by the MS as may be seen below may take place after having received a trigger event 350 and before sending a message in step S309.

In step S307 the serving base station 20 may send a signal over the relay 30 to the first target base station 40 and the second target base station 50 and the third target base station 60, respectively. The signals sent from the serving base station 20 to the target base stations 40, 50, 60 may be a handover acknowledge message. Thus, step 307 may comprise sending three signals in steps S307a, S307b and S307c. In step S307a an acknowledge message, in particular a HO_Ack message with parameter T-BS A, AT a', may be sent from the serving base station 20 to the relay 30. In step 307b a further acknowledge message, in particular a HO_Ack message with parameter T-BS B, AT b' may be sent from the serving base station 20 to the relay 30. In step S307c a further acknowledge message, in particular a HO_Ack message may be sent from the serving base station 20 to the relay 30. This acknowledge message of step S307c may comprise as parameter T-BS C, AT c' and in addition a parameter Fast_Ranging_Mode parameter.

The Fast_Ranging_Mode parameter may be included in the message of step S307c, because, the mobile station 10 may handover to the unselected target base station 60 (T-BS C).

The decision to send a Fast_Ranging_Mode information in step S307c may be made by the BS, because the S-BS may remember from step S301 that T-BS C was selected by the MS but not selected by S-BS in step S302. Moreover a Fast_Ranging_Mode may be sent in step S307, because the S-BS may not send a T-BS C, AT c' information in the MOB_B-SHO-RSP.

The target base station 60 (T-BS C) was selected by the mobile station 10 in step S301. The HO_Rsp message from the T-BS C in steps S304c and S305c may comprise an optional parameter HO-ID, meaning a handover identification parameter. The fast ranging information element, meaning the Fast_Ranging_IE, may be used to inform the T-BS C that a HO ID may not be used for the handover. Instead of the HO ID a MAC address, in particular the MS MAC address may be used timely later in the a fast ranging procedure. In other words, since the HO ID may be not informed to the MS in step S306, the Fast_Ranging_Mode in step S307 may be used to inform the T-BS C that HO ID may not be used, but a MS MAC address may be used.

In the message flow diagrams of FIGS. 2 to 11 the HO_Rsp messages may comprise an Action Time (AT) information, respectively. Furthermore, in the message flow diagrams of FIGS. 2 to 11 the HO_Rsp messages may comprise a HO_ID information, respectively, which is not shown.

This parameter of Fast_Ranging_Mode may be utilized in order to prepare the third target base station 60 for a handover, since the third target base station 60 was not prepared by the serving base station 20 for a handover before, due to the decision made timely between receiving the MOB_HSHO-Req message in step S301 and sending HO_Req messages in step S302. For the already prepared target base stations T-BS A and T-BS B such a Fast_Ranging_Mode parameter may sometimes not be utilized, because the serving base station 20 may have already informed the fast ranging mode preferred by the target base station, respectively. The preferred fast ranging mode may be sent in a MOB_BSHO-RSP message. So the MS may take corresponding actions as required. Since the T-BS C did not inform the MS, the MS may only perform actions, which may be not based on specific information of the T-BS C. The T-BS C may have to be informed to use a mode, which may be indicated by parameters, such as a fast ranging mode parameter.

A Fast_Ranging_Mode may be used because some target BSs, in the example of FIG. 3 it may be T-BS C, may be prepared but not informed to the MS, because, the T-BS may not be preferred by network. Thus, the T-BS C may send a signal including an optional HO ID parameter in HO_Rsp message but the HO ID may not be informed to the MS. Therefore, the MS may not know HO ID. In order to perform a handover the MAC address may be used for Fast Ranging. Utilizing the Mac address may be suitable in order to avoid an inconsistency between the information present at the T-BS C and the information present at the MS. The T-BS C may be informed to use the MAC address also for fast ranging.

In other words, in step S307 the S-BS may send a HO_Ack message to all the potential T-BS selected before. Especially, in case the HO_IND may be included in the HO_Rsp from the T-BS indicated by MS but not preferred by networks, in the present example of FIG. 3 it may be T-BS C, the HO_Ack message may include a TLV Fast_Ranging_Mode to inform the T-BS that MS MAC address instead of HO_ID may be used to provide a handover, in particular an optimized HO.

In the exemplary situation of FIG. 3 a trigger event occurs, which trigger event or trigger events may be specified in trigger TLV and neighbour BS trigger TLV. The trigger event may be schematically shown in FIG. 3 as reference sign 350. In the present example of FIG. 3 the trigger 350 event may be detected for the third target base station 60 (T-BS C). In other words, the third target base station 60 may be selected by the trigger event 350 for a handover of the mobile station 10, which may be indicated by the mobile station 10 in a signal sent to the serving base station 20 in a step S309.

In a step S308 the relay 30 may send a signal to the first target base station 40, the second target base station 50 and the third target base station 60, respectively. Therefore step S308 may comprise steps S308a, S308b and S308c. In other words, the relay ASN GW may relay the HO_Ack message to the T-BS.

In step S308a an acknowledge message, in particular a HO_Ack message, may be sent from the relay 30 to the first target base station 40. In step S308b a further acknowledge message, in particular a HO_Ack message, may be sent from the relay to the second target base station 50. In step S308c a further acknowledge message, in particular a HO_Ack message, may be sent from the relay to the third target base station 60.

After having performed the steps S301 to S308 in FIG. 3 the first target base stations 40, the second target base station and the third target base station 60, respectively, meaning T-BS A, T-BS B and T-BS C, may be prepared in order to be able to connect the mobile station 10 in a handover.

In step S309 the mobile station 10 may send a signal to the serving base station 20. This signal may be an indication message, in particular a MOB_HO_IND message. In other words, the MS may send a MOB_HO-IND message to the S-BS. The mobile station 10 may indicate to perform a handover to the third base station 60, meaning T-BS C as parameter of the MOB_HO_IND message of step S309. This selection of the third base station 60 may be based on the trigger event 350, which took place timely before performing step S309 and which trigger event may be received by the MS, although a HO_control flag may be not set or since the MS changed in the meantime the setting of the HO_control flag from not set to set.

In a step S3101 and in a step S30102 a HO_Cnf message may be sent from the S-BS to the selected target base station T-BS C over the relay 30.

In an optional step S3103 in FIG. 3 (not shown), timely after step S308 and timely before step S311, the serving base station 20 may send a signal to the mobile station 10. This signal may be a response message, in particular a MOB_HO-RSP with T-BS C, AT c' as parameters. The "MOB_HO-RSP" may be a radio interface message, which may be recognized by the MS, although the MS already may have sent a MOB_HO-IND with value 0b00 in step S309.

In steps S311 and S312 the HO may be finalized by sending UL_MAP message from the T-BS to the MS directly and by sending a RNG_REQ message from the MS to the T-BS, which becomes a S-BS for the MS. These two steps S311 and S312 may be performed also in the other following figures, FIG. 4 to FIG. 11, without being shown.

The term "directly" may be understood as sending a signal in a direct communication connection, which may not include a path over a further network apparatus, meaning not a way over the relay 30 or the serving base station 20 in this example of FIG. 3. In other words, sending a signal directly may comprise a direct connection between the T-BS, i.e. the T-BS C and the MS.

In other words, upon receiving the MOB_HO-IND from the MS and in the case an unexpected T-BS may be selected, the network may determine if a handover, in particular an optimized HO, may be provided according to one or more certain considerations. For example, a flag may be set or may be not set, in particular a BS_Controlled_HO flag may be set or not set. In case a handover, in particular an optimized HO, may be provided, the S-BS may send a MOB_HO-RSP message to the MS to inform the MS. Furthermore, an Action time TLV may be included in a message, in particular in the MOB_HO-RSP message.

In FIG. 3 the serving base station performs the handover as follows: In FIG. 3 it may be assumed that T-BS C may be selected by the mobile station 10 but not selected by network, in particular not selected by the base station 20. Profile C ASN may be used. A profile A ASN may also be used. The detecting device of the serving base station 20 may be adapted to detect a condition for a handover. In this example the serving base station 20 may receive a MOB_MSHO-REQ message sent from the mobile station 10. The selecting device of the serving base station may select a first group of first target apparatuses, which may be T-BS A, T-BS B and in FIG. 3. The receiving device of the serving base station 20 may receive a second group of second target base stations, which may be selected in this example by the mobile station 10. In FIG. 3 the mobile station 10 may select target base stations T-BS A, T-BS B and T-BS C.

The comparing device of the serving base station 20 may compare the first target base stations with the second target base stations, meaning a comparison between T-BS A, T-BS B, T-BS C and T-BS A, T-BS B may be performed. The comparing device may be a part of a determining device of a network apparatus. The comparing device may detect that members of a first group and members of a second group may be different. This difference, for example detected by counting the members of the first group and by counting the members of the second group may activate the determining device in order to determine a difference group of the first group and the second group. The difference group may be of interest in order to prepare an unexpected network apparatus, only selected within one of the two groups, but not as a common member.

The determination device of the serving base station 20 may determine a difference group of target base stations for the scenario of FIG. 3. The target base stations of the first group T-BS A, T-BS B and the target base stations of the second group T-BS A, T-BS B and T-BS C may be compared and the non-common elements of both groups, meaning of the first group and the second group may be forming the difference group and may be determined by the determination device of the serving base station 20. The difference group of this example comprises T-BS C, since the target base station was selected by the mobile station 10 but not selected by the serving base station 20.

The selecting device of the serving base station 20 may select at least one target device of the difference group. In this example T-BS A, T-BS B and T-BS C may originate from the second group. The selecting device may select in this example of FIG. 3 one or more different members, meaning non-common, target base stations of the difference group. The serving base station may select a target base station, which may be T-BS C. The sending device of the serving base station 20 may send a preparation information to the target base station T-BS C. In addition, serving base station 20 may send a preparation information to the target base stations selected by the serving base station 20, which may be T-BS A and T-BS B. The serving base station 20 may send a HO_Req message to target base stations T-BS A, T-BS B T-BS C.

As a result of the handover procedure illustrated in FIG. 3 the target base station T-BS C may be prepared in a preparation phase for a handover. The information sent by the serving base station 20 may comprise a Fast_Ranging_Mode parameter, which may be sent as a signal from the serving base station 20 to the T-BS C, as shown in steps S307c and S308c in FIG. 3.

In other words in relation to the mechanism during the HO preparation phase:

As a preparation to the unexpected target BS selection, the following measure may be taken to provide a handover to the MS:

If no action time AT may be provided to the MS in the MOB_BSHO-REQ message an/or if no action may be provided to the MS in MOB_BSHO-RSP, the MS may not listen the UL-MAP message. In other words, when an action time may be provided to the MS, then the MS may listen to the UL-MAP message. The information of the UL-MAP message provided to the MS may provide a fast ranging procedure for the target apparatus from which the action time was sent to the MS. Without an action time in the MOB_BSHO-RSP message and in the MOB_BSHO-REQ message the target base station may not be prepared for a fast network entry of the MS, because further steps may be performed in order to exchange information between the MS and the target base station.

In a handover procedure, in particular an optimized handover procedure, an Action Time and a possible HO_ID may be provided to the MS. The MS may listen then the UL_MAP message from the target BS. In the UL_MAP message, the target BS may provide an opportunity to the MS for fast ranging, meaning a fast network entry.

Upon receiving MOB_MSHO-REQ message, the serving BS may check the HO type support TLV, and may take appropriate action according to an information, i.e. a control flag, in particular of a BS_Controlled HO flag, i.e. the set of Bit 3.

If the BS_Controlled_HO flag may be set to 1, the serving BS or serving ASN GW may send a HO_Req message to the superset of T-BSs included in the MOB_MSHO-REQ message and the base stations selected by network under certain conditions. For example, the BS_Controlled_HO flag may be set to 1 upon a policy of the network operator. The serving BS may complete the continued HO message transaction specified for HO preparation phase with these entire target base stations, wherein a continued HO message transaction may be a HO_Req, may be a HO_Rsp and may be a HO_Ack.

An HO_Ack message may be sent to the T-BS selected by the MS but not selected by the network. In FIG. 3 this T-BS may be the third target base station 60 (T-BS C). The S-BS may include an additional TLV, which may be named as Fast_Ranging_Mode in the present example. The additional TLV may be utilized to indicate for the T-BS that a MS MAC address instead of a HO_ID may be used to provide a handover.

In case, HO_ID may be not included in the HO_Rsp message from the T-BS, an additional TLV may not be necessary.

Upon receiving the MOB_HO-IND message and an unexpected T-BS may be selected by the MS in the MOB_HO-IND, the networks may determine if an handover may be provided, in particular an optimized HO, or if no handover, in particular an optimized handover may be not provided, which may be determined according to one or more certain considerations. One consideration may be for example, if the BS_Controlled_HO flag may be set or not. If a handover may be provided, in particular an optimized HO, the S-BS may send a message to the MS. In the present example the message may be named as MOB_HO-RSP. The message may be sent immediately or after the receiving of the HO_Ack message from the unexpected T-BS. Furthermore, an Action time may be included in the message, for example in the MOB_HO-RSP message.

Figure 4B:
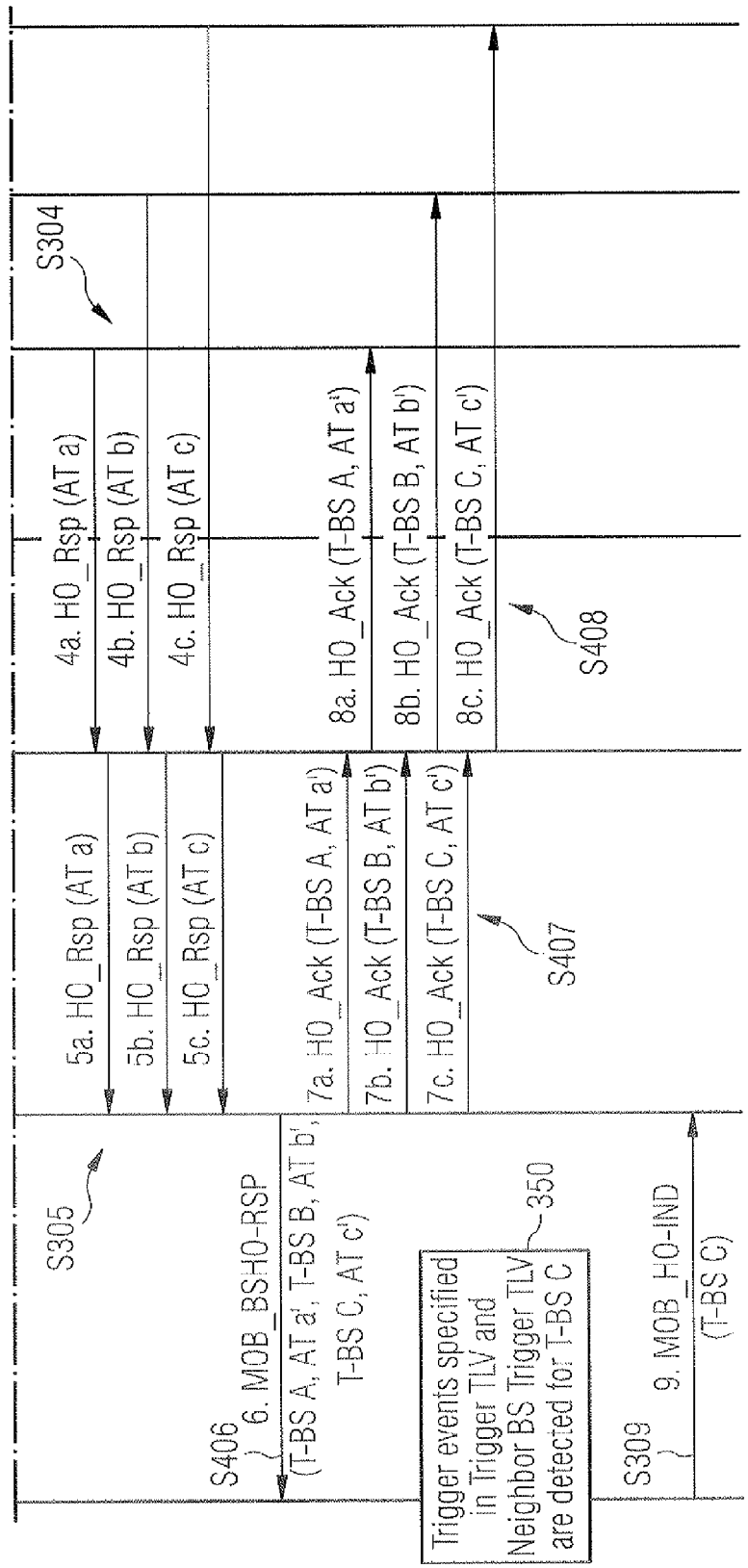
FIG. 4 shows an exemplary embodiment of a third message flow diagram for a handover, which may occur in a network.

In FIG. 4 a further message flow diagram is shown which may be similar to the exemplary embodiment of FIG. 3. In FIG. 4 the S-BS may decide a HO Preparation with all the MS-proposed T-BSs. This decision may be based on a first trigger event 400. In FIG. 4 a first trigger event 400 and a second trigger event 350 may take place. The first trigger event may be recognized by the MS, since a "BS controlled HO flag may be set, meaning FIG. 4 shows a HO preparation phase while the "BS_Controlled_HO" flag may be activated.

In FIG. 4 the network may include all the MS-proposed T-BSs in the HO preparation phase and in MOB_BSHO-RSP sent back to the MS, in order to minimize the risk, that the MS may perform a HO to an unprepared T-BS. The MS may indicate to do a HO to a network-recommended BS and the MOB_HO-IND(T-BS C) message includes T-BS C, which T-BS C took part in the HO preparation and hence the T-BS C may be prepared to accept the MS for a HO.

In FIG. 4 "first trigger events" may be provided and the network may perform HO preparation with all the T-BSs proposed by the MS and not deleting some suggested T-BS from the group or list send by the MS.

"Trigger events", may be specified in certain TLVs, being applied in the MS. Therefore, the "BS_Controlled_HO" flag may be broadcasted in DCD and set to 1, since in this case the MS may apply the trigger events. In other words, the MS may send a MOB_MSHO-REQ after a triggering condition specified in Trigger TLV or Neighbor BS Trigger TLV may have occurred. There may also be utilized a threshold in order to recognize a trigger event.

If the network may decide to minimize the risk that the MS does a HO to an unprepared, unexpected target BS (T-BS), the network, in particular the S-BS, may identify the list of T-TBs which the S-BS may receive in the MOB_MSHO-REQ message, and the S-BS may include all of these T-BSs in the HO Preparation phase, by executing steps S302, S303, S304, S305, S407, S408.

The network may be free to decide for this risk-minimizing strategy at any time, however if the "BS_Controlled_HO" flag may be set, the network has particularly good reasons why to trust the T-BS list received from the MS.

The network may regularly rely on the T-BS list received in MOB_MSHO-REQ, if the network has activated the "BS_Controlled_HO" flag before (i.e. this flag may be broadcasted in the DCD message and set to 1). The reason might be: If this flag may be set, the MS may apply predefined rules and thresholds ("trigger events") as a criteria for any HO requests, so any HO request may be well-justified.

In step S301 the MS initiates the HO process by sending MOB_MSHO REQ message to the serving BS, which indicates the potential target BS (T-BS A, T-BS B, T-BS C). If the "BS_Controlled_HO" flag may be active (i.e. broadcasted in DCD and set to 1), then this sending of MOB_MSHO-REQ may be based on the application of predefined trigger conditions of trigger event 400. The MOB_BSHO-REQ may depend on the condition of a event trigger, which may take place timely before the MOB_BSHO-REQ message may be sent.

In Step S301b optionally, the S-BS may initiate Context Retrieval procedure immediately. Alternatively, the Context Retrieval procedure may be executed by the Target BSs at a later point in time.

The Context Retrieval procedure may be independent performed from a condition of a "BS_controlled_HO" flag set or not set.

In FIG. 4 in step S302 the serving BS may check if the "BS_Controlled_HO" flag may be set. The serving BS may send a R6 HO_Req message to all the T-BSs included in MOB_MSHO-REQ messages. The purpose of this decision by the Serving BS may be to prepare all these T-BSs for a potential subsequent HO, in order to minimize the risk that the T-BS to which the MS may potentially go, may be unprepared. This decision may depend on the status of the "BS_Controlled_HO" flag, i.e. it may be possible that if this flag may be set, the behavior of the MS may be more restricted, hence more predictable and reliable, so the network has reasons to trust the MS and the parameters of the MOB_MSHO-REQ message. However, even if there may be no "BS_Controlled_HO" flag set, the network may decide to do HO Preparation with all the T-BSs proposed by the MS. This may be done in order to minimize the risk of a HO to an unprepared T-BS.

The steps S301 to S305 may be the same as shown in FIG. 3. The parameters "AT a" etc may be the "HO Action Times". Each T-BS may, upon reception of HO-REQ, and provided it may have the ability and capability to agree to this HO request, decide on a point in the near future when to send out the Fast_Ranging-IE for the respective MS, for offering a fast ranging opportunity such that the HO may run smoothly if the MS may decide to select the respective T-BS as HO target. The T-BS may signal this "HO Action Time" back to the S-BS in HO_RSP: T-BS A delivers AT a; T-BS b delivers AT b, and T-BS C delivers AT c, in this example.

The a step S406 the S-BS may indicate the target BSs selected by network. The S-BS may decide to trust the MS-proposed T-BS list, e.g. because the "BS_controlled_HO" flag may be active. The S-BS may include all the MS-proposed T-BSs in the MOB_BSHO-RSP message and without leaving any of them out. The S-BS may also include the HO Action Times AT a, AT b, AT c in the message, so the MS may figure out when to expect the Fast_Ranging-IE at the respective T-BS. The MOB_BSHO-RSP message may include the "HO-ID" (Handover Id) number which the T-BSs have assigned to this HO during the HO preparation (HO-REQ, HO-RSP). This HO-ID (one per T-BS) may be used by the MS for the subsequent fast network access at the selected T-BS.

However, there may be reasons for S-BS, to leave a T-BS out and exclude it from the list of T-BSs to be sent back to the MS in MOB_BSHO-RSP. This situation may be given in FIG. 3 in step S306.

In step a 5407 the S-BS may send a HO_Ack message to all the potential T-BS selected before. Once a T-BS receives this message, it may know that the MS might decide to select this T-BS as HO target, so the T-BS may be preparing to send the Fast_Ranging-IE out at the pre-committed HO Action Time. The T-BS may use the so-called HO-ID (Handover Id) for labeling the Fast_Ranging-IE, such that the MS may see which of the (potentially multiple) Fast-Ranging-IEs may be intended for the respective MS.

In step S408 the relay ASN GW relays the HO_Ack message to the T-BSs.

In step S309 the MS may send a MOB_HO-IND message to the S-BS. Since the MOB_HO-IND message includes T-BS C which may be one of the T-BSs being involved in the HO Preparation phase (steps S302 to S406), the subsequent HO action phase may run smoothly and fast, since T-BS C may be prepared for the HO and may in particular offer a fast ranging opportunity by indicating a Fast_Ranging_IE for the MS.

FIG. 4 shows that S-BS decides for a full HO preparation with all the MS-proposed T-BSs by the MS.

FIG. 5 shows a fourth message flow diagram comprising a handover preparation phase according to an exemplary embodiment of the invention, similar as described for FIG. 3.

In FIG. 5 the S-BS decides for HO Preparation with all the MS-proposed T-BSs but leaves some of them out of the MOB_BSHO-RSP message sent back to MS.

FIG. 5 comprises like FIG. 4 a first trigger event and a second trigger event, wherein the MS listens to the first trigger event due to a BS_Controlled_HO flag, which may be also set in the exemplary embodiment of FIG. 5, similar as described for FIG. 3.

In step S301 which may be the same as shown in FIG. 4, the MS may initiate the HO process by sending MOB_M-SHO_REQ message to the serving BS, which indicates the potential target BS (T-BS A, T-BS B, T-BS C).

Step S301b may be performed in the same manner as in FIG. 4. When the BS_Controlled_HO flag may be set, which may be in FIG. 5 the case, the S-BS may initiate Context Retrieve procedure immediately, meaning at the beginning of the HO preparation phase Steps S302 to S306 may be performed as in FIG. 4. The serving BS may check if BS_Controlled_HO flag may be set, if so the serving BS may send a R6 HO_Req message to all the T-BSs included in MOB_MSHO-REQ messages.

In a step S306 the S-BS may indicate the target BSs selected by network. However there may be a difference to the situation of FIG. 4: The S-BS may decide to downselect the T-BS list to be included in MOB_BSHO-RSP in FIG. 5: E.g. in this example, for certain reasons, the S-BS may leave out the T-BS C. A reason for doing so might be that in the HO_RSP message, T-BS C indicated certain capacity limits, which imply that the quality of service (QoS) may degrade if the MS may select this T-BS for HO. So S-BS might decide to keep T-BS C out of the list of recommended HO target BSs sent to MS in MOB_BSHO-RSP. In this case, the MS may not see the HO-ID (Handover Id) which the T-BS C may have assigned to this HO preparation case.

In a step S307 the S-BS may send a HO_Ack message to all the potential T-BS selected before. However, in case the S-BS may have excluded a T-BS from sending it out to MS in MOB_BSHO-RSP in Step S306 (here, it may be T-BS C), the HO_Ack message may include a Fast_Ranging_Mode TLV (where TLV may be a Type Length Value-coded information element) to inform the T-BS that the MS may have no chance to receive the HO-ID which T-BS C has assigned for this HO, so MS may not use HO-ID during network entry at T-BS C, so T-BS may use the "MS MAC address" of the MS instead of HO_ID, for labeling the Fast_Ranging-IE for this MS, to provide a fast HO for this MS even though the network did not recommend T-BS C to the MS during HO preparation.

Instead of such "Fast_Ranging_Mode" TLV, any other means might be used for informing a T-BS (in this case T-BS C) that it was not included in MOB_BSHO-REQ/RSP and hence its HO_ID may be not known by the MS, and nevertheless, S-BS expects T-BS C to offer a fast ranging opportunity to the MS, and broadcasting it within a Fast_Ranging-IE in the UL MAP. Based on that information, it may happen that T-BS C may not use the (8 bit) HO-ID for labeling the Fast_Ranging IE and may therefore use the plain (48 bit) MS address instead, i.e. the MS MAC address.

In step S308 the relay ASN GW relays the HO_Ack message to the T-BS.

In step S309 the MS sends MOB_HO-IND message with HO-IND-Type=0b00 (="Serving BS Release") to the S-BS. This may be a kind of Target BS rejection since MS indicates T-BS C as its selected target BS, although T-BS C was not included in the recommended T-BS list in MOB_BSHO-RSP (step S306). By setting the HO-IND-Type to 0b00 and not to 0b10 (which means "HO Reject"), the MS may inform the serving BS (S-BS) that it may not wait for another MOB_B-SHO-RSP with a new T-BS list, but MS may leave the S-BS now and may not listen to any further messages from S-BS.

In FIG. 5 the network has included T-BS C in the HO preparation and has even sent HO-ACK with the Fast Ranging information to T-BS C, so T-BS C may send out a Fast_Ranging-IE in due time, using the MS MAC Address as the identifier. A T-BS which may be not included in MOB_B-SHO-RSP may not be requested to offer a fast ranging for the respective MS. However, the T-BS C may offer a fast ranging slot, to be prepared for the case that the MS selected this non-recommended T-BS as its HO target.

Previously, an MS, when rejecting the offered T-BS list (the one in MOB_BSHO-REQ or MOB_BSHO-RSP) and doing a HO to a non-recommended T-BS, i.e. T-BS C here, may not expect this T-BS to offer a fast ranging opportunity. The MS may also in this case try to receive a Fast_Ranging-IE in the broadcasted UL MAP information which may be sent out by the T-BS C. The MS may not know the HO-ID for this Fast_Ranging-IE but this may be remedied by in such a way that the T-BS C may have been instructed to use "MS MAC Address" instead of HO-ID, which MS MAC Address the MS knows by default.

In the case MS may select the non-recommended T-BS C for HO, the MS may not know the "Action Time" AT c, which T-BS has allocated for this HO. Therefore, the MS may somehow "guess" the time when T-BS C may send the Fast_Ranging-IE. Using one or more timers of the MS may be provided. These timers may be for example "BS Switching Timer" and/or "Handover Indication Readiness Timer, as a means for both the network (S-BS and T-BS C) and the MS, for estimating the time (HO Action Time) when T-BS C may send the Fast_Ranging-IE out for the MS.

Figure 6B:
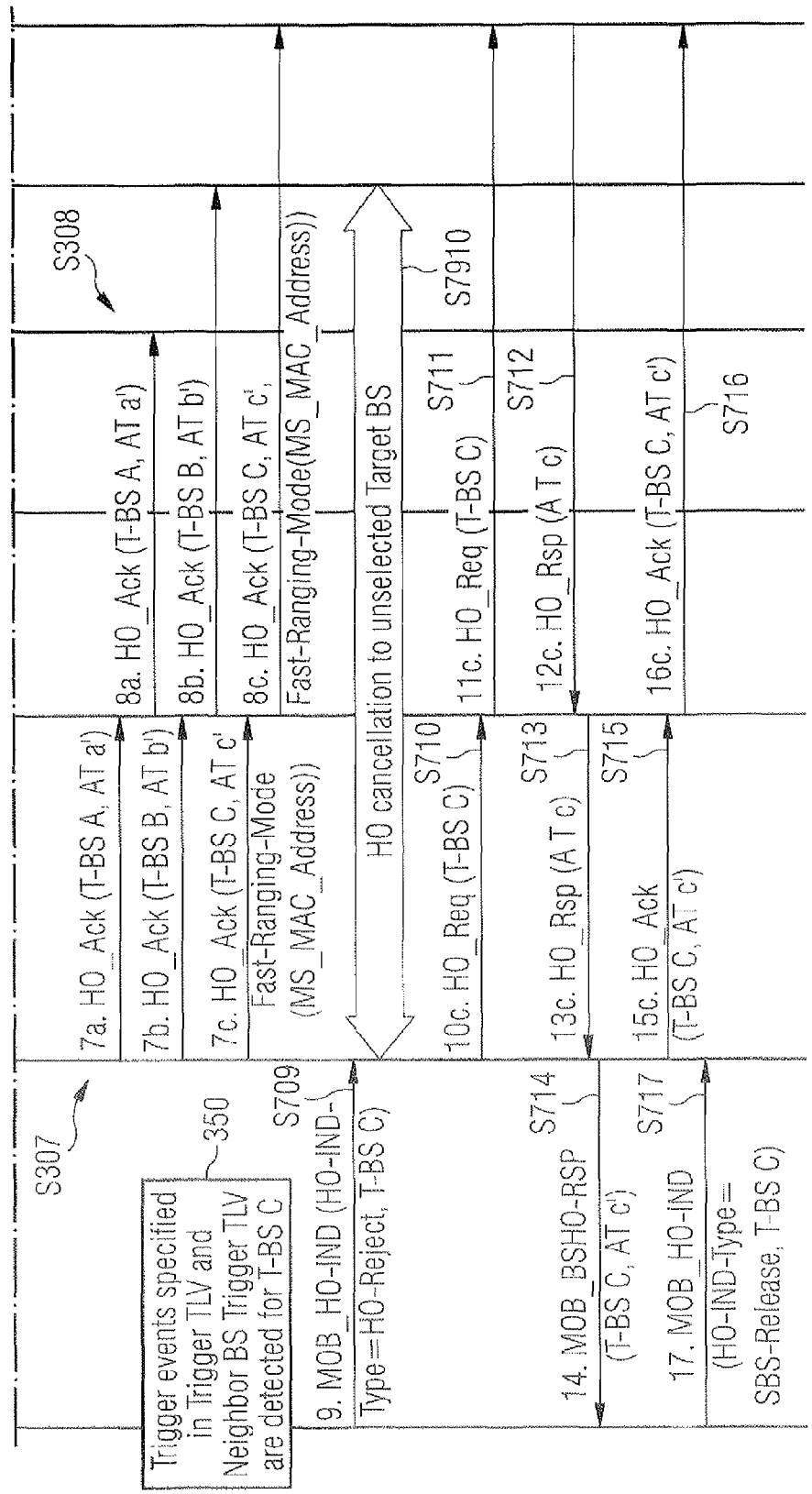
FIG. 6 shows an exemplary embodiment of a fifth message flow diagram for a handover, which may occur in a network.

FIG. 6 shows a fifth message flow diagram.

In FIG. 6 there may be shown the same start for a handover as in FIG. 3, but the MS may perform "HO reject" to allow the S-BS to modify the MOB_BSHO-REQ/RSP message and send this message again.

The first trigger event 400 (not shown) and step S301 may be the same as given for FIG. 5. The MS initiates the HO process by sending MOB_MSHO_REQ message to the serving BS, which indicates the potential target BS (T-BS A, T-BS B, T-BS C), Step S301b may be the same as given in FIG. 5. If the BS_Controlled_HO flag may be set, the S-BS may initiate Context Retrieve procedure immediately.

Step S302 may be the same as given in FIG. 5. The serving BS check if BS_Controlled_HO may be set, The serving BS may send R6 HO_Req to all the T-BSs included in MOB_M-SHO-REQ messages.

Steps S303 to S305 in FIG. 6 may be the same as given in FIG. 5. Step S306 may be performed in the same way as in FIG. 5, wherein the S-BS may indicate the target BS selected by network.

Step S307 may be the same as in FIG. 5. The S-BS sends HO_Ack message to all the potential T-BS selected before, especially, in case the HO_IND may be included in the HO_Rsp from the T-BS indicated by MS but not preferred by networks. In this case it may be T-BS C, the HO_Ack message may include a TLV Fast_Ranging Mode to inform the T-BS, that MS MAC address instead of HO_ID may be used to provide a HO.

Step S308 may be the same as in FIG. 5. The relay ASN GW relays the HO_Ack message to the T-BSs. For T-BS C, the message may include the information that T-BS C was excluded from the MOB_BSHO-RSP message and that therefore, fast ranging may not be use the HO-ID. This information may be conveyed in "Fast-Ranging-Mode (MS_MAC Address)".

Before sending a message in step S709 of FIG. 6 in a second trigger event 350 the MS may detect trigger conditions in favor of HO to T-BS C and not to any other T-BS. Therefore, the MS may select T-BS C and decide to reject the T-BSs that the network proposed in MOB_BSHO-RSP, in this case, T-BS A and T-BS B. There may be different ways how an MS may reject the offered T-BSs: One example may be by MOB_HO-IND(HO-IND-TYPE=0b00=SBS-Release), an other example may by MOB_HO-IND(HO-IND-TYPE=0b10=HO-Reject).

A MS may signal rejection of the target BS offered for handover by the serving BS in different manners. A first manner may be that the MS may send a MOB_HO_IND message with HO_IND_type set to 0b00 (Serving BS release) and include its preferred T-BS in the message. In this case, the MS may not set a timer, in particular a T42 timer, and the MS may depart for the T-BS without further negotiation with the SBS. A second manner may be that an MS may signal rejection of the target BS offered by the serving BS by sending MOB_HO_IND message with HO_IND_type set to 0b10 (Handover Reject) and setting a timer, especially a T42 timer. The MS may include its preferred T-BS in the message. In this case the MS may wait for the S-BS to respond with a further MOB_BSHO-RSP or MOB_BSHO-REQ message. A third possibility may be, if the new T-BS may be acceptable to the MS, the MS may respond with a MOB_HO_IND message with HO_IND_type set to 0b00 (Serving BS Release) and may include the T-BS selected from the neighbor list in the message.

In FIG. 6 the MS may use HO_IND-Type=0b10 (Handover Reject) in step S709 instead of 0b00 (SBS Release), since 0b10 may give the S-BS a chance to renegotiate with T-BS C and to send another MOB_BSHO-RSP, including T-BS C with the required Action Time AT c and with the HO-ID included.

Furthermore, in step S709 the MS sends MOB_HO-IND (HO-Reject) message to the S-BS, to indicate that it wishes to see T-BS C being the target BS of this HO. This step S709 may be may be performed with a requirement to carry target BS information in the MOB-HO-IND(HO-Reject) message.

In step S7910 in FIG. 6, as well as in step S7910 in FIG. 9, 10, 11, respectively, a HO cancellation to unselected T-BSs may be performed. The step S7910 in all figures may be one or more optional messages between the S-BS and the respective unselected T-BS, which may have been prepared timely before, but which may not be utilized any more as a potential T-BS, since the MS may go to one other TB-S, i.e. the T-BS C.

Figure 11B:
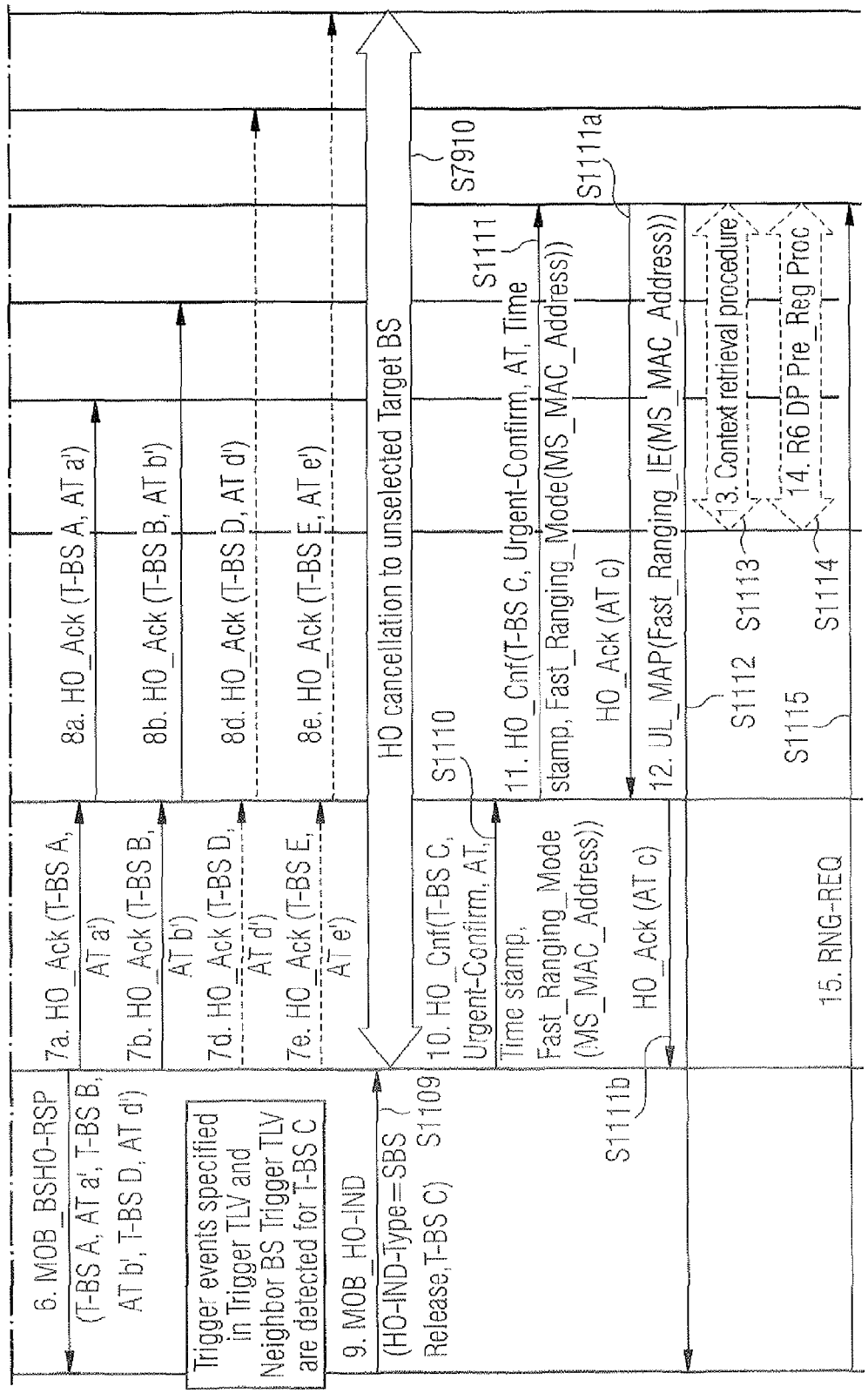
FIG. 11 shows an exemplary embodiment of a tenth message flow diagram for a handover, which may occur in a network.

In FIG. 6 T-BS A and T-BS may unselected target base stations, which may be not selected in the HO action phase. In FIGS. 9, 10 and 11 T-BS A, T-BS B, T-BS D and T-BS E may be unselected base stations.

In relation to steps S710 and S711 the situation may be the following: When receiving MOB_HO-IND(HO-Reject) by the S-BS, the S-BS may not just send another MOB_BSHO-RSP with T-BS C included. The reason may be that the time may be running and probably the Action Time AT c, which T-BS c specified before, may be already outdated when S-BS may send the second MOB_BSHO-RSP. A further reason may be that the T-BS C may need now to be informed that MS got all the information about T-BS C, including the Action Time AT c and the HO-ID, so T-BS C may offer a Fast_Ranging IE using the HO-ID and instead of using the MS MAC Address as intended timely before.

Therefore, it might be necessary for S-BS to perform another round of HO negotiation with T-BS C, before sending the next MOB_BSHO-RSP message to MS in step S714.

The S-BS may send HO_Req(T-BS C) to T-BS C in steps S710 and S711 in FIG. 6.

In steps S712 and S713 the T-BS C allocates a HO-ID and an Action Time AT c and responds back with HO_Rsp.

In step S714 of FIG. 6 the serving BS responses to MS with MOB_BSHO-RSP message, with information of T-BS C (AT c, HO-ID).

In step S715 and S716 the serving BS may send HO_Ack to T-BS C, informing the T-BS C that MS got all the information about T-BS C, so T-BS C may plan to send out the Fast_Ranging IE at the predefined Action Time AT c', which may be slightly different from AT c, since S-BS may have the right to modify the action time AT.

In step S717 of FIG. 6 the MS sends MOB_HO-IND to S-BS, indicating that the MS may be going to T-BS C, which may be not a normal, well-prepared target BS.

In this scenario of FIG. 6 the "BS_controlled_HO" flag may be active. In such a case, the MS may perform a HO rejection with 0b10 in order to allow the network to prepare another MOB_BSHO-RSP offer, as shown in step S714.

Figure 7B:
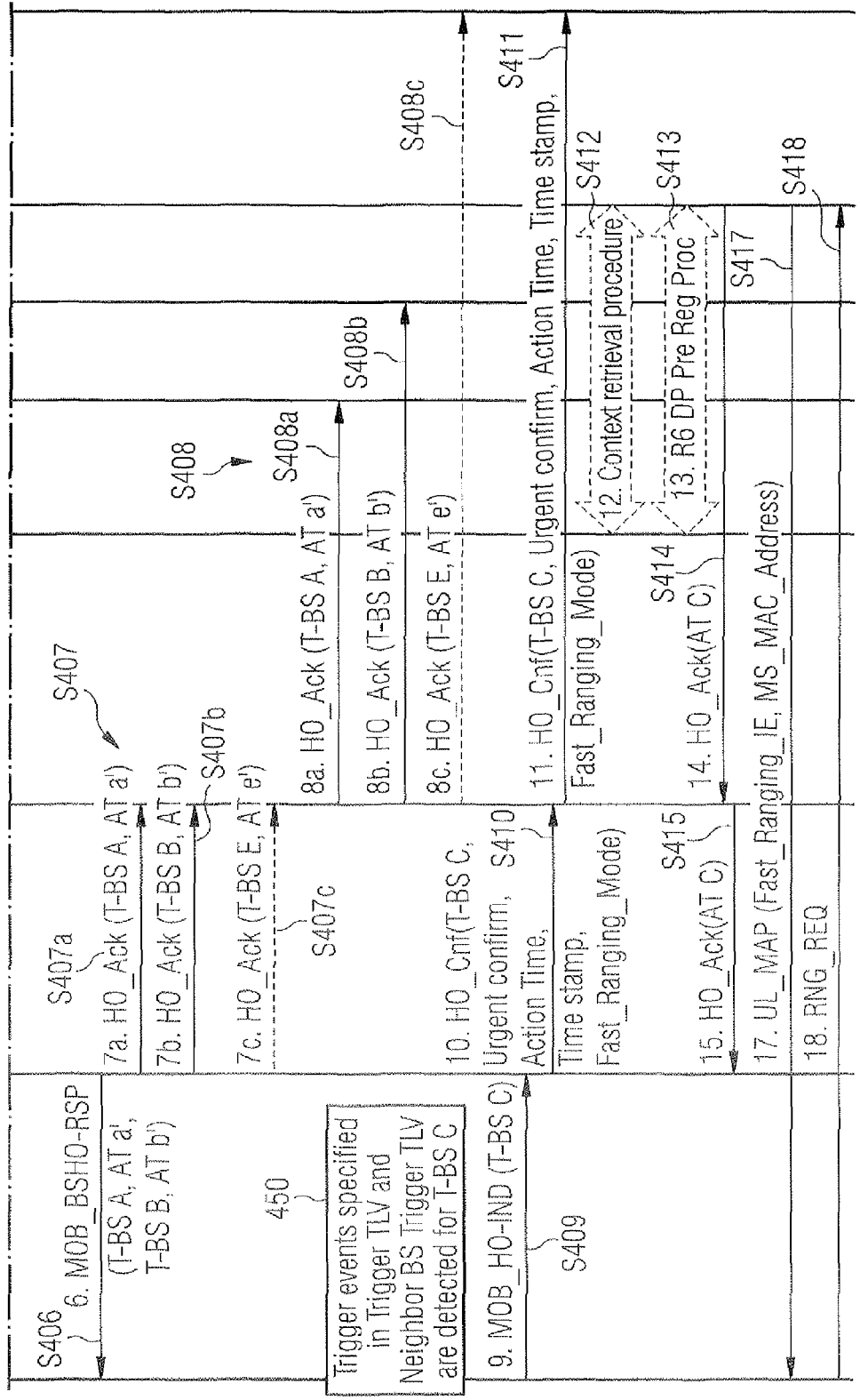
FIG. 7 shows an exemplary embodiment of a sixth message flow diagram for a handover, which may occur in a network.

FIG. 7 shows a sixth message flow diagram comprising a handover action phase according to an exemplary embodiment of the invention.

The network 100 in FIG. 7 may comprise a mobile station 10, a serving base station 20, a relay 30, an anchor 35, a first target base station 40, a second target base station 50, a third target base station 60 and a fifth target base station 80. The network of FIG. 7 may be similar to the network shown in FIG. 1a, which may be in particular a communication network and similar to the diagrams shown in FIGS. 3 to 6.

In a step S401 the mobile station 10 may send a signal to the serving base station 20. This signal may be a request message, in particular a MOB_MSHO_REQ message, which may comprise one or more target base stations as parameter. In FIG. 7 these parameters may be selected base stations T-BS A, T-BS B and T-BS E, meaning the first target base station 40, the second target base station 50 and the fifth target base station 80 may be selected for a handover by the mobile station 10 in this example of FIG. 7. Thus, the handover may be mobile station initiated.

In a further step, not shown in FIG. 7, but shown in FIG. 3 as step S301b, which may be an optional step, a context retrieval procedure may be provided, which may be performed by a communication connection between the serving base station 20 and the anchor 35.

The mobile station 10 and the serving base station 20 may have different criteria to select one or more target base stations 40, 50, 60, 80. In the present example of FIG. 4 the mobile station 10 may select the first target base station 40, the second target base station 50 and the fifth target base station 80 according to a second criteria. The serving base station 20 may select one or more target base stations 40, 50, 60, 80 according to a first criteria.

The serving base station 20 may send a signal, in particular a handover request signal to the relay 30 in a step S402. The step S402 may comprise sending a plurality of signals from the serving base station 20 to the relay 30. In FIG. 7 in step S402 three signals may be send, comprising a first handover request signal in step S402a, a second handover request signal in step S402b and a third request handover request signal in step S402c.

The handover signals of step S402a, S402b, S402c may comprise a handover request message, in particular a HO_Req message, respectively. In the present example of FIG. 7 the first target base station 40 (T-BS A) and the second target base station 50 (T-BS B) may have been selected by the mobile station 20. However upon a second criteria utilized by the serving base station 20, the base station 20 may select the fifth target base station 80 in addition to the selection of the mobile station. In other words, for all selected base target base stations 40, 50 selected by the mobile station 10 a preparation for a handover may be provided by the serving base station 20. In addition, also for the fifth target base station 80 (T-BS E), selected by the serving base station 20, a preparation for a handover may be provided by the serving base station 20. In FIG. 7 T-BS E is a member of a difference group.

Therefore, in step S402*a* a message HO_Req (T-BS A) may be sent by the serving base station 20 to the first target base station 40, wherein T-BS A may be a parameter of the message in step S402*a*. In step S402*b* a message HO_Req (T-BS B) may be sent by the serving base station 20 to the second target base station 50, wherein T-BS B may be a parameter of the message in step S402*b*. In step S402*c* a message HO_Req (T-BS E) may be sent by the serving base station 20 to the fifth target base station 80, wherein T-BS E may be a parameter of the message in step S402*c*.

In other words, the serving base station 20 may send a signal to all selected target base stations, selected by the mobile station 10. In addition, the serving base station 20 may send one or more signals to further target base stations, selected by the serving base station 20. In FIG. 4 T-BS A, T-BS B may have been selected by the mobile station 10 based on a first criteria. The target base station T-BS E was selected by the serving base station 20, based on a second criteria. The serving base station 20 may send a signal in step S402 to all selected target base stations, which may have been selected upon the first criteria and independently selected based on the second criteria. In other words, the serving base station 20 may select further target base stations in addition to the selected target base stations, selected by the mobile station 10. A further T-BSs may be in this example T-BS E (dotted line), as a member of the difference group, since only selected by the S-BS and not selected by the MS.

The signals of step S402 to the respective selected target base stations 40, 50 and 80 may be send by the serving base station 20 to the relay 30, which relay 30 may forward the received signals from the serving base station 20 to the corresponding target base stations, corresponding to the target base station parameter in the request message of step S402.

In a step S403 the relay 30 may send three signals to the respective target base stations 40, 50 and 80. Therefore, step S403 may comprise steps S403*a*, S403*b* and S403*c*. In step S403*a* the relay 30 may send a signal, which may be a request message, in particular a HO_Req (T-BS A) message to the first target base station 40. The first target base station 40 may receive the HO_Req (T-BS A) message in step S403*a*. In addition, the relay 30 may send a signal, which may be a request message, in particular a HO_Req (T-BS B) message to the second target base station 50 in step S403*b*. The second target base station 50 may receive the HO_Req (T-BS B) message in step S403*b*. Furthermore, in step S403*c* the relay may send a signal, which may be a request message, in particular a HO_Req (T-BS E) message to the target base station 80. The target base station 80 may receive the HO_Req (T-BS E) message in step S403*c*.

In a step S404, which may comprise steps S404*a*, S404*b* and S404*c* the first target base station 40, the second target base station 50 and the fifth target base station 80, respectively, may send a signal, in particular a handover response message to the relay 30, respectively. These signals sent from the respective target base stations 40, 50 and 80 may be in particular the messages HO_Rsp (AT a), HO_Rsp (AT b) and HO_Rsp (AT e), respectively. Message HO Rsp (AT a) may be sent by the first target base station 40 and may be received by the relay 30. Message HO Rsp (AT b) may be sent by the second target base station 50 and may be received by the relay 30. Message HO Rsp (AT e) may be sent by the fifth target base station 80 and may be received by the relay 30.

The signals of step S404, in particular the handover response messages of the target base stations of step S404 may be forwarded by the relay 30 to the serving base station 20 in a step S405. Therefore, the relay 30 may send signals, in particular handover messages to the serving base station 20 in step S405, wherein step S405 may comprise steps S405*a*, S405*b* and S405*c*. The signals of step S405 may comprise a HO_Rsp message sent by the relay 30 and received by the serving base station 20, respectively. Therefore the serving base station may receive the messages HO_Rsp (AT a), HO_Rsp (AT b) and HO_Rsp (AT e), respectively in step S405.

After having received the handover responses from the relay 30, the serving base station 20 may send a signal to the mobile station 10 in a step S406. The signal of step S406 may comprise a response message, in particular a MOB_BSHO-RSP message. This message may comprise T-BS A, AT a', T-BS B, AT b' as parameters. It may happen that an information like T-BS E, AT e' may not be sent in step S406 of FIG. 7, because T-BS E may have not been selected by the network, meaning by the serving base station 20, although T-BS E may have been selected by the mobile station 10.

In the response message of step S406 the serving base station 20 may confirm to the mobile station 10 that the first target base station 40, the second target base station 50 may be prepared for a handover of the mobile station 10.

In the exemplary situation of FIG. 7 a trigger event occurs, which trigger event or trigger events may be specified in trigger TLV and neighbour BS trigger TLV. The trigger event may be schematically shown in FIG. 7 as reference sign 450. In the present example of FIG. 7 the trigger 450 event may be detected for the third target base station 60 (T-BS C). In other words, the third target base station 60 may be selected by the trigger event 450 for a handover of the mobile station 10, which may be indicated by the mobile station 10 in a signal sent to the serving base station 20 in a step S409.

In a step S407 of FIG. 7 the serving base station 20 may send a signal over the relay 30 to the first target base station 40, the second target base station 50 and the fifth target base station 80, respectively. The signals sent from the serving base station 20 to the target base stations 40, 50, 80 may be a handover acknowledge message, respectively. Thus, step S407 may comprise sending three signals in steps S407*a*, S407*b* and S407*c*.

In step S407*a* an acknowledge message, in particular a HO_Ack message with parameter T-BS A, AT a', may be sent from the serving base station 20 to the relay 30, which relay may receive this message. In step S407*b* a further acknowledge message, in particular a HO_Ack message with parameter T-BS B, AT b', may be sent from the serving base station 20 to the relay 30, which relay may receive this message as well. In step S407*c* a further acknowledge message, in particular a HO_Ack message may be sent from the serving base station 20 to the relay 30, which relay may receive this message. This acknowledge message of step S407*c* may comprise as parameter T-BS E, AT e'.

In step S408 the relay 30 may send a signal to the first target base station 40, the second target base station 50 and the fifth target base station 80, respectively. Therefore, step S408 may comprise steps S408*a*, S408*b* and S408*c*.

In step S408*a* an acknowledge message, in particular a HO_Ack message, may be sent from the relay 30 to the first target base station 40, which message may also be received by the first target base station 40 in step S408*a*. In step S408*b* a further acknowledge message, in particular a HO_Ack message, may be sent from the relay to the second target base station 50, which message may also be received by the second target base station 50 in step 408*b*. In step S408*c* a further acknowledge message, in particular a HO_Ack message, may be sent from the relay to the fifth target base station 80, which message may also be received by the fifth target base station 80 in step S408*c*.

After having performed the steps S401 to S408 in FIG. 7 the first target base station 40, the second target base station 50 and the fifth target base station 80, respectively, i.e. T-BS A, T-BS B and T-BS E, may be prepared in order to be able to connect the mobile station 10 in a handover.

In step S409 the mobile station 10 may send a signal to the serving base station 20. This signal may be an indication message, in particular a MOB_HO_IND message. The mobile station 10 may indicate to perform a handover to the third base station 60, meaning T-BS C as parameter of the MOB_HO_IND message of step S409. This selection of the third base station 60 may be based on the trigger event 450, which took place timely before performing step S409. However, the selection of the third base station 60 may be unexpected from the view of the serving base station, since the serving base station did not initiate a preparation for a handover of the mobile 10 in relation to the third base station 60. Thus, the third target base station 60 may be an unexpected target base station.

In other words, in step S409 the MS may send an indication message to the S-BS, in particular a MOB_HO_IND message, in order to indicate the preferred T-BS, which may be an unexpected T-BS to the network side. It may be assumed that the trigger events specified in Trigger TLV and Neighbor BS Trigger TLV may be detected by the MS, and the MS may select an other target base station, in this example T-BS C, which may be not included in the MOB_BSHO-REQ/RSP message. This selected T-BS C was selected in a further selecting procedure of the MS, meaning a second group of target base stations comprises the member T-BS C, which the single a member of the second group selected by the MS. With this second group a further difference group may be determined, wherein the first group may be selected or may be already selected timely before selecting the second group.

Upon receiving a MOB_HO-IND, from the MS indicating acceptance by the MS to handover to a target BS offered by the serving BS in the MOB_BSHO-RSP (MS initiated) or MOB_BSHO-REQ (network initiated) message, the Serving ASN may generate an R4 HO_Cnf message and may send this R4 HO_Cnf message to the Target ASN.

In a step S410 the mobile station 10 may send a signal to the relay 10. This signal may be a handover confirmation message, in particular a HO_Cnf. The handover confirmation message may comprise the selected target base station, in particular the selected target base station, selected by the mobile station 10 after having received the trigger event 450. The handover confirmation message may comprise an urgent confirm information and also a time stamp information, which may be both sent as parameters in the handover message of step S410. Moreover, the handover confirmation message may comprise a Fast_Ranging_Mode information which may be sent as parameter in the handover message of step S410.

In other words, in step S410, upon receiving the MOB_HO_-IND message, and unexpected T-BS may be selected, the networks may determine if a handover, in particular an optimized HO, may provided according to certain factors, such as BS_Controlled_HO flag may be set or not, or operator's policy. If a handover may be provided, the S-BS may send a HO_Cnf message to the unexpected T-BS. The HO_Cnf message may also include additional parameters.

To provide load balancing and to avoid "ping-pong" effect due to the collision between the BS initiated HO for load balancing and MS initiated HO, a Bit, for example Bit 3 as "BS_Controlled_HO" in a HO support type TLV may be provided. It may be possible for an operator of a network to select BS Controlled HO or MS Controlled HO (i.e. Bit 3=0) depending on the deployment scenario.

If the BS_controlled_HO flag may be set, the freedom of a MS to select the potential target BS during HO may be decreased. MS may handover to one of BSs, which BSs may be specified in a MOB_BSHO-REQ/RSP message, may be required. An MS may attempt handover to the BS not included in MOB_BSHO-REQ/RSP only if certain specified trigger condition may have occurred.

By using a BS_controlled HO flag, which may be set, load balancing among BS may be possible to realize. The handover process may be more predictable through limiting the freedom of MS during the handover process. However, the MS may still have certain freedom during the handover process. The MS may change the decision of the BS under one or more certain condition. The MS may indicate in a MOB_HO-IND message a Target BS which may be different from the one previously indicated by the BS in MOB_BSHO-RSP message. If the BS_Controlled_HO flag may be set, the behavior of the MS may be under the control of network.

The HO Confirm Type TLV may be set as Urgent-confirm in the confirmation message. Furthermore, an action time TLV may be included in the confirmation message, wherein the action time may be set as an estimated value, for example as Handover Readiness Timer. In addition, the confirmation message may comprise a time stamp, which may be set as the time of receiving a MOB_HO-IND message or sending a HO_Cnf message. In addition, an AK context may be included in the confirmation message.

Moreover, an additional TLV Fast_Ranging_Mode may be included in order to inform the T-BS that a MS MAC address instead of a HO_ID may be used to provide the handover, in particular an optimized HO.

The handover message may be received by the relay 30 in step S410. The relay may forward this message by sending it to the selected target base station 60 (T-BS C) in a step S411. It may also be possible in step S410 and in step S411 of FIG. 7 to replace the parameter "urgent confirm" by the parameter "confirm"

In other words, in step S411 the relay ASN GW may relay the message to T-BS. Upon receiving the HO_Cnf message, the T-BS may check the HO Confirm Type TLV. If the TLV may be of urgent-confirm type, the T-BS may allocate an opportunity for the coming MS with a fast ranging information, in particular with a Fast_Ranging_IE. The T-BS may determine the time to send the UL_MAP including Fast_Ranging_IE based on the Action Time value recommend by the S-BS. Furthermore, the T-BS may determine a backhaul transport delay estimated from Time Stamp TLV, and other possible factors.

In a step S412 a context retrieval procedure may be performed between the anchor 35 and the third target base station 60, which may be performed in addition or optional to step S301*b*. Furthermore, in a step S413 a R6 DP Pre Reg Procedure may be performed between the anchor 35 and the third target base station 60. The steps S412 and S413 steps in FIG. 7, the steps S512 and S513 in FIG. 8 and the steps S1113 and S1114 in FIG. 11, may be optional steps, respectively.

In other words, in step S412 the T-BS may request an AK context for the MS by initiating a Context Request procedure if the AK context may be unknown.

In a step S414 in FIG. 7, the third target base station 60 may send a signal to the relay 30. The signal may comprise a handover acknowledge message with the parameter AT C. This handover acknowledge message may be received by the relay 30.

In other words, in 5414 the T-BS may send a HO_Ack message to the S-BS. In particular the HO_Ack message may comprise an Action time TLV in the message to indicate the determined action time for a handover, in particular an optimized HO It may also be possible to perform step S414 timely before step S412 and/or step S413.

In a further step S415 the relay 30 may send the received acknowledge message to the serving base station 20, in particular the Relay ASN GW may relay the acknowledge message to the S-BS.

In a step S417 the mobile station 10 may receive a signal sent directly from the third base station 60. This signal of step S417 may comprise an UL_MAP message. The UL_MAP message may comprise a fast ranging information element, for example a Fast_Ranging_IE as a parameter and a MAC address, in particular a MS_MAC_Address as a further parameter. In other words, the selected target base station 60 may send a MAC_Address to the mobile station in order to offer a handover in a short time span.

In other words, in step S417 the T-BS may send an UL_MAP message to the MS. In particular, the T-BS may include an address, in particular a MS MAC address, which may be utilized instead of an indication information, in particular instead of a HO_ID in the message.

Finally, the mobile station 10 may send directly in a step S418 a signal to the selected target base station 60.

In other words, in relation to the mechanism during the HO action phase the following may be performed:

In case the MS may indicate an unexpected target BS selection during HO action phase, the following approach may be proposed to expedite the network entry of the MS to the target ASN:

Upon receiving an MOB_HO-IND message, if the serving BS finds unexpected target BS may be selected, the serving BS may check the HO type support TLV, and may take appropriate action accordingly, for example, according to the set of Bit 3 of BS_Controlled_HO flag.

The serving BS or the serving ASN GW may send a message to the unexpected target BS selected by the MS to inform that the MS may handover to the target BS. This message may be for example a confirmation message, in particular a HO_Cnf message. This message may be also any other type of message, for example existing messages which may comprise additional information in relation to a handover.

It may be introduced a new enumeration value for a HO Confirm Type TLV in the message, in particular in the HO_Cnf message, to indicate that an expedite network entry may be required. In this example, the value or parameter may be named as Urgent-confirm There may be further parameters, such as Confirm, Unconfirm, Urgent-confirm, Cancel, Reject to be utilized.

An addition, a TLV may be introduced in a handover preparation message, in particular in the HO_Cnf message, to indicate for the unexpected T-BS that a special address, in particular a MAC address or a MS MAC address instead of HO_ID may be used to provide a handover, in particular an optimized HO.

The serving BS may set the HO Confirm Type TLV as Urgent-confirm in HO_Cnf to indicate that an expedite network entry may be required by the MS.

The S-BS may include an additional TLV. In this case an existing TLV Action Time may be used in the HO_Cnf message to indicate the estimated the time of the coming MS network entry, wherein the action time may be set as the value of BS switching timer.

Upon receiving the message (HO_Cnf) with HO Confirm Type set as Urgent-Confirm, the T-BS allocates an opportunity indicted by Fast Ranging_IE in UL_MAP based on the action time recommend by S-BS and the backhaul signaling delay.

In this context, unexpected target BS means, the target BS may be not selected by network and indicated the MS in MOB_BSHO-REQ/RSP message, but it may be selected by the MS and indicated to the network in MOB_HO-IND message.

FIG. 8 shows a further message flow diagram similar to the message flow diagram of FIG. 7. In FIG. 8 the S-BS 20 may select based on a first criteria T-BS D and T-BS E. The MS 10 selects based on a second criteria T-BS A and T-BS B. In step S502 four messages may be sent by the S-BS 20, which may be HO_Req messages to the T-BS A, T-BS B, T-BS D and T-BS E. Here the difference group comprises T-BS A, T-BS B, T-BS D and T-BS E. The S-BS may decide to send a preparation information to all the T-BSs, meaning to all members of the difference group, which may be prepared for a handover in FIG. 8.

The steps S501 to S518 in FIG. 8 may be similar to the steps S401 to S418 of FIG. 7, respectively. A difference occurs that in FIG. 8 four T-BSs may be prepared instead of three T-BSs as in FIG. 7. Therefore, step S502 comprises four messages instead of three messages. The same may be applicable for step S503 to S505.

FIG. 9 shows a eighth message flow diagram according to an exemplary embodiment.

In the scenario of FIG. 9 a HO_IND-Type=0b10 (HO Reject) may occur in step S709 as shown in FIG. 6.

In FIG. 9 steps S301 to S308 may be performed as described for FIG. 6. In step S709 the MS may send MOB_HO_IND Reject message to the S-BS to indicate the preferred T-BS, which may be unexpected to network side and which may be T-BS C in this case.

In the steps S710 to S716 the serving BS may perform a HO preparation for target BS C in FIG. 9, as described in relation to previous Figures, in particular FIG. 6.

In the following steps a HO request may be performed between the MS and the S-BS. It may be foreseen, that the MS may wait a certain time in order to wait for a further message of the S-BS although the MS sent a "reject" before.

A similar situation as described for FIG. 9 may be given in FIG. 10 as an exemplary embodiment. In FIG. 10 in step S1009 a message MOB_HO-IND (Reject) may be sent from the MS to the S-BS. In a further step S1009 a message MOB_MSHO-REQ (T-BS C) may be sent from the MS to the S-BS. It may also be possible that the messages of step S1009 and S1010 may be one message by combining step S1009 and S1010 as one step and by sending in particular a MOB_HO-IND message comprising the parameters reject and T-BS C.

In FIG. 10 step S1010 a MOB_MSHO-REQ message may be sent from the MS to the S-BS after the MS sent a reject parameter in a MOB_HO-IND message in step S1009.

In FIG. 11 a further message flow diagram is shown. In this scenario a MOB_HO-IND (0b00, T-BS C) may occur in step S1109, but the T-BS C may be not prepared at all at the moment when this MOB_HO-IND messages may be received by the S-BS.

In FIG. 11 the steps S301 to S308 may be performed as described for the previous Figures.

In step S1109 the MS may send a MOB_HO_IND message to the S-BS to indicate the preferred T-BS, which may be unexpected to network side, and which may be T-BS C in this case. The message of step S1109 may comprise HO-IND-Type SBS release and the selected target base station T-BS C, selected by the MS. In step S1110 the S-BS may send a HO preparation information to the T-BS C, which T-BS C is member of the difference group, since the MS selected in the HO action phase the target base station T-BS C, which selection may be compared with the selection of the S-BS performed in the HO preparation phase in order to determine a difference group. This difference group may be determined based on the selection of the MS and the S-BS which took place timely before the determination of the difference group and which selection may be the latest updated version and which may not be overwritten or lost by a next selection. In other words, the former selection of T-BS A, T-BS B and T-BS E in the first step of FIG. 11 may not be utilized for determining the difference group, since the MS selected S-BS C timely later then T-BS A, T-BS B and T-BS E at the beginning of HO preparation phase. In the HO preparation phase the S-BS selected the target base stations TB-S A, T-BS B, T-BS D in the embodiment of FIG. 11, which may not have been given up and may be still valid for the S-BS.

In other words, for step S1109 it may be assumed, that the trigger events specified in Trigger TLV and Neighbor BS Trigger TLV may be detected, and the MS may select a new T-BS C, which may be not included in MOB_BSHO-REQ/RSP message before.

In step S1110 upon receiving the MOB_HO_IND message, and unexpected T-BS may be selected, the networks may determine if a HO, in particular an optimized HO, may be provided according to certain factors, such as BS_Controlled_HO flag is set or not, or operator's policy. If the HO, in particular the optimized HO, may be provided, the S-BS may send a HO_Cnf message to the unexpected T-BS, and the message may include additional parameters.

The HO Confirm Type TLV may be set as Urgent-confirm, Action time TLV may be included and set as an estimated value (Handover Readiness Timer), time stamp may be included and set as the time of receiving MOB_HO-IND or sending the HO_Cnf message. AK context may be included if possible.

In HO the action phase, the HO_Cnf message to the unexpected TBS, the HO confirm Type may be set as confirm (confirmed), un-confirm (unconfirmed) or urgent confirm (urgent-confirmed). In other words, if an optimized HO, i.e. by using an urgent confirmation information may not be provided, a normal HO may be provided, i.e. using a confirmation information in order to continue the service of the MS in the network and to avoid an interruption.

In step S1111 of FIG. 11 the relay ASN GW may relay the message of step S1110 to T-BS. Upon receiving the HO_Cnf message in step S1111, the T-BS may check the HO Confirm Type TLV. if the TLV is urgent-confirm, the T-BS may allocate an opportunity for the coming MS with Fast_Ranging_IE. The T-BS may determine the time to send the UL_MAP including Fast_Ranging_IE based on the Action Time value recommend by the S-BS, backhaul transport delay estimated from Time Stamp TLV, and other possible factors. In case the HO Confirm Type TLV may be set as Urgent Confirm, the T-BS may know the MS MAC address instead of the HO ID and this address may be used to provide MS a dedicated fast ranging opportunity.

In steps S1110 to S1114 of FIG. 11 the serving BS may perform HO preparation for the T-BS C within an HO action phase.

In this situation of FIG. 11 the HO_Cnf type in step S1110 and S1111 may be "Urgent confirm" in order to inform the receiving T-BS that this T-BS may accept the coming MS although this T-BS was not included in the HO Preparation phase, when sending HO-Req message and/or HO-Rsp message and/or HO-Ack message, which might be a precondition for a T-BS before accepting a HO_Cnf. Furthermore, an Action Time AT may be inserted in the messages of steps S1110 and S1111, respectively. This Action time AT may be based on one or more timers of the MS.

In step S1110 upon receiving the MOB_HO_IND message and an unexpected T-BS may be selected, the networks may determine if a HO may be provided according to certain factors, such as BS_Controlled_HO flag may be set or not, or operator's policy. If the HO may be provided, the S-BS sends a HO_Cnf message to the unexpected T-BS, and the message includes additional parameters.

The HO Confirm Type TLV may be set as Urgent-confirm parameter. Furthermore, Action time TLV may be included and set as an estimated value (Handover Readiness Timer). Moreover, a time stamp may be included and set as the time of receiving MOB_HO-IND or sending the HO_Cnf message. An AK context may also be included.

If the MS selects a non-recommended T-BS, which may be in FIG. 11 T-BS C, with MOB_HO-IND(0b00, T-BS C), then it may expect the Action Time, which action time may be measured from sending MOB_HO-IND) until reception of the Fast_Ranging-IE from T-BS C. This time may be for example about 200 milliseconds.

This fast ranging, after about 200 milliseconds waiting time, may allow the T-BS C to get prepared. This preparation may be faster than a contention-based CDMA ranging to T-BS C.

Furthermore, in steps S1110 and S1111, a TLV Fast_Ranging_Mode may be included in the HO_Cnf messages, which may be utilized in order to inform the T-BS that MS MAC address instead of HO_ID may be used to provide the HO In step S1111 the relay ASN GW may relay the message of step S1110 to the unexpected T-BS, which may be in FIG. 11 T-BS C.

Upon receiving the HO_Cnf message, the T-BS may check the HO Confirm Type TLV. If the TLV may be urgent-confirm, the T-BS may allocate an opportunity for the coming MS with Fast_Ranging_IE. The T-BS C determines the time to send the UL MAP including Fast_Ranging_IE based on the Action Time value recommend by the S-BS, backhaul transport delay estimated from Time Stamp TLV, and other possible factors.

The backhaul signaling transport delay may be performed in such a way that the T-BS C may send the Fast_Ranging-IE at a predefined, constant time after MS sent MOB_HO-IND. If the message propagation time may extend a certain time limit, then T-BSC may speed-up to send Fast_Ranging, which may be received and utilized by the MS for the HO.

In a step S111a and S1111b a HO_Ack message may be sent from the T-BS C to the relay 30 and from the relay 30 to the S-BS may be sent, respectively. This HO_Ack message may comprise the action time of T-BS C.

In step S1112 the T-BS may send an UL MAP message to the MS, in particular the T-BS C may include MS MAC address of the T-BS C instead of the HO_ID in the message.

In step S1113 the T-BS may request AK context for the MS by initiating a Context Request procedure if the AK context may be not known.

In step S1114 of FIG. 11 the T-BS may complete Data Path Pre-Registration procedure, as knows from Figures described above.

In step S1115 a network entry of the MS may be performed by sending directly a RNG-REQ message from the MS to the T-BS C.

In relation to FIG. 11 it may also be possible that the MS may send a "HO Reject", i.e. in step S1109, meaning the MS may send a MOB_HO-IND(HO_IND-Type=0b10"HO-Reject", T-BS C), and wait for another offer by the network, like shown in FIG. 6, FIG. 9 and FIG. 10. In this case, the network may perform a HO Preparation with T-BS C and may include T-BS C in the updated MOB_BSHO-RSP, in order to perform a prepared HO to T-BS C.

Figure 12:
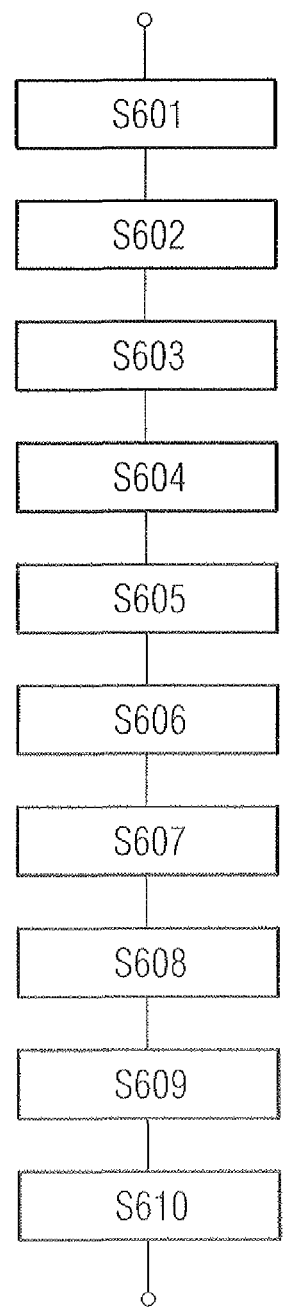
FIG. 12 shows a method according to an exemplary embodiment of the present invention.

FIG. 12 shows a method according to an exemplary embodiment of the invention. The method may be performed for a handover in a network, in particular in a telecommunication network. In a step S601 a condition for a handover may be detected. In a step S602 a first group may be selected, wherein the first group may comprise first target apparatuses. In a step S602 a second group may be selected, wherein the second group may comprises second target apparatuses.

In a step S603 the first target apparatuses may be compared with the second target apparatuses. In a step S604 a difference group of target apparatuses of the first group of first target apparatuses and the second group of second target apparatuses may be determined. In a step S605 at least one target apparatus of the second group of target apparatuses may be selected in such a way that the selected target apparatus may be a member of the difference group. In a step S506 the selected at least one target apparatus may be prepared for a handover.

The method of FIG. 12 may be performed in a handover preparation phase and/or in a handover action phase. In a step S607 an information, in particular an urgent information may be sent. In step S608 a context retrieval procedure may be performed. In a step S609 a request procedure may be performed. In a step S610 a ranging procedure may be performed.

Tables 1 to 3 may show exemplary embodiments of message formats, respectively. In this context, "0x" may indicate that the value is a hexadecimal value.

In table 1 an exemplary embodiment for a handover acknowledge message (HO_Ack message) may be given. The HO_Ack message may be utilized during a HO preparation phase. The first column of table 1 may show information elements (IE), the second column of table 1 may indicate if the IE may be mandatory (M) or if the IE may be optional (O) within a message. In the third column of table 1 some further explanations may be given.

The information element or the parameter "fast ranging mode" may positioned before an action time, which may be also an optional IE or before a BS ID, which may be a mandatory IE. Furthermore, the "fast ranging mode" IE may be positioned before a time stamp inside a message.

The "fast ranging mode" may indicate whether HO ID or MS MAC address may be used by the Target BS to provide dedicated Fast ranging opportunity to the MS. The values of the fast ranging mode IE may be 0x0=HO ID, with other words 0x0 may be utilized in order to indicate the usage of a handover ID. Moreover, the fast ranging mode IE may be 0x1=MS MAC address, in other words 0x1 may be utilized in order to indicate the usage of a MS MAC address.

TABLE 1

| IE | M/O | Notes |
|---|---|---|
| Failure Indication | O | |
| BS Info (Target, one or more) | M | |
| > Serving/Target Indicator | M | Set to Target. |
| >BS ID | M | |
| >Action Time | O | Number of frames where the TBS allocates a dedicated transmission opportunity for Fast Ranging. This SHALL be present only during the 3-way HO_Req/HO_Rsp/HO_Ack transaction. It SHALL not be present in the 2-way HO_Cnf/HO_Ack & HO_Complete/HO_Ack transactions. |
| Fast_Ranging_Mode | O | Indicate whether HO ID or MS MAC address will be used by the Target BS to provide dedicated Fast ranging opportunity to the MS. The values are: 0x0 = HO ID is used 0x1 = MS MAC address is used |
| >Time Stamp | O | Transmission time for MOB_BSHO-REQ or MOB_BSHO-RSP over R1. May be included in order for the Target to estimate with greater accuracy when the fast ranging IE should be sent to the MS. This MAY be present only during the 3-way HO_Req/HO_Rsp/HO_Ack transaction. It SHALL not be present in the 2-way HO_Cnf/HO_Ack & HO_Complete/HO_Ack transactions. |

In table 2 an exemplary embodiment for a handover confirmation message (HO_Cnf message) may be given. The HO_Cnf message may be utilized during a HO preparation phase. In particular the HO Conf message may be of a HO Confirm Type, which may be Urgent-confirm.

The first column of table 2 may show information elements (IE), the second column of table 2 may indicate if the IE may be mandatory (M) or if the IE may be optional (O) within a message. In the third column of table 2 some further explanations may be given.

The IE "action time" may be an optional parameter in a HO Conf message. The IE "action time" may indicate the smallest action time estimated by the Serving BS. The Serving BS may estimate the action time based on BS switch timer. i.e. it may be the earliest possible time the MS may be able to receive Fast_Ranging_IE at the target BS.

The IE "time stamp" may be an optional IE and may indicate the time that MOB_HO-IND messages may be received at the Serving BS.

The position of the IE "action time" and the IE "time stamp" may be before a mandatory BS ID or an optional HO ID, respectively, in the HO Conf message. Moreover the position of the IE "action time" and the IE "time stamp" may be after AK values, such as AK context, AK, AK ID, AK lifetime, AK SN or CMAC key count value.

TABLE 2

| IE | M/O | Notes |
|---|---|---|
| HO Type | M | |
| HO Confirm Type | M | |
| MS Info | M | |
| >Authenticator ID | O | MAY be included if it is not sent during the HO Preparation phase. |
| >Anchor ASN GW ID | O | MAY be included if it is not sent during the HO Preparation phase. |
| >Anchor MM Context | O | The TLV MAY be included, for Unconfirmed Type and to Targets that were not sent HO_Req during the Preparation phase, in order to optimize FA Relocation to the Target ASN after HO. If included, notifies the Target ASN that FA relocation to the Target ASN will be initiated after successful HO. The Target ASN MAY use it to decide whether or not to accept the HO. |
| >>MS Mobility Mode | CM | This TLV SHALL be included if Anchor MM Context is included in the transmitted message. |
| >SBC Context | O | 802.16e related MS session context. |
| >>Subscriber Transition Gaps | CM | This TLV SHALL be included if SBC Context is included in the transmitted message. |
| >>Maximum Transmit Power | CM | This TLV SHALL be included if SBC Context is included in the transmitted message. |
| >>Capabilities for Construction and Transmission of MAC PDUs | CM | This TLV SHALL be included if SBC Context is included in the transmitted message. |
| >>PKM Flow Control | CM | This TLV SHALL be included if SBC Context is included in the transmitted message. |
| >>Maximum Number of Supported Security Associations | CM | This TLV SHALL be included if SBC Context is included in the transmitted message. |
| >>Security negotiation parameters | CM | This TLV SHALL be included if SBC Context is included in the transmitted message. |
| >>>Authorization Policy Support | CM | This TLV SHALL be included if Security negotiation parameters is included in the transmitted message. |
| >>>MAC Mode | CM | This TLV SHALL be included if Security negotiation parameters is included in the transmitted message. |
| >>>PN Window Size | CM | This TLV SHALL be included if Security negotiation parameters is included in the transmitted message. |
| >>Extended Subheader Capability | CM | This TLV SHALL be included if SBC Context is included in the transmitted message. |
| >>HO Trigger Metric Support | CM | This TLV SHALL be included if SBC Context is included in the transmitted message. |
| >>Current Transmit Power | CM | This TLV SHALL be included if SBC Context is included in the transmitted message. |
| >>OFDMA SS FFT Sizes | CM | This TLV SHALL be included if SBC Context is included in the transmitted message. |
| >>OFDMA SS demodulator | CM | This TLV SHALL be included if SBC Context is included in the transmitted message. |
| >>OFDMA SS modulator | CM | This TLV SHALL be included if SBC Context is included in the transmitted message. |
| >>The number of UL HARQ Channel | CM | This TLV SHALL be included if SBC Context is included in the transmitted message. |
| >>OFDMA SS Permutation support | CM | This TLV SHALL be included if SBC Context is included in the transmitted message. |
| >>OFDMA SS CINR Measurement Capability | CM | This TLV SHALL be included if SBC Context is included in the transmitted message. |
| >>The number of DL HARQ Channels | CM | This TLV SHALL be included if SBC Context is included in the transmitted message. |
| >>HARQ Chase Combining and CC-IR Buffer Capability | CM | This TLV SHALL be included if SBC Context is included in the transmitted message. |
| >>OFDMA SS Uplink Power Control Support | CM | This TLV SHALL be included if SBC Context is included in the transmitted message. |
| >>OFDMA SS Uplink Power Control Scheme Switching Delay | CM | This TLV SHALL be included if SBC Context is included in the transmitted message. |
| >>OFDMA MAP Capability | CM | This TLV SHALL be included if SBC Context is included in the transmitted message. |
| >>Uplink Control Channel Support | CM | This TLV SHALL be included if SBC Context is included in the transmitted message. |
| >>OFDMA MS CSIT Capability | CM | This TLV SHALL be included if SBC Context is included in the transmitted message. |
| >>Maximum Number of Burst per Frame Capability in HARQ | CM | This TLV SHALL be included if SBC Context is included in the transmitted message. |
| >>OFDMA SS demodulator for MIMO Support | CM | This TLV SHALL be included if SBC Context is included in the transmitted message. |
| >>OFDMA SS modulator for MIMO Support | CM | This TLV SHALL be included if SBC Context is included in the transmitted message. |
| >>OFDMA parameters sets | CM | This TLV SHALL be included if SBC Context is included in the transmitted message. |
| >REG Context | O[1] | 802.16e related MS session context. |
| >>Number of UL Transport CIDs Support | CM | This TLV SHALL be included if REG Context is included in the transmitted message. |
| >>Number of DL Transport CIDs Support | CM | This TLV SHALL be included if REG Context is included in the transmitted message. |
| >>Classification/ PHS Options and SDU Encapsulation Support | CM | This TLV SHALL be included if REG Context is included in the transmitted message. |
| >>Maximum Number of Classifier | CM | This TLV SHALL be included if REG Context is included in the transmitted message. |
| >>PHS Support | CM | This TLV SHALL be included if REG Context is included in the transmitted message. |
| >>ARQ Support | CM | This TLV SHALL be included if REG Context is included in the transmitted message. |
| >>DSx Flow Control | CM | This TLV SHALL be included if REG Context is included in the transmitted message. |
| >>Maximum MAC Data per Frame Support | CM | This TLV SHALL be included if REG Context is included in the transmitted message. |
| >>>Maximum amount of MAC Level Data per DL Frame | CM | This TLV SHALL be included if Maximum MAC Data per Frame Support is included in the transmitted message. |

TABLE 2-continued

| IE | M/O | Notes |
|---|---|---|
| >>>Maximum amount of MAC Level Data per UL Frame | CM | This TLV SHALL be included if Maximum MAC Data per Frame Support is included in the transmitted message. |
| >>Packing Support | CM | This TLV SHALL be included if REG Context is included in the transmitted message. |
| >>MAC ertPS Support | CM | This TLV SHALL be included if REG Context is included in the transmitted message. |
| >>Maximum Number of Bursts Transmitted Concurrently to the MS | CM | This TLV SHALL be included if REG Context is included in the transmitted message. |
| >>HO Supported | CM | This TLV SHALL be included if REG Context is included in the transmitted message. |
| >>HO Process Optimization MS Timer | CM | This TLV SHALL be included if REG Context is included in the transmitted message. |
| >>Mobility Features Supported | CM | This TLV SHALL be included if REG Context is included in the transmitted message. |
| >>Sleep Mode Recovery Time | CM | This TLV SHALL be included if REG Context is included in the transmitted message. |
| >>Idle Mode Timeout | CM | This TLV SHALL be included if REG Context is included in the transmitted message. |
| >>ARQ Ack Type | CM | This TLV SHALL be included if REG Context is included in the transmitted message. |
| >>MS HO Connections Parameters Proc Time | CM | This TLV SHALL be included if REG Context is included in the transmitted message. |
| >>MS HO TEK Proc Time | CM | This TLV SHALL be included if REG Context is included in the transmitted message. |
| >>MAC Header and Extended Sub-Header Support | CM | This TLV SHALL be included if REG Context is included in the transmitted message. |
| >>System Resource Retain Timer | O | |
| >>MS Handover Retransmission Timer | O | |
| >>Handover Indication Readiness Timer | CM | This TLV SHALL be included if REG Context is included in the transmitted message. |
| >>BS Switching Timer | CM | This TLV SHALL be included if REG Context is included in the transmitted message. |
| >>Power Saving Class Capability | CM | This TLV SHALL be included if REG Context is included in the transmitted message. |
| >SA Descriptor | O[1] | SHOULD be included by Serving ASN for the Target ASN. |
| >>SAID | CM | This TLV SHALL be included if SA Descriptor is included in the transmitted message. |
| >>SA Type | CM | This TLV SHALL be included if SA Descriptor is included in the transmitted message. |
| >>SA Service Type | O | This attribute SHALL be included only when the SA type is Static SA or Dynamic SA. |
| >>Older TEK Parameters | O | This TLV MAY be included if SA Descriptor is included in the transmitted message. |
| >>>PN Counter | O | When AES CCM is selected, the TLV SHALL be included. |
| >>>RxPN Counter | O | When AES CCM is selected, the TLV SHALL be included. |
| >>>TEK | CM | This TLV SHALL be included if Older TEK Parameters is included in the transmitted message. |
| >>>TEK SN | CM | This TLV SHALL be included if Older TEK Parameters is included in the transmitted message. |
| >>>TEK Lifetime | CM | This TLV SHALL be included if Older TEK Parameters is included in the transmitted message. |
| >>Newer TEK Parameters | O | This TLV MAY be included if SA Descriptor is included in the transmitted message. |
| >>>PN Counter | O | When AES CCM is selected, the TLV SHALL be included. |
| >>>RxPN Counter | O | When AES CCM is selected, the TLV SHALL be included. |
| >>>TEK | CM | This TLV SHALL be included if Newer TEK Parameters is included in the transmitted message. |
| >>>TEK SN | CM | This TLV SHALL be included if Newer TEK Parameters is included in the transmitted message. |
| >>>TEK Lifetime | CM | This TLV SHALL be included if Newer TEK Parameters is included in the transmitted message. |
| >>Cryptographic Suite | CM | This TLV SHALL be included if SA Descriptor is included in the transmitted message. |
| >SF Info (one or more) | O | It is included if TEK or Data Integrity information needs to be delivered. |
| >>SFID | M | |
| >>Direction | M | Specifies the direction of the flow. |
| >>CID | O | |
| >>SAID | O | |
| >>Packet Classification Rule/Media Flow Description (one or more) | M | The TLV SHALL be included if the R4 Tunneling Granularity is not per-SF. |
| >>>Classification Rule Index | M | Index assigned to the Packet Classification Rule. |
| >>>Classification Rule Priority | M | |
| >>>IP TOS/DSCP Range and Mask | O | e.g. IEEE802.16e for further details. |
| >>>Protocol | O | Allowed protocols are: TCP, UDP, . . . |
| >>>IP Source Address and Mask | O | e.g. IEEE802.16e for further details. |
| >>>IP Destination Address and Mask | O | e.g. IEEE802.16e for further details. |
| >>>Protocol Source Port Range | O | e.g. IEEE802.16e for further details. |
| >>>Protocol Destination Port Range | O | e.g. IEEE802.16e for further details. |
| >>>Associated PHSI | O | e.g. IEEE802.16e for further details. |
| >>QoS Parameters | M | |
| BS Info (Serving) | M | |
| > Serving/Target Indicator | M | Set to Serving. |
| >BS ID | M | |
| BS Info (Target) | M | |
| > Serving/Target Indicator | M | Set to Target. |
| >BS ID | M | |

TABLE 2-continued

| IE | M/O | Notes |
|---|---|---|
| >HO ID | O | MAY be included as optional reference if the Target ASN has previously sent it with HO_Rsp. |
| >Action Time | O | Indicate the smallest action time estimated by the Serving BS. The Serving BS estimated based on BS switch timer. i.e. it is the earliest possible time the MS can receive Fast_Ranging_IE at the target BS. |
| >Time Stamp | O | Indicate the time that MOB_HO-IND messages is received at the Serving BS |
| >AK Context | O | MAY be included if the Serving ASN retrieves the AK Context for the Target ASN from the Authenticator ASN. If not included the Target ASN SHALL retrieve AK context. |
| >>AK | CM | This TLV SHALL be included if AK Context is included in the transmitted message. |
| >>AK ID | CM | This TLV SHALL be included if AK Context is included in the transmitted message. |
| >>AK Lifetime | CM | This TLV SHALL be included if AK Context is included in the transmitted message. |
| >>AK SN | CM | This TLV SHALL be included if AK Context is included in the transmitted message. |
| >>CMAC_KEY_COUNT | CM | This TLV SHALL be included if AK Context is included in the transmitted message. |

Table 3 shows an exemplary embodiment of a HO confirm type message or TLV. The term Type Length Value may be used e.g. in IEEE802.16 and e.g. WiMAX Forum specifications, and it may refer to those parameters, which are encoded by a triple consisting of a Type indicator, a Length indicator and a Value indicator. In addition, the term TLV may be used for any parameter or information element being conveyed in a message.

The HO confirm type may be of type "76" and may have a length in octets of 1. The HO confirm type may comprise furthermore an enumerator. The values of the enumerator may be as follows: 0x00=Confirm 0x01=Unconfirm, i.e. 0x01 may indicate an unconfirm status, 0x02=Cancel, i.e. 0x02 may indicate a cancelation, 0x03=Reject, i.e. may indicate a rejection, 0x04=Urgent-confirm, may indicate an urgent confirm status. All other values may be reserved. The HO Cnf may indicate whether one of the candidate BSs or potential BSs may be selected as the HO target or not.

The HO_Cnf message sent to an unexpected T-BS may comprise a HO confirm Type, which may be set for example as confirm (confirmed), unconfirm (unconfirmed) or urgent confirm (urgent-confirmed).

In this context, "Confirm" may be utilized when the network may receive an explicit indication of handover target BS from MS. In this context, "Unconfirm" may be utilized when the network may fail to receive an indication from MS but network may presume possible target BSs. In this context "Cancel" may be utilized when MS may cancel the handover and "Reject" may be utilized when MS may reject handover to one of the candidate BSs proposed by the network.

TABLE 3

| | |
|---|---|
| Type | 76 |
| Length in octets | 1 |
| Value | Enumerator. The values are: Enumerator: 0x00 = Confirm 0x01 = Unconfirm 0x02 = Cancel 0x03 = Reject 0x04 = Urgent- confirm All other values are Reserved. |
| Description | Indicates whether one of the candidate BSs is selected as the HO target or not. Here, "Confirm" is for when the network receives an explicit indication of handover target BS from MS, "Unconfirm" for when the network fails to receive an indication from MS but network presumes possible target BSs, "Cancel" for when MS cancels the handover, and "Reject" for when MS rejects handover to one of the candidate BSs proposed by the network. |
| Message Primitives That use this TLV | HO_Cnf |

According to an aspect of the invention a MS network entry may be supported even if the T-BS indicated in MOB_HO_IND may be not included in MOB_BSHO-RSP message. Moreover, the invention may be applicable for both MS initiated and BS initiated Handovers. Furthermore, it may be possible to provide optimize HO for BS Controlled HO even if unexpected T-BS may be selected.

It should be noted, that the exemplary embodiments shown in the figures and tables may be combined with each other according to the understanding of a skilled person in the art.

In addition, the invention may provide an effective solution as WiMAX™ backhaul support to HO optimization to unexpected target BS selection.

It should be noted that the term "comprising" does not exclude other elements or steps and the "a" or "an" does not exclude a plurality. Also elements described in association with different embodiments may be combined.

It should also be noted that reference signs in the claims may not be construed as limiting the scope of the claims.

Acronyms and Terminology
R6 Interface Interface or reference point between BS and ASN GW
R4 Interface Interface or reference point between ASN GW and ASN GW
ASN Access Service Network
AK Authorization Key
Ack Acknowledgement
CDMA Code Division Multiple Access
CDMA ranging This may be a contention-based ranging according to e.g. IEEE802.16 standard.
DCD Downlink Channel Descriptor
GW Gateway
HO Handover
IE Information Element
IND Indication
MAC Medium Access Control
MS Mobile Station
OFDMA Orthogonal Frequency Division Multiple Access
S-BS Serving Base Station
T-BS Target Base Station
T-BSs Target Base Stations
UL_MAP Uplink Map
REQ Request
RSP Response
TLV Type Length Value

The invention claimed is:

1. An apparatus comprising:
one or more processors; and
one or more memories including computer program code, the one or more memories and the computer program code configured, with the one or more processors, to cause the apparatus to perform at least the following:
detect a condition for a handover;
select a first group, wherein the first group comprises at least one first target apparatus member;
receive a second group selected by a mobile station, wherein the second group comprises at least one second target apparatus member;
wherein the selection of the first group is performed timely before performing the selection of the second group;
determine a difference group of the first target apparatus members and the second target apparatus members;
select at least one target apparatus member of the difference group;
send a preparation information to the at least one selected target apparatus member of the difference group; and
send a handover confirmation message to the at least one selected target apparatus member of the difference group, which handover confirmation message comprises at least one information selected from the group consisting of a confirmation information, an urgent confirm information, an action time information, a time stamp information, a fast ranging mode information, an address information and a MAC address information.

2. The apparatus according to claim 1, wherein the at least one selected target apparatus member of the difference group originates from the second group.

3. The apparatus according to claim 1, wherein the preparation information is sent to all selected target apparatus members of the difference group.

4. The apparatus according to claim 1, wherein the preparation information is sent to all target apparatus members of the difference group originating from the second group.

5. The apparatus according to claim 1, wherein the apparatus is at least one apparatus selected from the group of apparatuses consisting of a base station, a mobile station, a gateway, an anchor, a switch, a hub, a server and a satellite.

6. The apparatus according to claim 1, wherein the one or more memories and the computer program code are further configured, with the one or more processors, to cause the apparatus to perform:
send an acknowledge message, which acknowledge message comprises at least one information from the group consisting of a confirmation information, an urgent confirm information, an action time information, a time stamp information, a fast ranging mode information, an address information and a MAC address information.

7. The apparatus according to claim 1, wherein the condition for a handover is at least one condition selected from the group of conditions consisting of a signal to noise ratio, a service load, an interference, a strategy of the operator of the network, a preferred policy, a roaming agreement, a capability, in particular a capability of a target base station, a trigger event and a reject information.

8. A method for a handover in a network, the method comprising:
detecting a condition for a handover;
selecting a first group, wherein the first group comprises at least one first target apparatus member;
receiving a second group selected by a mobile station, wherein the second group comprises at least one second target apparatus member;
wherein the selection of the first group is performed timely before performing the selection of the second group;
determining a difference group of the first target apparatus members and the second target apparatus members;
selecting at least one target apparatus member of the difference group;
sending a preparation information to the at least one selected target apparatus member of the difference group; and
sending a handover confirmation message to the at least one selected target apparatus member of the difference group, which handover confirmation message comprises at least one information selected from the group consisting of a confirmation information, an urgent confirm information, an action time information, a time stamp information, a fast ranging mode information, an address information and a MAC address information.

9. The method according to claim 8, wherein the method is performed in a handover preparation phase of a handover procedure.

10. The method according to claim 8, wherein the method is performed in a handover action phase of a handover procedure.

11. A computer program product comprising a non-transitory computer-readable storage medium bearing computer program code embodied therein for use with a computer, the computer program code comprising code for performing a method comprising:
detecting a condition for a handover;
selecting a first group, wherein the first group comprises at least one first target apparatus member;
receiving a second group selected by a mobile station, wherein the second group comprises at least one second target apparatus member;
wherein the selection of the first group is performed timely before performing the selection of the second group;
determining a difference group of the first target apparatus members and the second target apparatus members;
selecting at least one target apparatus member of the difference group;
sending a preparation information to the at least one selected target apparatus member of the difference group; and
sending a handover confirmation message to the at least one selected target apparatus member of the difference group, which handover confirmation message comprises at least one information selected from the group consisting of a confirmation information, an urgent confirm information, an action time information, a time stamp information, a fast ranging mode information, an address information and a MAC address information.

12. The computer program product according to claim 11, wherein the method is performed in a handover preparation phase of a handover procedure.

13. The computer program product according to claim 11, wherein the method is performed in a handover action phase of a handover procedure.

14. The computer program product according to claim 11, wherein the at least one selected target apparatus member of the difference group originates from the second group.

15. The computer program product according to claim 11, wherein the preparation information is sent to all selected target apparatus members of the difference group.

16. The computer program product according to claim 11, wherein the preparation information is sent to all target apparatus members of the difference group originating from the second group.

17. The computer program product according to claim 11, wherein the method further comprises:

send an acknowledge message, which acknowledge message comprises at least one information from the group consisting of a confirmation information, an urgent confirm information, an action time information, a time stamp information, a fast ranging mode information, an address information and a MAC address information.

18. The computer program product according to claim 11, wherein the condition for a handover is at least one condition selected from the group of conditions consisting of a signal to noise ratio, a service load, an interference, a strategy of the operator of the network, a preferred policy, a roaming agreement, a capability, in particular a capability of a target base station, a trigger event and a reject information.

* * * * *